United States Patent [19]
Kumazaki et al.

[11] Patent Number: 5,555,360
[45] Date of Patent: Sep. 10, 1996

[54] GRAPHICS PROCESSING APPARATUS FOR PRODUCING OUTPUT DATA AT EDGES OF AN OUTPUT IMAGE DEFINED BY VECTOR DATA

[75] Inventors: Hitomi Kumazaki, Koshigaya; Yoshiaki Hanyu, Tokyo; Masaki Sano, Yokohama, all of Japan

[73] Assignee: Ricoh Company, Ltd., Tokyo, Japan

[21] Appl. No.: 680,697

[22] Filed: Apr. 4, 1991

[30] Foreign Application Priority Data

| | | | |
|---|---|---|---|
| Apr. 9, 1990 | [JP] | Japan | 2-93568 |
| Apr. 13, 1990 | [JP] | Japan | 2-97937 |
| Apr. 13, 1990 | [JP] | Japan | 2-97938 |
| Feb. 14, 1991 | [JP] | Japan | 3-42744 |

[51] Int. Cl.$^6$ .................................. G06T 11/00
[52] U.S. Cl. .................. 395/143; 395/128; 395/133; 345/136
[58] Field of Search ................... 395/140–143, 395/119, 126, 133, 127–132; 340/728, 729, 730; 345/135, 136, 137, 138

[56] References Cited

U.S. PATENT DOCUMENTS

| | | | |
|---|---|---|---|
| 4,843,380 | 6/1989 | Oakley et al. | 382/49 X |
| 4,890,162 | 12/1989 | McNeely et al. | 358/138 |
| 4,918,626 | 4/1990 | Watkins et al. | 382/52 X |
| 5,220,650 | 6/1993 | Barkans | 395/143 X |

OTHER PUBLICATIONS

Gupta et al., Filtering Edges for Gray–Scale Displays, Computer Graphics (Aug. 1981).
Franklin C. Crow, "A Comparison of Antialiasing Techniques," *IEEE CG & A*, vol. 1, No. 1, pp. 40–48.

*Primary Examiner*—Almis R. Jankus
*Attorney, Agent, or Firm*—Popham, Haik, Schnobrich & Kaufman, Ltd.

[57] ABSTRACT

A graphics processing apparatus carries out an antialiasing for obtaining an output image having smooth edges, enabling a speedy computation of approximate shading area rates of pixels by making use of neither a subpixel dividing process nor a shading pixel counting process. The apparatus comprises a discriminating part for discriminating the presence of an end point pixel at an edge portion of an image defined by a vector data, a computing part for computing the number of edge pixels by extracting two integer parts a, b from x coordinate values Xa, Xb of two points where a scanline intersects the vector data, a setting part for setting a x coordinate value of the end point pixel to the Xb only when an end point pixel is found at the edge portion, an approximate point part for determining an approximate point value C' from a prescribed factor $c \times (n-1)$ computed by a decimal fraction c extracted from the x coordinate value Xa, a memory part for storing a lookup table containing a set of predetermined data, and an approximate area factor part for determining an approximate shading area factor k by making reference to the lookup table stored in the memory part.

11 Claims, 40 Drawing Sheets

1 X 1
kid = 225

7 X 7
kid = 255 x 28/49

CONE FILTER

| 2 | 4 | 5 | 6 | 5 | 4 | 2 |
|---|---|---|---|---|---|---|
| 4 | 6 | 8 | 9 | 8 | 6 | 4 |
| 5 | 8 | 11 | 12 | 11 | 8 | 5 |
| 6 | 9 | 12 | 16 | 12 | 9 | 6 |
| 5 | 8 | 11 | 12 | 11 | 8 | 5 |
| 4 | 6 | 8 | 9 | 8 | 6 | 4 |
| 2 | 4 | 5 | 6 | 5 | 4 | 2 |

7 X 7 kid = 255 x 199/336

CYLINDRICAL FILTER

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

CONE FILTER

| 1 | 3 | 4 | 4 | 3 | 1 |
|---|---|---|---|---|---|
| 3 | 5 | 6 | 6 | 4 | 3 |
| 4 | 6 | 9 | 9 | 6 | 4 |
| 4 | 6 | 9 | 9 | 6 | 4 |
| 3 | 5 | 6 | 6 | 4 | 3 |
| 1 | 3 | 4 | 4 | 3 | 1 |

GAUSSIAN FILTER

| 2 | 3 | 4 | 4 | 3 | 2 |
|---|---|---|---|---|---|
| 3 | 5 | 6 | 6 | 5 | 3 |
| 4 | 7 | 9 | 9 | 7 | 4 |
| 4 | 7 | 9 | 9 | 7 | 4 |
| 3 | 5 | 6 | 6 | 5 | 3 |
| 2 | 3 | 4 | 4 | 3 | 2 |

HAMMING FILTER

| 1 | 3 | 4 | 4 | 3 | 1 |
|---|---|---|---|---|---|
| 3 | 5 | 6 | 6 | 5 | 3 |
| 4 | 6 | 9 | 9 | 6 | 4 |
| 4 | 6 | 9 | 9 | 6 | 4 |
| 3 | 5 | 6 | 6 | 5 | 3 |
| 1 | 3 | 4 | 4 | 3 | 1 |

FIG. 10

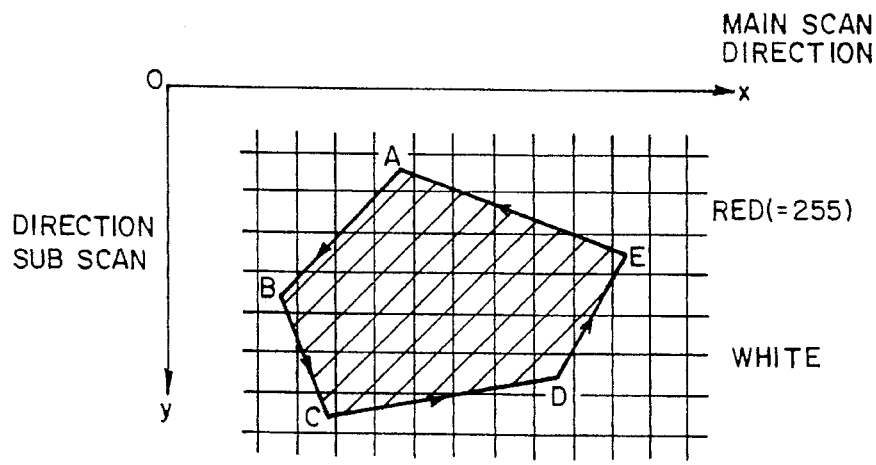
FIG. 17(a)
FIG. 17(b)
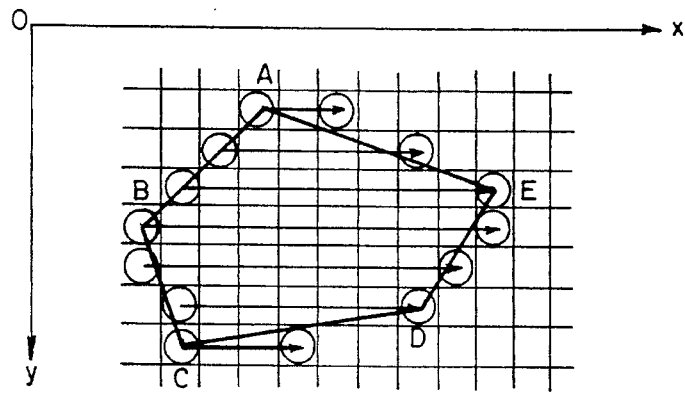
APPROXIMATE AREA FACTOR k
FIG. 18

FIG. 19(a)
R. PLAIN MEMORY

| 255 | 255 | 255 | 255 | 255 | 255 | 255 | 255 | 255 | 255 | 255 |
|---|---|---|---|---|---|---|---|---|---|---|
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |

FIG. 19(b)
G. PLAIN MEMORY

| 255 | 255 | 255 | 28 | 196 | 255 | 255 | 255 | 255 | 255 | 255 |
|---|---|---|---|---|---|---|---|---|---|---|
| 255 | 255 | 84 | 0 | 0 | 0 | 56 | 140 | 224 | 255 | 255 |
| 255 | 84 | 0 | 0 | 0 | 0 | 0 | 0 | 0 | 224 | 255 |
| 255 | 0 | 0 | 0 | 0 | 0 | 0 | 0 | 28 | 196 | 255 |
| 84 | 0 | 0 | 0 | 0 | 0 | 0 | 0 | 196 | 255 | 255 |
| 255 | 112 | 0 | 0 | 0 | 84 | 140 | 224 | 255 | 255 | 255 |
| 255 | 0 | 84 | 140 | 224 | 255 | 255 | 255 | 255 | 255 | 255 |

FIG. 19(c)
B. PLAIN MEMORY

| 255 | 255 | 255 | 28 | 196 | 255 | 255 | 255 | 255 | 255 | 255 |
|---|---|---|---|---|---|---|---|---|---|---|
| 255 | 255 | 84 | 0 | 0 | 0 | 56 | 140 | 224 | 255 | 255 |
| 255 | 84 | 0 | 0 | 0 | 0 | 0 | 0 | 0 | 255 | 255 |
| 224 | 0 | 0 | 0 | 0 | 0 | 0 | 0 | 28 | 224 | 255 |
| 84 | 0 | 0 | 0 | 0 | 0 | 0 | 0 | 196 | 196 | 255 |
| 255 | 112 | 0 | 0 | 0 | 84 | 140 | 224 | 255 | 255 | 255 |
| 255 | 0 | 84 | 140 | 224 | 255 | 255 | 255 | 255 | 255 | 255 |

*FIG. 20(a)*

R. PLAIN MEMORY

| 255 | 255 | 255 | 255 | 255 | 255 | 255 | 255 | 255 | 255 | 255 |
|-----|-----|-----|-----|-----|-----|-----|-----|-----|-----|-----|
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |

*FIG. 20(b)*

G. PLAIN MEMORY

| 255 | 255 | 255 | 0   | 0   | 0   | 255 | 255 | 255 | 255 | 255 |
|-----|-----|-----|-----|-----|-----|-----|-----|-----|-----|-----|
| 255 | 255 | 0   | 0   | 0   | 0   | 0   | 0   | 255 | 255 | 255 |
| 255 | 0   | 0   | 0   | 0   | 0   | 0   | 0   | 0   | 0   | 255 |
| 0   | 0   | 0   | 0   | 0   | 0   | 0   | 0   | 0   | 0   | 255 |
| 0   | 0   | 0   | 0   | 0   | 0   | 0   | 0   | 0   | 255 | 255 |
| 255 | 0   | 0   | 0   | 0   | 0   | 0   | 0   | 255 | 255 | 255 |
| 255 | 0   | 0   | 0   | 0   | 255 | 255 | 255 | 255 | 255 | 255 |

*FIG. 20(c)*

B. PLAIN MEMORY

| 255 | 255 | 255 | 0   | 0   | 0   | 255 | 255 | 255 | 255 | 255 |
|-----|-----|-----|-----|-----|-----|-----|-----|-----|-----|-----|
| 255 | 255 | 0   | 0   | 0   | 0   | 0   | 0   | 255 | 255 | 255 |
| 255 | 0   | 0   | 0   | 0   | 0   | 0   | 0   | 0   | 0   | 255 |
| 0   | 0   | 0   | 0   | 0   | 0   | 0   | 0   | 0   | 0   | 255 |
| 0   | 0   | 0   | 0   | 0   | 0   | 0   | 0   | 0   | 255 | 255 |
| 255 | 0   | 0   | 0   | 0   | 0   | 0   | 0   | 255 | 255 | 255 |
| 255 | 0   | 0   | 0   | 224 | 255 | 255 | 255 | 255 | 255 | 255 |

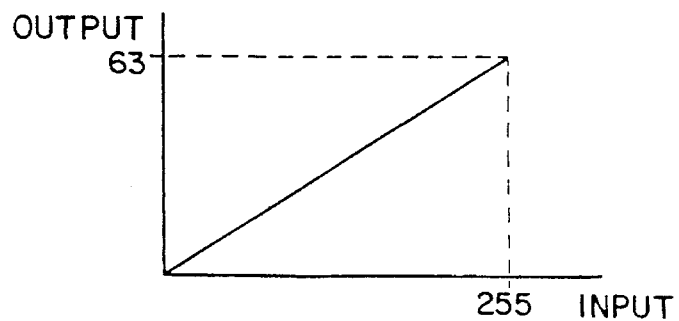
FIG. 22
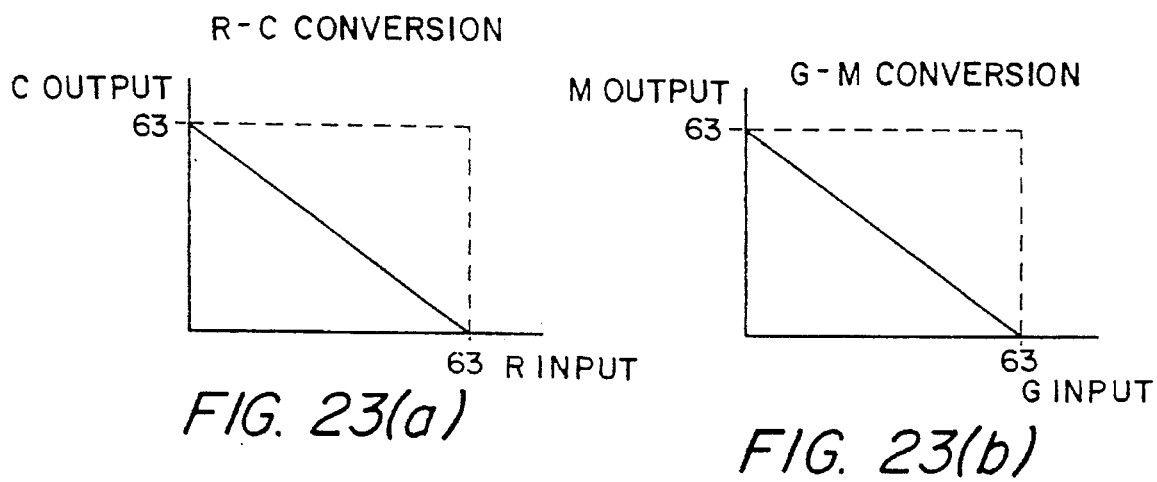
FIG. 23(a)
FIG. 23(b)
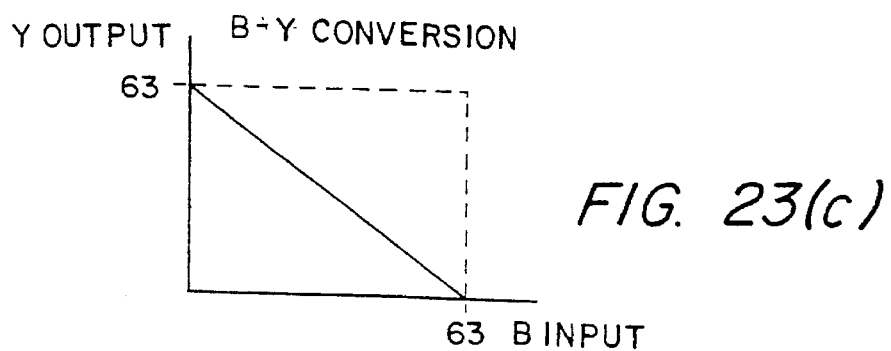
FIG. 23(c)

FIG. 24(a) BK DATA

FIG. 24(b) C DATA

| 0 | 0 | 0 | 0 | 0 | 0 | 0 |
|---|---|---|---|---|---|---|
| 0 | 0 | 7 | 14 | 0 | 0 | 0 |
| 0 | 7 | 63 | 63 | 56 | 14 | 0 |
| 0 | 28 | 63 | 63 | 63 | 63 | 7 |
| 0 | 49 | 63 | 63 | 63 | 63 | 28 |
| 14 | 63 | 63 | 63 | 63 | 63 | 42 |
| 56 | 63 | 63 | 63 | 63 | 63 | 42 |
| 42 | 63 | 63 | 63 | 63 | 63 | 42 |
| 42 | 63 | 63 | 63 | 35 | 63 | 28 |
| 0 | 0 | 7 | 42 | 0 | 0 | 0 |

FIG. 24(c) M DATA

FIG. 24(d) Y DATA

FIG. 26(a) BK DATA

FIG. 26(b) C DATA

FIG. 26(c) M DATA

FIG. 26(d) Y DATA

FIG. 27(a) BK DATA

FIG. 27(b) C DATA

FIG. 27(c) M DATA

FIG. 27(d) Y DATA

LH EDGE

RH EDGE

LH EDGE

RH EDGE $$9 \times k = (1-c) \times (n-1)$$
$$= (1-0.2) \times (10-1)$$
$$= 0.8 \times 9 = 7.2 \rightarrow \underline{\underline{7}}$$
$$k = 7/9$$

APPROXIMATE AREA FACTOR k

| 0 | 0 | 0 | 6/9 | 0 | 0 | 0 | 0 | 0 | 0 | 0 |
|---|---|---|---|---|---|---|---|---|---|---|
| 0 | 0 | 0 | 1 | 1 | 0.1 | 0 | 0 | 0 | 0 | 0 |
| 0 | 0 | 1 | 1 | 1 | 1 | 1 | 1 | 0.2 | 0 | 0 |
| 0 | 1 | 1 | 1 | 1 | 1 | 1 | 1 | 1 | 0.1 | 0 |
| 0.6 | 1 | 1 | 1 | 1 | 1 | 1 | 1 | 0.4 | 0 | 0 |
| 0 | 1 | 1 | 1 | 1 | 1 | 1 | 0.8 | 0 | 0 | 0 |
| 0 | 0.6 | 1 | 1 | 1 | 0.4 | 0 | 0 | 0 | 0 | 0 |

R· PLAIN MEMORY

FIG. 45(a)

| 255 | 255 | 255 | 255 | 255 | 255 | 255 | 255 | 255 | 255 | 255 |
|-----|-----|-----|-----|-----|-----|-----|-----|-----|-----|-----|
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |

G· PLAIN MEMORY

FIG. 45(b)

| 255 | 255 | 255 | 85  | 255 | 255 | 255 | 255 | 255 | 255 | 255 |
|-----|-----|-----|-----|-----|-----|-----|-----|-----|-----|-----|
| 255 | 255 | 255 | 0   | 0   | 230 | 255 | 255 | 255 | 255 | 255 |
| 255 | 255 | 0   | 0   | 0   | 0   | 0   | 0   | 204 | 255 | 255 |
| 255 | 0   | 0   | 0   | 0   | 0   | 0   | 0   | 0   | 230 | 255 |
| 102 | 0   | 0   | 0   | 0   | 0   | 0   | 0   | 153 | 255 | 255 |
| 255 | 0   | 0   | 0   | 0   | 0   | 0   | 51  | 255 | 255 | 255 |
| 255 | 102 | 0   | 0   | 0   | 153 | 255 | 255 | 255 | 255 | 255 |

B· PLAIN MEMORY

FIG. 45(c)

| 255 | 255 | 255 | 85  | 255 | 255 | 255 | 255 | 255 | 255 | 255 |
|-----|-----|-----|-----|-----|-----|-----|-----|-----|-----|-----|
| 255 | 255 | 255 | 0   | 0   | 230 | 255 | 255 | 255 | 255 | 255 |
| 255 | 255 | 0   | 0   | 0   | 0   | 0   | 0   | 204 | 255 | 255 |
| 255 | 0   | 0   | 0   | 0   | 0   | 0   | 0   | 0   | 230 | 255 |
| 102 | 0   | 0   | 0   | 0   | 0   | 0   | 0   | 153 | 255 | 255 |
| 255 | 0   | 0   | 0   | 0   | 0   | 0   | 51  | 255 | 255 | 255 |
| 255 | 102 | 0   | 0   | 0   | 153 | 255 | 255 | 255 | 255 | 255 |

FIG. 46(a) BK DATA (empty grid, all zeros)

FIG. 46(b) C DATA (empty grid, all zeros)

FIG. 46(c) M DATA

| 0 | 0 | 0 | 0 | 0 | 0 | 0 |
|---|---|---|---|---|---|---|
| 0 | 0 | 0 | 6 | 0 | 0 | 0 |
| 0 | 0 | 13 | 63 | 25 | 0 | 0 |
| 0 | 0 | 63 | 63 | 63 | 50 | 0 |
| 0 | 0 | 63 | 63 | 63 | 63 | 0 |
| 0 | 6 | 63 | 63 | 63 | 63 | 25 |
| 42 | 63 | 63 | 63 | 63 | 63 | 63 |
| 0 | 63 | 63 | 63 | 63 | 63 | 63 |
| 0 | 0 | 63 | 63 | 63 | 63 | 38 |
| 0 | 0 | 0 | 38 | 0 | 0 | 0 |

FIG. 46(d) Y DATA

| 0 | 0 | 0 | 0 | 0 | 0 | 0 |
|---|---|---|---|---|---|---|
| 0 | 0 | 0 | 6 | 0 | 0 | 0 |
| 0 | 0 | 13 | 63 | 25 | 0 | 0 |
| 0 | 0 | 63 | 63 | 63 | 50 | 0 |
| 0 | 0 | 63 | 63 | 63 | 63 | 0 |
| 0 | 6 | 63 | 63 | 63 | 63 | 25 |
| 42 | 63 | 63 | 63 | 63 | 63 | 63 |
| 0 | 63 | 63 | 63 | 63 | 63 | 63 |
| 0 | 0 | 63 | 63 | 63 | 63 | 38 |
| 0 | 0 | 0 | 38 | 0 | 0 | 0 |

FIG. 47
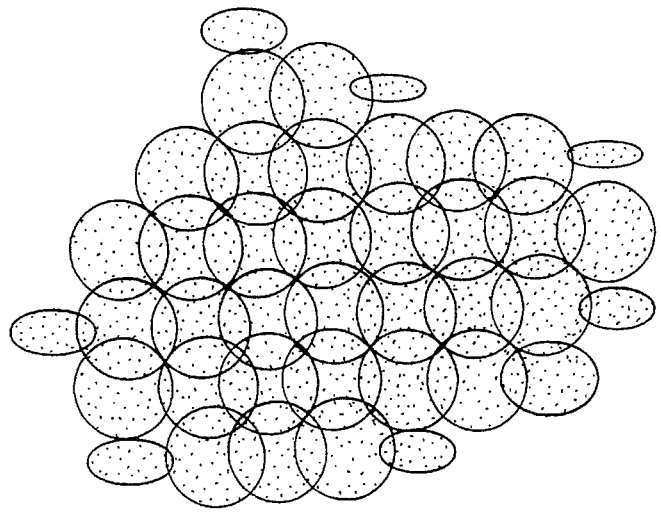
FIG. 48
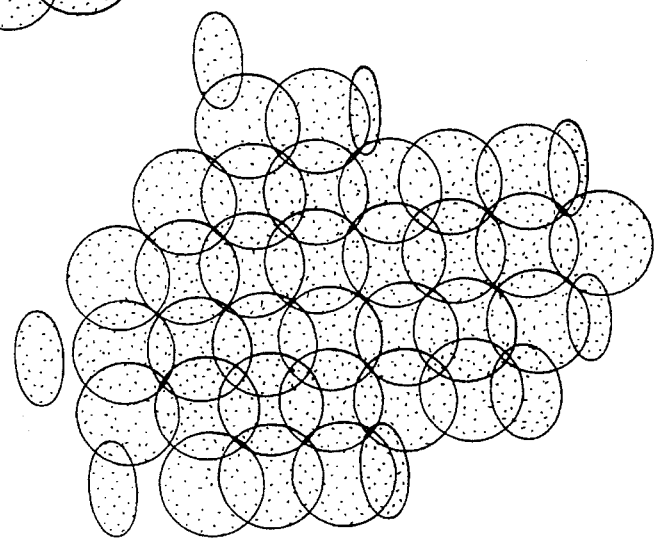
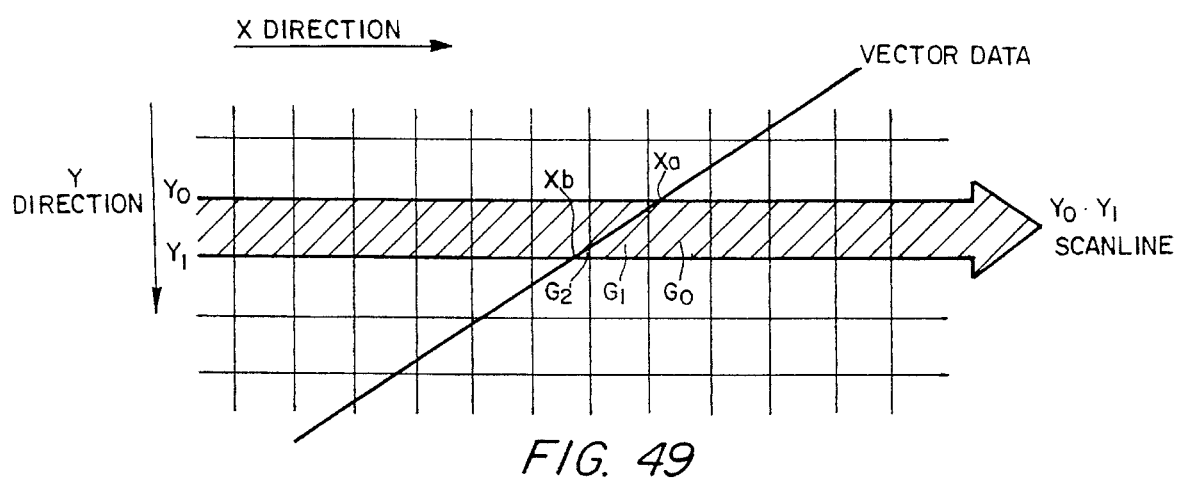
FIG. 49

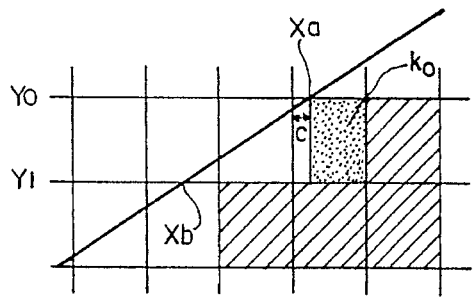
$9 \times k_0 = (1-c) \times (n-1)$
$= (1-0.2) \times (10-1)$
$= 0.8 \times 9 = 7.2 \rightarrow \underline{7}$
$k_0 = 7/9$
FIG. 50(a)
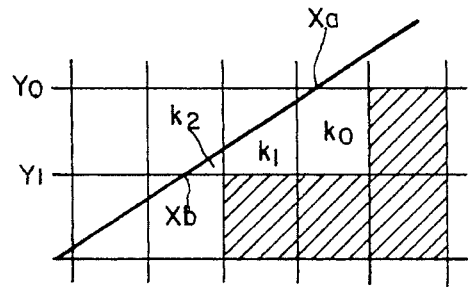
$k_1 = k_0 - 1/9 = 6/9$
$k_2 = k_1 - 1/9 = 5/9$
FIG. 50(b)
FIG. 52
| 0 | 0 | 0 | 6/9 | 5/9 | 0 | 0 | 0 | 0 | 0 | 0 |
|---|---|---|---|---|---|---|---|---|---|---|
| 0 | 0 | 0 | 1 | 1 | 1/9 | 0 | 0 | 0 | 0 | 0 |
| 0 | 0 | 1 | 1 | 1 | 1 | 1 | 1 | 2/9 | 1/9 | 0 |
| 0 | 1 | 1 | 1 | 1 | 1 | 1 | 1 | 1 | 1/9 | 0 |
| 6/9 | 1 | 1 | 1 | 1 | 1 | 1 | 1 | 4/9 | 0 | 0 |
| 0 | 1 | 1 | 1 | 1 | 1 | 7/9 | 0 | 0 | 0 | 0 |
| 0 | 6/9 | 5/9 | 4/9 | 3/9 | 0 | 0 | 0 | 0 | 0 | 0 |
APPROXIMATE AREA FACTOR k

R· PLAIN MEMORY

FIG. 53(a)

| 255 | 255 | 255 | 255 | 255 | 255 | 255 | 255 | 255 | 255 | 255 |
|---|---|---|---|---|---|---|---|---|---|---|
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |
| 255 | 255 | 255 | 255 | 255 | 255 | 255 | 255 | 255 | 255 | 255 |

G· PLAIN MEMORY

FIG. 53(b)

| 255 | 255 | 255 | 85 | 113 | 255 | 255 | 255 | 255 | 255 | 255 |
|---|---|---|---|---|---|---|---|---|---|---|
| 255 | 255 | 255 | 0 | 0 | 227 | 255 | 255 | 255 | 255 | 255 |
| 255 | 255 | 0 | 0 | 0 | 0 | 0 | 0 | 198 | 227 | 255 |
| 255 | 0 | 0 | 0 | 0 | 0 | 0 | 0 | 0 | 227 | 255 |
| 85 | 0 | 0 | 0 | 0 | 0 | 0 | 0 | 142 | 255 | 255 |
| 255 | 0 | 0 | 0 | 0 | 0 | 0 | 57 | 255 | 255 | 255 |
| 255 | 85 | 113 | 142 | 170 | 255 | 255 | 255 | 255 | 255 | 255 |

B· PLAIN MEMORY

FIG. 53(c)

| 255 | 255 | 255 | 85 | 113 | 255 | 255 | 255 | 255 | 255 | 255 |
|---|---|---|---|---|---|---|---|---|---|---|
| 255 | 255 | 255 | 0 | 0 | 227 | 255 | 255 | 255 | 255 | 255 |
| 255 | 255 | 0 | 0 | 0 | 0 | 0 | 0 | 198 | 227 | 255 |
| 255 | 0 | 0 | 0 | 0 | 0 | 0 | 0 | 0 | 227 | 255 |
| 85 | 0 | 0 | 0 | 0 | 0 | 0 | 0 | 142 | 255 | 255 |
| 255 | 0 | 0 | 0 | 0 | 0 | 0 | 57 | 255 | 255 | 255 |
| 255 | 85 | 113 | 142 | 170 | 255 | 255 | 255 | 255 | 255 | 255 |

FIG. 54(a) BK DATA

| | | | | | | |
|---|---|---|---|---|---|---|
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |

FIG. 54(b) C DATA

| | | | | | | |
|---|---|---|---|---|---|---|
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |
| O | O | O | O | O | O | O |

FIG. 54(c) M DATA

| | | | | | | |
|---|---|---|---|---|---|---|
| O | O | O | O | O | O | O |
| O | O | 7 | 7 | O | O | O |
| O | O | 14 | 63 | 28 | O | O |
| O | O | 63 | 63 | 63 | 49 | O |
| O | O | 63 | 63 | 63 | 63 | O |
| O | 7 | 63 | 63 | 63 | 63 | O |
| 35 | 63 | 63 | 63 | 63 | 63 | 21 |
| 42 | 63 | 63 | 63 | 63 | 63 | 28 |
| O | 63 | 63 | 63 | 63 | 63 | 35 |
| O | O | 63 | 63 | 63 | 63 | 42 |
| O | O | O | 42 | O | O | O |

FIG. 54(d) YDATA

| | | | | | | |
|---|---|---|---|---|---|---|
| O | O | O | O | O | O | O |
| O | O | 7 | 7 | O | O | O |
| O | O | 14 | 63 | 28 | O | O |
| O | O | 63 | 63 | 63 | 49 | O |
| O | O | 63 | 63 | 63 | 63 | O |
| O | 7 | 63 | 63 | 63 | 63 | O |
| 35 | 63 | 63 | 63 | 63 | 63 | 21 |
| 42 | 63 | 63 | 63 | 63 | 63 | 28 |
| O | 63 | 63 | 63 | 63 | 63 | 35 |
| O | O | O | 42 | O | O | O |

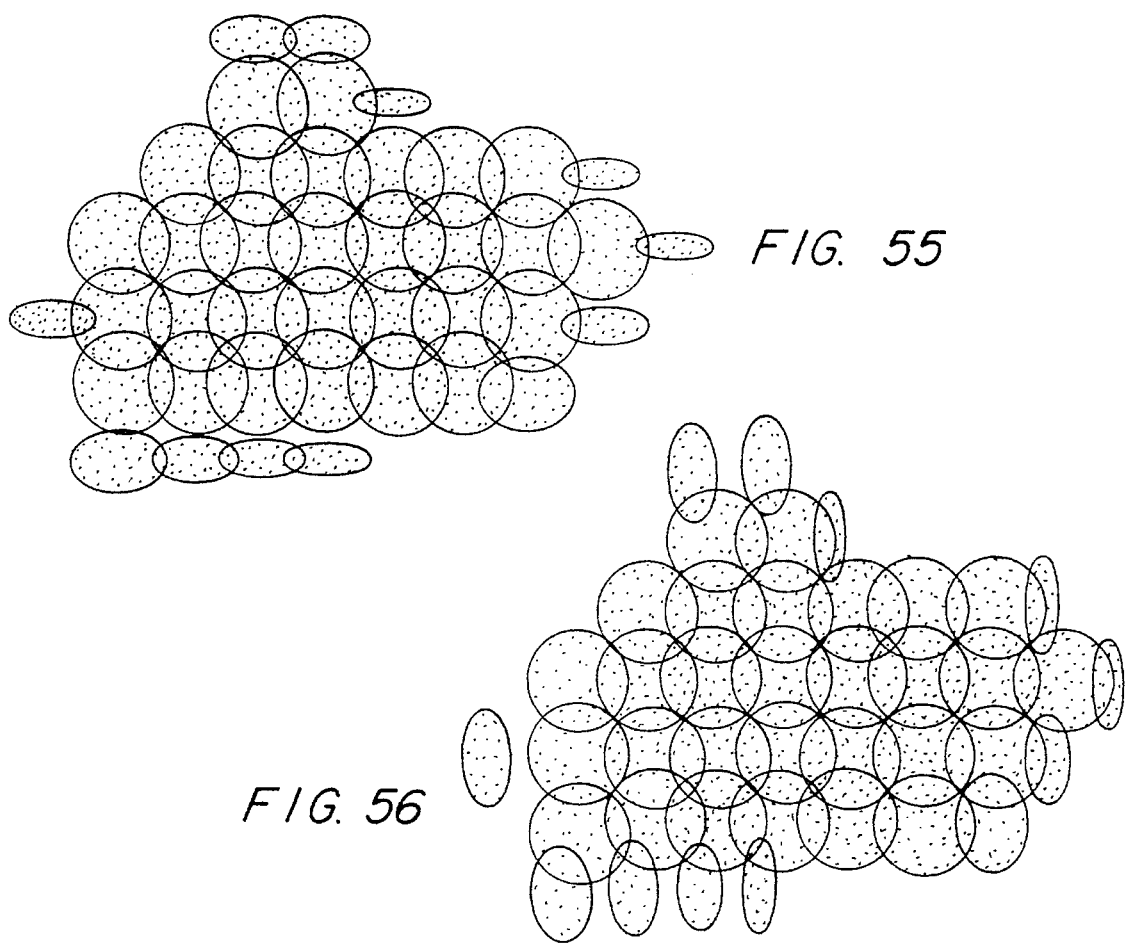
FIG. 55
FIG. 56
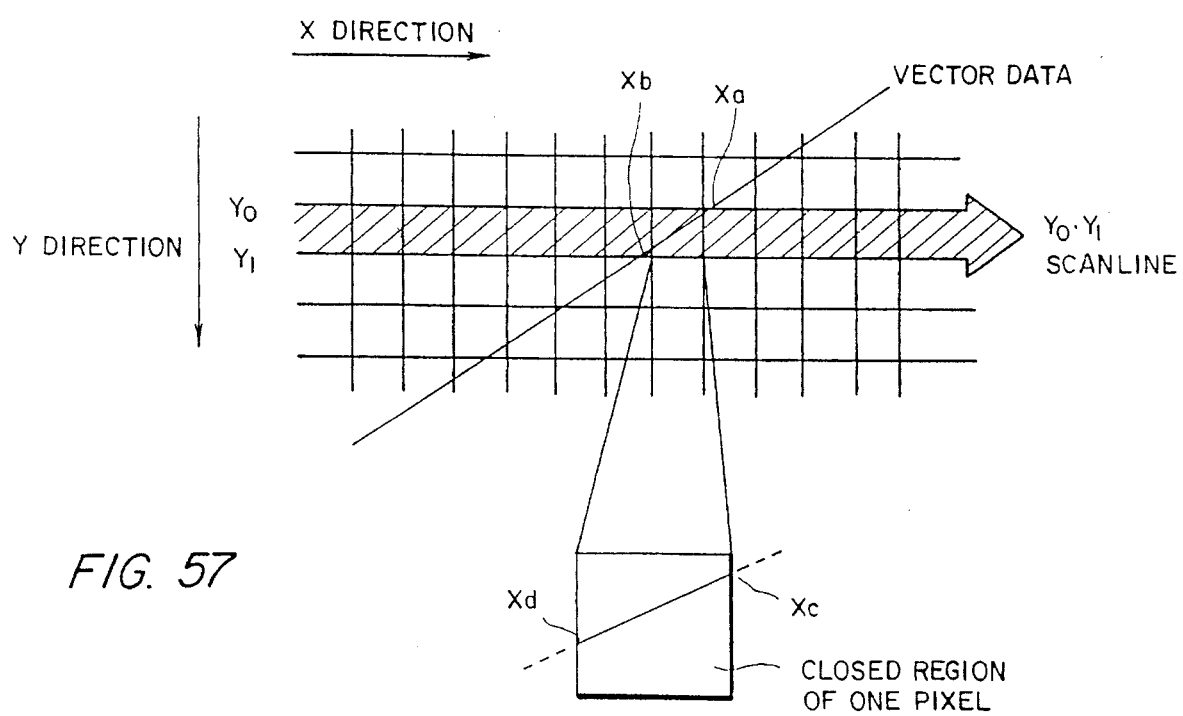
FIG. 57

GRAPHICS PROCESSING APPARATUS FOR PRODUCING OUTPUT DATA AT EDGES OF AN OUTPUT IMAGE DEFINED BY VECTOR DATA

BACKGROUND OF THE INVENTION

The present invention relates generally to a graphics processing apparatus, and more particularly to a graphics processing apparatus in which an improved antialiasing process is carried out at a high speed to reduce the effects of aliasing from edge portions of an output image so that smooth edge portions of the output image are created.

Conventionally, in the computer graphics field, an antialiasing technique is used when an image with aliasing is outputted to a display unit such as a CRT display, so that a better display image with smooth edges is created. There are several prior antialiasing techniques for reducing the effects of aliasing from edge portions of an output image to create an image with smooth edges, and these prior techniques include the averaging technique, the filtering technique and the prefiltering technique. By carrying out a luminance modulation in such a prior antialiasing technique, a stair-like irregularity or aliasing at an edge portion of the image as shown in FIG. 1(a) is eliminated so that a visually smooth edge portion of the image as shown in FIG. 1(b) is created.

In a case in which the averaging technique is used, each pixel is divided into N×M subpixels (N, M: a natural number) and the raster computing of a high-resolution image is carried out, then averaging the N×M subpixels for low resolution to determine a luminance of each pixel. A more detailed description of the averaging technique for antialiasing will now be given with reference to FIG. 2(a), (b). When a pixel being considered lies at an edge portion of an image (the image shown in FIG. 2 extends continuously toward the left hand direction of the inclined line). When the antialiasing process is not carried out, the maximum intensity available (luminance, or luminous intensity, "kid"=255, in a case of 256-level tone image) is assigned to this edge-portion pixel as shown in FIG. 2(a). When an antialiasing process is carried out by the averaging technique, the edge-portion pixel is divided into, for example, 7×7 subpixels as shown in FIG. 2(b). The number of subpixels which are located inside the image is counted, and in this case the counted number of such subpixels is 28. This counted number is divided by the total number (in this case, the total number (=49) of subpixels within the pixel being considered for averaging the luminous intensity of the subpixels, and the maximum intensity of 255 is multiplied by 28/49 to determine a suitable luminous intensity to be assigned to each subpixel. In this manner, when the averaging technique is used, the luminous intensity of a pixel is thus determined by considering where the pixel being considered is located in the image.

The filtering technique is a modified method of the averaging technique described above. In the averaging technique, the same weight value is assigned to all the subpixels within one pixel. In the filtering technique, however, a different weight value (which is called hereinafter a weight) is assigned the respective subpixels by using a prescribed filter. The intensity of a subpixel is influenced by a factor which is determined depending on the location of the subpixel in the image. Referring to FIG. 3(a), (b), an example of the filtering technique is now considered, and in this example the filtering technique is applied to the same image data as shown in FIG. 2(a) and the pixel being considered is divided into 7×7 subpixels. FIG. 3(a) shows the character data of the so-called cone filter, which is used to assign a weight given from the character data of the cone filter shown to the corresponding subpixels. For example, a weight of 2 is assigned to the right corner subpixel to determine the intensity of the subpixel. When a number of subpixels are located within the image, the counted number of the subpixels is determined by a weight from among the character data of the cone filter. In FIG. 2(b), a pattern of the display image after the antialiasing process is carried out by the filtering technique is shown. In this case, the counted number of subpixels with weighted intensities which are located in the image is 199, and this number of 199 is divided by the total number (366) of the weights in the cone filter for averaging the subpixels, and the maximum intensity is multiplied by 199/366 to determine a suitable intensity to be assigned to the pixel. And, there are several known filters which have been used in the filtering technique as described above, and some of them are illustrated in FIGS. 4(A–D).

The prefiltering technique is an antialiasing method in which consideration is also given to the intensity of neighboring pixels of a pixel when the intensity of that pixel is determined. In other words, an antialiasing process is carried out by applying the averaging technique or the filtering technique to N'×N' pixels around a pixel being considered. Referring now to FIG. 5, a case in which the prefiltering technique is used for carrying out an antialiasing process of 3×3 pixels is described. In FIG. 5, a pixel the intensity of which is determined by this method is indicated by 6201. The image extends continuously toward the lower right side of FIG. 5, the number of subpixels, indicated in black, which are located in the image is counted. Each pixel is divided into 4×4 subpixels. A filter used in this case is formed by a 12×12 matrix. The prefiltering technique has also the effect of eliminating high frequency components from a vector based image data.

With the recent development of the so-called desktop publishing (DTP) system employing a personal computer, a DTP system which can perform a printing of a vector based image data such as a computer graphics data has widely been used in the field. A typical DTP system is the PostScript system from Adobe Co., and the PostScript is a kind of a programming language which is generally known as the Page Description Language (PDL). This programming language is used to describe the contents of an image or document for each one page and define the arrangement of the page, including the style and format of a text region as well as a graphic region within the page. In the DTP systems of this kind, a vector font is used instead of a conventional character font frequently used in the prior publishing system, and therefore such a vector image processing system can provide a superior image quality of an output image when compared with the image quality of an image outputted by the conventional system such as a wordprocessor system using the so-called bit map font. And, this vector image processing system has an advantage in that a composite image in which a character font data and a graphics data are included in a mixed manner can be outputted.

However, a laser printer having a relatively low resolution of 200 dpi to 400 dpi is usually used with the above described conventional system, and there is a problem in that aliasing phenomenon often takes place in a printed image outputted by the laser printer, especially in the case of an output image, such a computer graphics image. Therefore, there exists a demand to create an increased image quality of an output image outputted by the laser printer through an improved antialiasing process to suitably reduce the effects of aliasing from the output image. However, in the case of the graphics processing apparatus to which the prior antialiasing process is applied, computing the area factor or the intensity of a pixel is a complicated job and takes much time. It is difficult for such a conventional apparatus to carry out at a high speed the antialiasing and image displaying processes, and there is a problem in that an increase of a graphics processing speed cannot be attained with ease because the conventional antialiasing process is used. Especially, in the case in which the prefiltering technique is used, many computing steps are required and many subpixels are influenced by the computation, and it is very difficult to attain a faster graphics processing.

SUMMARY OF THE INVENTION

Accordingly, it is a general object of the present invention to provide an improved graphics processing apparatus in which the above described problems are eliminated.

Another and more specific object of the present invention is to provide a graphics processing apparatus which comprises an antialiasing part for adjusting an output data from edge pixels of an output image being defined by a vector data on the basis of shaded area factors of the edge pixels of the output image, and for carrying out an antialiasing of the edge pixels for reducing the effects of aliasing from edge portions of the output image, and an approximation part for determining an approximate area factor of a pixel among said edge pixels of the output image by extracting a decimal fraction from a coordinate value of a prescribed point out of two points where said vector data is intersected by a scanline. According to the present invention, it is possible to determine the approximate area factor of a pixel at a high speed without performing the subpixel dividing and shaded subpixel counting which are required by the conventional apparatus.

A still another object of the present invention is to provide a graphics processing apparatus which comprises an antialiasing part for adjusting an output data from edge pixels of an output image being defined by a vector data on the basis of shaded area factors of the edge pixels of the output image, and for carrying out an antialiasing of the edge pixels for reducing the effects of aliasing from the output image, a first checking part for determining the number of the edge pixels by inputting coordinate values of two points where the vector data is intersected by a scanline, an edge pixel part for discriminating an edge pixel type, the edge pixel type being indicative of whether the edge pixels are located on a right side of the output image or on a left side of the output image, a decimal fraction part for extracting a decimal fraction from a coordinate value of a predetermined point out of the two points, the predetermined point being located nearer to the output image, and for converting the decimal fraction into a prescribed approximate value, a memory part for storing area factor information including a plurality of approximate area factors for a plurality of successive pixels which are predetermined on the basis of the number of edge pixels from the first checking part, the approximate value from the decimal fraction part and the edge pixel type from the edge pixel part, and a control part for reading out the area factor information from the memory part on the basis of the number of the edge pixels, the approximate value and the edge pixel type from the vector data, and for determining an approximate area factor of the edge pixels on the basis of the area factor information. According to the present invention, it is possible to determine the approximate area factor of a pixel at a high speed without performing the subpixel dividing and shaded subpixel counting which are required by the conventional apparatus.

Other objects and further features of the present invention will be apparent from the following detailed description when read in conjunction with the accompanying drawings.

BRIEF DESCRIPTION OF THE DRAWINGS

FIG. 10 is a diagram showing the contents of a lookup table used in the graphics processing apparatus;

FIGS. 17(a) and 17(b), which may collectively be referred to herein as FIG. 17, are diagrams for explaining a line vector dividing of a graphic image;

FIG. 18 is a diagram showing the approximate area factors k after an antialiasing process of the first embodiment is carried out;

FIGS. 19(a), 19(b), and 19(c), which may collectively be referred to herein as FIG. 19, are diagrams showing RGB image data stored in the respective plain memory parts of a page memory after an antialiasing is carried out;

FIGS. 20(a), 20(b), and 20(c), which may collectively be referred to herein as FIG. 20, are diagrams showing RGB image data stored in the respective plain memory parts of the page memory when no antialiasing is carried out;

FIG. 22 is a diagram showing an input/output characteristic chart used for a gamma correction process;

FIGS. 23(a), 23(b), and 23(c), which may collectively be referred to herein as FIG. 23, are diagrams showing an input/output characteristic chart used for a complement color generation process;

FIGS. 24(a), 24(b), 24(c) and 24(d), which may collectively be referred to herein as FIG. 24, are diagrams showing an output data outputted by a UCR processing and black generating circuit from the RGB image data shown in FIG. 19;

FIGS. 26(a), 26(b), 26(c) and 26(d), which may collectively be referred to herein as FIG. 26, are diagrams showing an output data outputted by a tone processing circuit from the data shown in FIG. 24;

FIGS. 27(a), 27(b), 27(c) and 27(d), which may collectively be referred to herein as FIG. 27, are diagrams showing an output data outputted by the image processing apparatus from the data shown in FIGS. 20(a)–20(c);

FIGS. 45(a), 45(b), and 45(c), which may collectively be referred to herein as FIG. 45, are diagrams showing RGB image data stored in the respective plain memory parts of the page memory;

FIGS. 46(a), 46(b), 46(c) and 46(d), which may collectively be referred to herein as FIG. 46, are diagrams showing an output data outputted by the UCR processing and black generating circuit from the RGB image data shown in FIGS. 45(A–C);

FIG. 47 is a diagram showing a toner image which is finally formed by the second embodiment from the polygon data shown in FIGS. 17(A–B);

FIG. 48 is a diagram showing a toner image which is formed from the polygon data shown in FIGS. 17(A–B) by applying a pulse width modulation technique;

FIGS. 49, as well as FIGS. 50(a) and 50(b) (which may collectively be referred to herein as FIG. 50), are diagrams for explaining a third embodiment of the graphics processing apparatus according to the present invention;

FIG. 52 is a diagram showing the approximate area factors k after the antialiasing process of the third embodiment is carried out;

FIGS. 53(a), 53(b), and 53(c), which may collectively be referred to herein as FIG. 53, are diagrams showing RGB image data stored in the respective plain memory parts of the page memory;

FIGS. 54(a), 54(b), 54(c) and 54(d), which may collectively be referred to herein as FIG. 54, are diagrams showing an output data outputted by the UCR processing and black generating circuit from the RGB image data shown in FIG. 53;

FIG. 55 is a diagram showing a toner image which is finally formed by the third embodiment from the polygon data shown in FIGS. 17(A–B);

FIG. 56 is a diagram showing a toner image which is formed from the polygon data shown in FIGS. 17(A–B) by applying a pulse width modulation technique;

FIG. 57, as well as FIGS. 58(a), 58(b), 58(c) and 58(d) (which may collectively be referred to herein as FIG. 58), and FIGS. 59(a), 59(b), 59(c) and 59(d) (which may collectively be referred to herein as FIG. 59), are diagrams for explaining a fourth embodiment of a graphics processing apparatus according to the present invention;

DESCRIPTION OF THE PREFERRED EMBODIMENT

First, a description will be given of a first preferred embodiment of a graphics processing apparatus according to the present invention, with reference to FIGS. 6 through 39. In the following description of the first preferred embodiment, the overview of an antialiasing process, the construction of an image forming system, the construction and operation of the PDL (Page Description Language) controller as the first embodiment of the graphics processing apparatus, the construction and operation of an image processing part, the construction and operation of a multilevel tone color laser printer, and the multilevel tone generation performed by a laser diode driver will be described in detail in this order.

The antialiasing process according to the present invention will now be overviewed, with reference to FIGS. 6 through 11. In a case of the first embodiment of the graphics processing apparatus (which is hereinafter referred to as a PDL controller), the number of pixels at an edge portion and the value of an approximate point are determined on the basis of x coordinate values of two intersecting points where a vector data is intersected by a scanline, and these are two intersecting points which are present in this case because each scanline has a thickness equivalent to a width of a single pixel (picture element). And, as a key for searching, the number of such pixels, the value of the approximate point, the presence of an end point and the type of the edge are used for retrieving the corresponding area factor data from the contents of a prescribed LookUp Table (LUT), and in accordance with the retrieved area factor data a plurality of approximate area factors are determined at a time for a plurality of pixels at the edge portions of the image. The area factor in this case is a ratio of a shaded segment area to the area of one pixel.

Figure 1A:
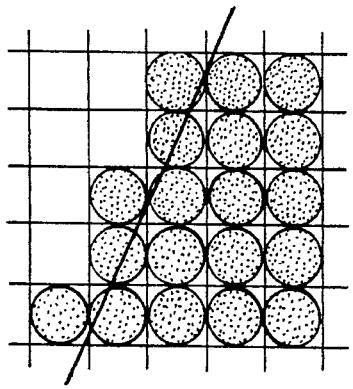
FIGS. 1(a) and 1(b), which may collectively be referred to herein as FIG. 1, are diagrams for explaining an antialiasing which is carried out by a conventional graphics processing.
Figure 1B:
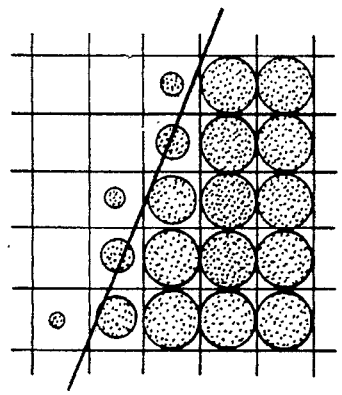
Figure 2A:
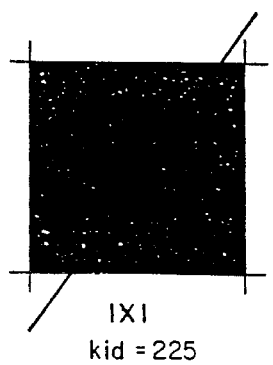
FIGS. 2(a) and 2(b), which may collectively be referred to herein as FIG. 2, are diagrams for explaining an antialiasing process which is carried out by the conventional averaging technique.
Figure 2B:
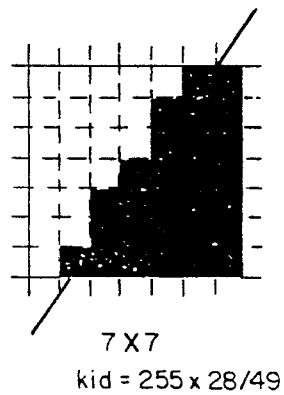
Figure 5:
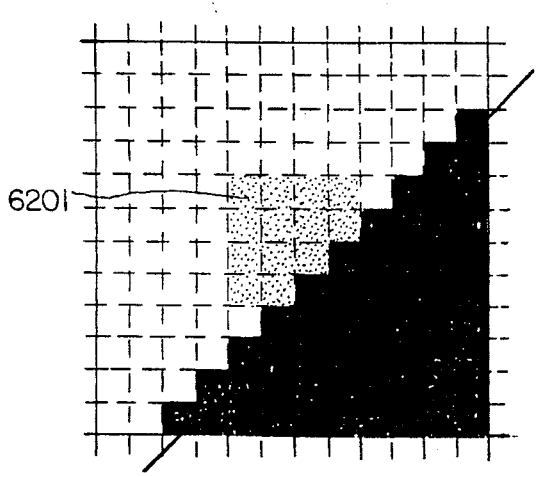
FIG. 5 is a diagram for explaining an antialiasing process which is carried out by the conventional prefiltering technique.
Figures 3A, 3B, 4A, 4B, 4C, 4D:
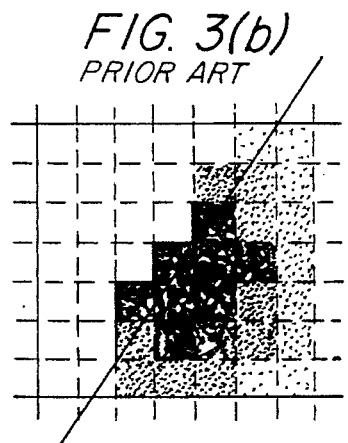
FIGS. 3(a) and 3(b), which may collectively be referred to herein as FIG. 3, are diagrams for explaining an antialiasing process which is carried out by the conventional filtering technique.
FIGS. 4(a) through 4(d), which may collectively be referred to herein as FIG. 4, are diagrams showing some examples of prior filters which are used in the conventional filtering technique.
Figure 6:
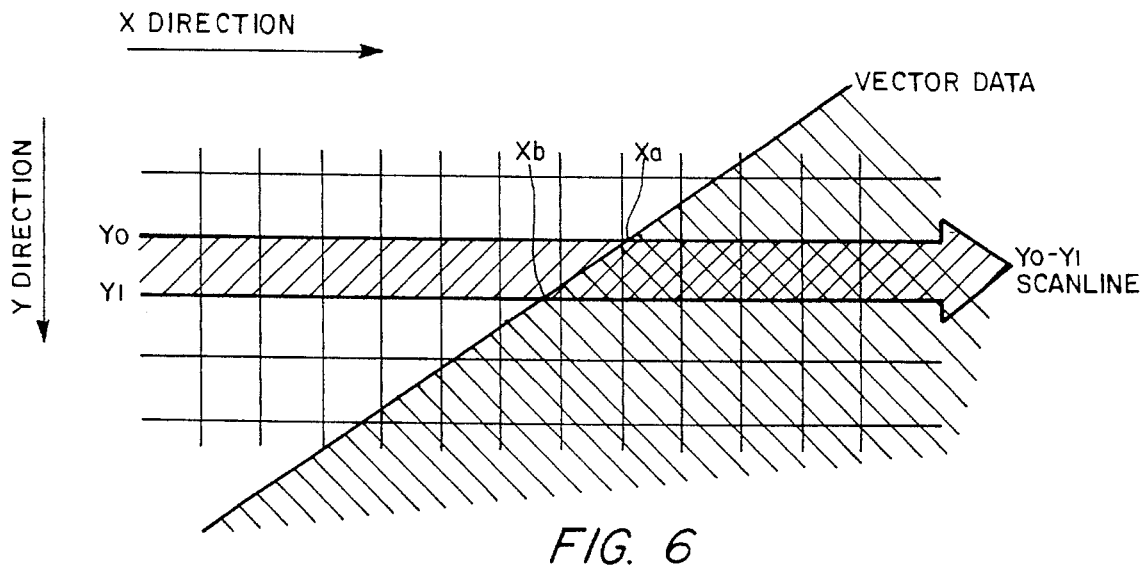
FIG. 6 is a diagram for explaining a first embodiment of a graphics processing apparatus according to the present invention.
Figure 7A:
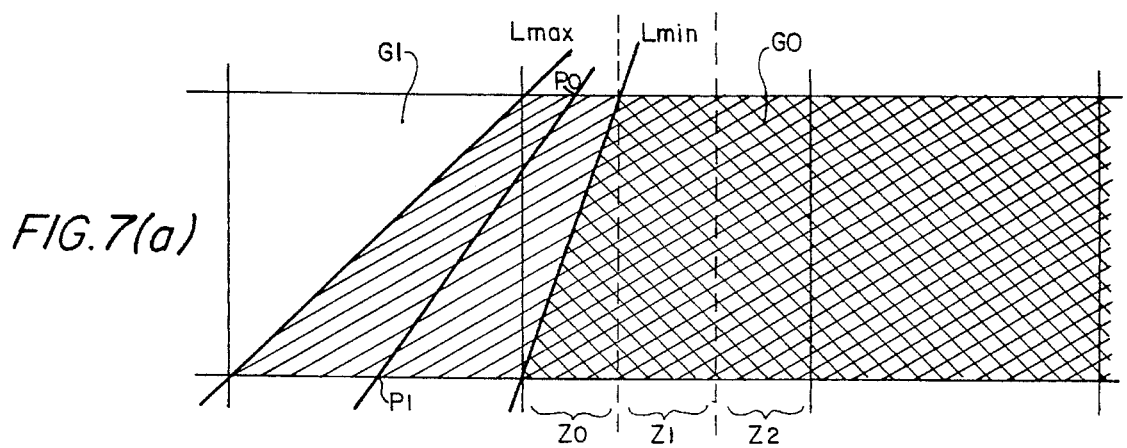
FIGS. 7(a) and 7(b) (which may collectively be referred to herein as FIG. 7), as well as FIGS. 8 and 9, are diagrams for explaining an antialiasing process carried out by the graphics processing apparatus shown in FIG. 6.
Figure 7B:
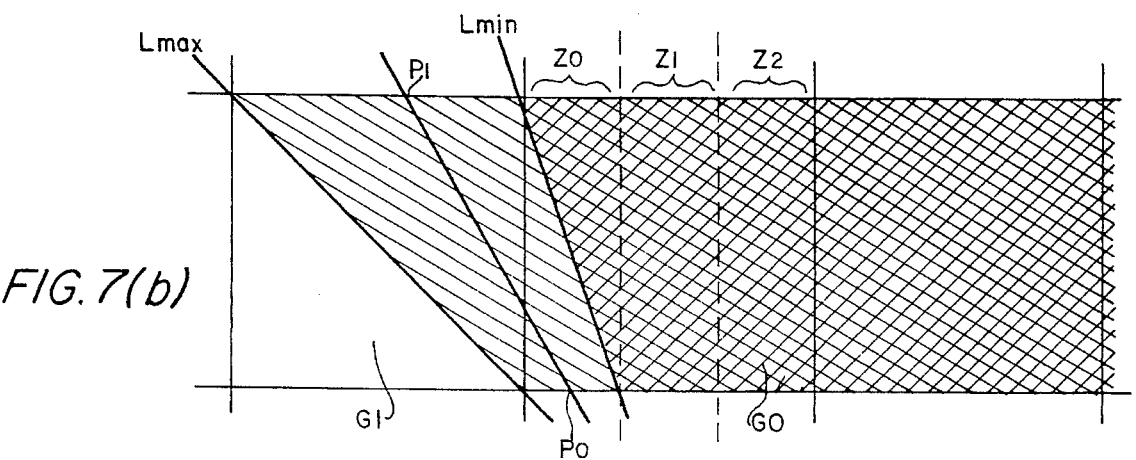

As shown in FIG. 6, there are two intersecting points when a vector data is intersected by a scanline (Y0, Y1) at an edge portion of an image, because the scanline has a thickness (which is equal to the difference (=Y1−Y0) in y coordinate between the line Y1 and the line Y0) equivalent to the width of one pixel. It will now be assumed that the edge portion pixels are located on the left hand side of the image and two x coordinate values of the intersecting points are Xa and Xb, the x coordinate value Xa lying on the line Y0 of the scanline and being nearer to the image, and the x coordinate value Xb lying on the line Y1 of the scanline and being farther than the point at Xa from the image. In FIG. 7(a) and (b), it is assumed that among the edge portion pixels lying on the scanline, an edge portion pixel which is located nearest to the image is the pixel G0, and the pixel next to the pixel G0 along the scanline (Y0, Y1) is the pixel G1. The edge portion pixel G0 is divided into three parts Z0, Z1 and Z2 in X direction, and the x coordinate value Xa is included in any of the parts Z0, Z1 and Z2 of the pixel G0.

When a plurality (n) of edge portion pixels (n: the number of edge portion pixels) appear at the edge portion of the image, it will be assumed that these edge portion pixels are G0, G1, G2, . . . and Gn, respectively, in a direction to go far from the image. In such a case, the x coordinate value Xb of the intersecting point is included in the edge portion pixel Gn.

For example, a case will be described in which the x coordinate value Xa is included in the part Z0 and the x coordinate value Xb is included in the edge portion pixel G1, as shown in FIG. 7(a), (b). The area factor related to the edge portion pixels G0 and G1 in this case ranges from the smallest area indicated by a line Lmin to the greatest area indicated by a line Lmax. As being apparent from FIG. 7(a) and (b), the smallest area and the greatest area are constant and not varied regardless of how the line is inclined in relation to the scanline. In the present embodiment, the area factor related to the edge portion pixels G0 and G1 as shown in FIG. 7(a) and (b), which ranges from the smallest area indicated by the line Lmin to the greatest area indicated by the line Lmax, is approximated to an approximate area indicated by a line P0–P1 (P0: the mid point of the part Z0, P1: the mid point of the pixel G1) to determine an approximate area factor k. Therefore, in the case where the Xa pertains to the part Z0 and the Xb pertains to the pixel Z1, it can be determined that the area factor k of the edge portion pixel G0 is 9/9 and the area factor k of the edge portion pixel G1 is 2/9 by using the above approximation to the area indicated by the line P0–P1.

Figure 8:
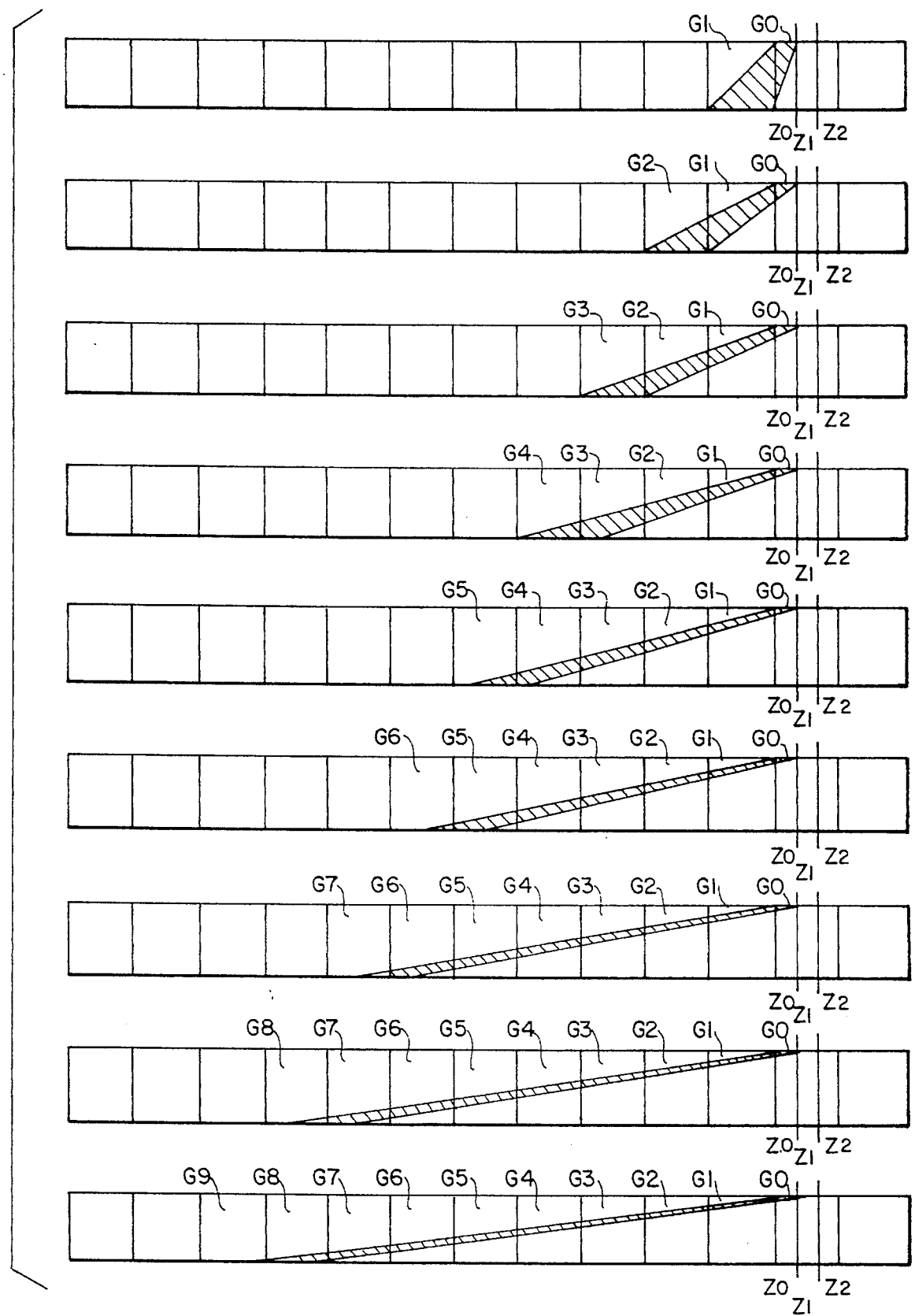

When the pixel being considered is at the left hand edge of the image and the Xa is included in the part Z0 of the nearest pixel G0 and the Xb is included in the farthest pixel Gn (n=1, 2, 3, . . . , 9), there are several conceivable cases as shown in FIG. 8. All vector data which pass through a shaded region indicated by a shading line in FIG. 8 are approximated to a vector data indicated by the line passing through the mid points P0 and P1. Also, in these cases, it is possible to determine the area factors k related to the edge portion pixels G0 through G9 by the above described method, respectively, as illustrated in FIG. 8. And, there are some cases in which more than ten edge-portion pixels appear and the farthest pixel Gn is located farther than the pixel G9 from the image, which are not shown in FIG. 8. But, as being apparent from FIG. 8, the area factor k in such cases becomes negligible and ultimately is equal to zero. In the present invention, these cases are considered as being included in the case in which the Xb pertains to the pixel G9.

Figure 9:
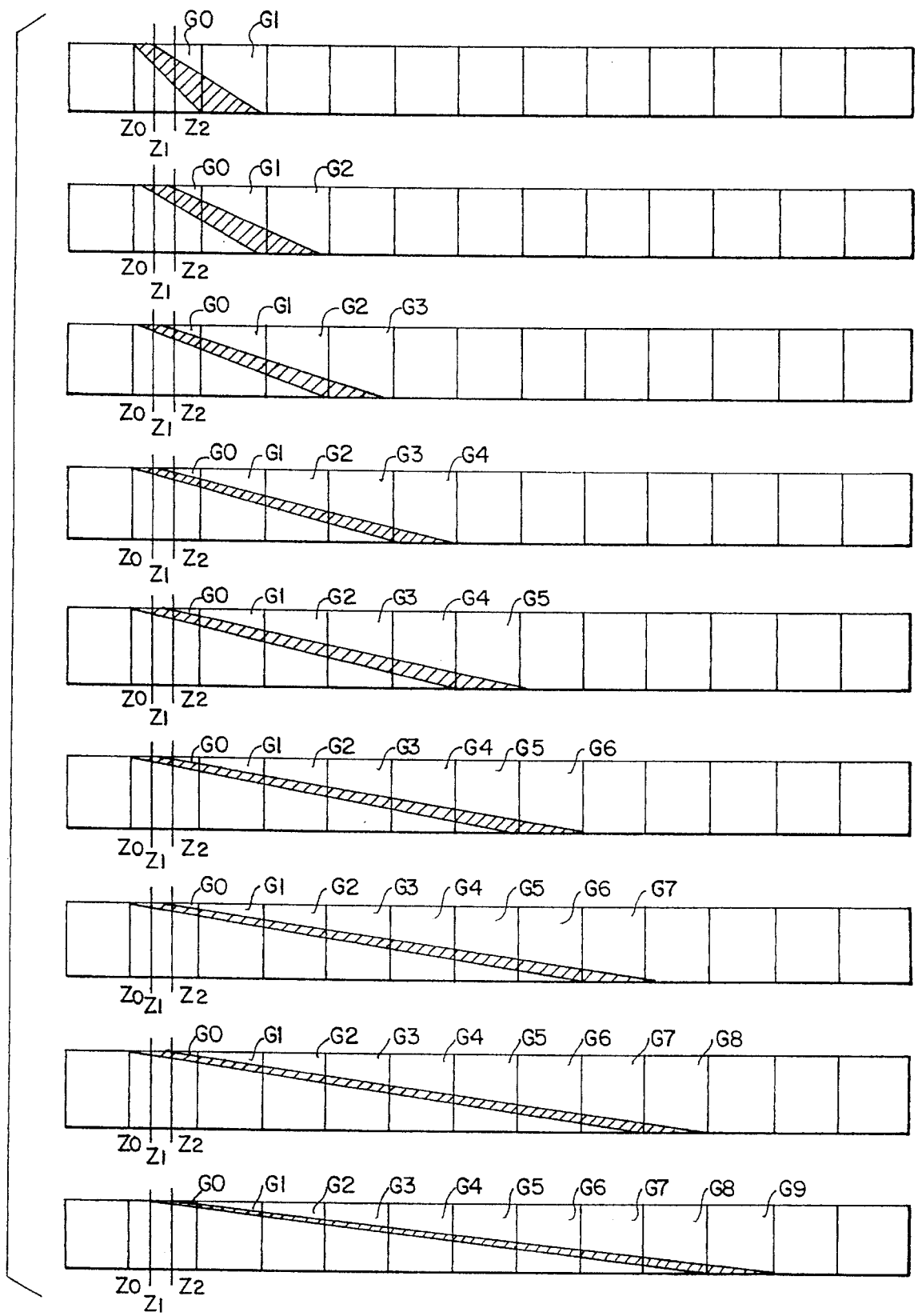

Also, when the pixel being considered is located at the right hand edge of the image and the Xa is included in the part Z0 of the nearest pixel G0 and the Xb is included in the farthest pixel Gn (n=1, 2, 3, . . . , 9), there are several conceivable cases as shown in FIG. 9. All vector data which pass through a shaded region indicated in FIG. 9 are approximated to a vector data indicated by the line passing through the mid points P0 and P1. Also, in these cases, it is possible to determine the approximate area factors k related to the edge portion pixels G0 through G9 by the above described method, respectively, as illustrated in FIG. 9.

Figure 10:
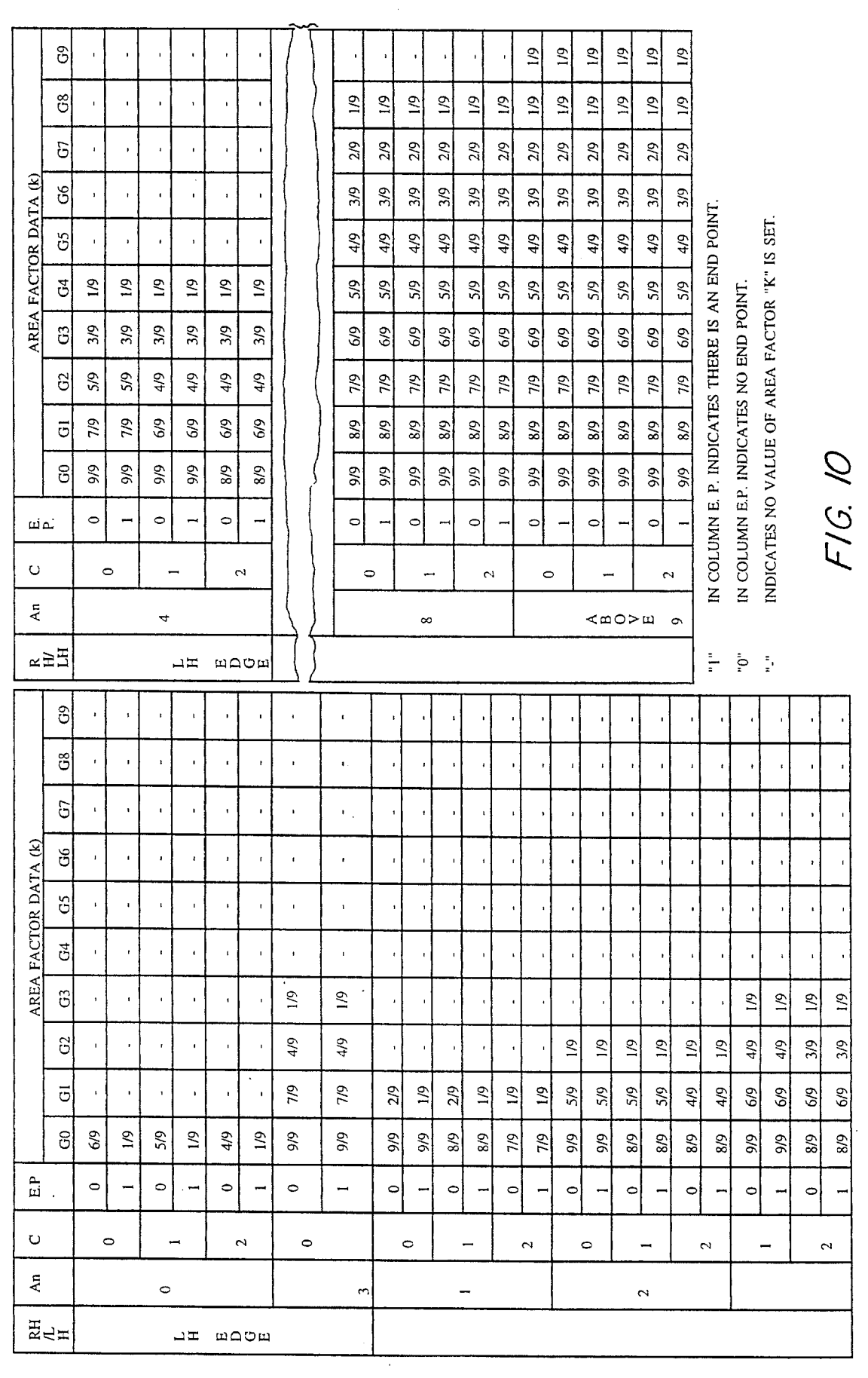

Similar to the above cases, the approximate area factors k in several cases are predetermined so that those approximate area factors k are stored in the LUT. A detailed description thereof will be omitted. These cases include a case (1) in which the edge-portion pixel is a left-hand edge of the image, the Xa is within the range of the pixel Z1 and the Xb pertains to the pixel Gn, a case (2) in which the edge-portion pixel is a right-hand edge of the image, the Xa is within the range of the pixel Z1 and the Xb pertains to the pixel Gn, a case (3) in which the edge-portion pixel is a left-hand edge of the image, the Xa is within the range of the pixel Z2 and the Xb pertains to the pixel Gn, and a case (4) in which the edge-portion pixel is a right-hand edge of the image, the Xa is within the range of the pixel Z2 and the Xb pertains to the pixel Gn. The approximate area factors k thus predetermined are given as the area factor data stored in the LUT as indicated in FIG. 10. In the LUT shown in FIG. 10, An is the number of edge-portion pixels indicating what pixel among the pixels G0 through G9 the Xb pertains to, and C' is the value of an approximate point that shows to what pixel among the pixels Z0 through Z2 the point Xa pertains.

In the present embodiment, the value C' of an approximate point is defined as follows:

C'=0: the x coordinate value is within the range of pixel Z0, for example, the value ranging from 0 to ⅓, C'=1: the x coordinate value is within the range of pixel Z1, for example, the value ranging from ⅓ to ⅔, C'=2: the x coordinate value is within the range of pixel Z2, for example, the value ranging from ⅔ to 1.

Figure 11:
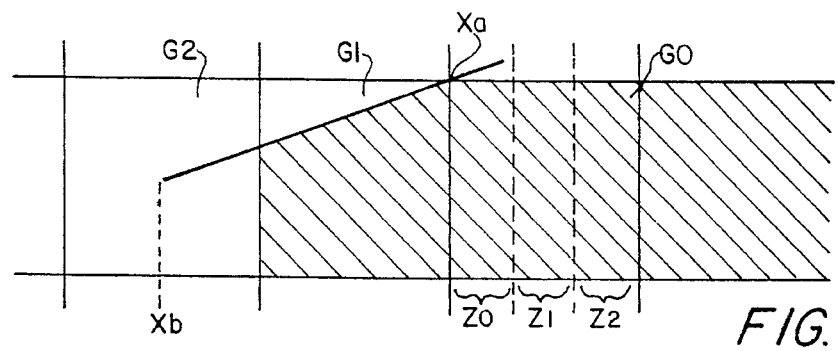
FIG. 11 is a diagram for explaining an antialiasing process carried out by the graphics processing apparatus shown in FIG. 6.

Also, in the present embodiment, the number An of pixels at an edge portion of the image being considered can be determined by an absolute value of (a−b), where "a" is an integer part of the x coordinate value Xa and "b" is an integer part of the x coordinate value Xb. In a special case in which there is an end point in the image being considered as shown in FIG. 11, it is impossible to determine the x coordinate value of an intersecting point corresponding to the Xb where the vector data is intersected by the scanline. Therefore, it is assumed in this special case that the x coordinate value of the end point is Xb, the number An of the edge-portion pixels is equal to the absolute value of (a–b) and the area factor K of the pixel which is the end point of the image is equal to the minimum value of 1/9. Thus, the area factor data previously stored in the LUT when there is no end point of the image (column E.P. of the LUT is "0") are predetermined separately from those when there is an end point of the image (the column E.P. is "1"). By using the LUT the contents of which are thus predetermined, the corresponding area factor data can be read out from the LUT on the basis of the edge type RH/LH, the number An of edge-portion pixels, the value C' of the approximate point and the presence of an end point. And, a plurality of approximate area factors k can be determined from the LUT for several edge-portion pixels G0 through G9 once at a time.

In the LUT shown in FIG. 10, only the LH edge cases are shown, but it is necessary to prepare a similar LUT in which RH edge cases are given. And, the number An of edge-portion pixels which is equal to 0 means that the edge-portion pixel is only one pixel. In the present embodiment, the value C' of the approximate point ranges from 0 to 2, and the number An of edge-portion pixels ranges from 0 to 9 (one among ten different pixels G0 through G9). However, the present invention is not limited to this embodiment, and may be applied to a modified example in which four different values of the C' and fifteen difference values of the An, for example are preset.

Figure 12:
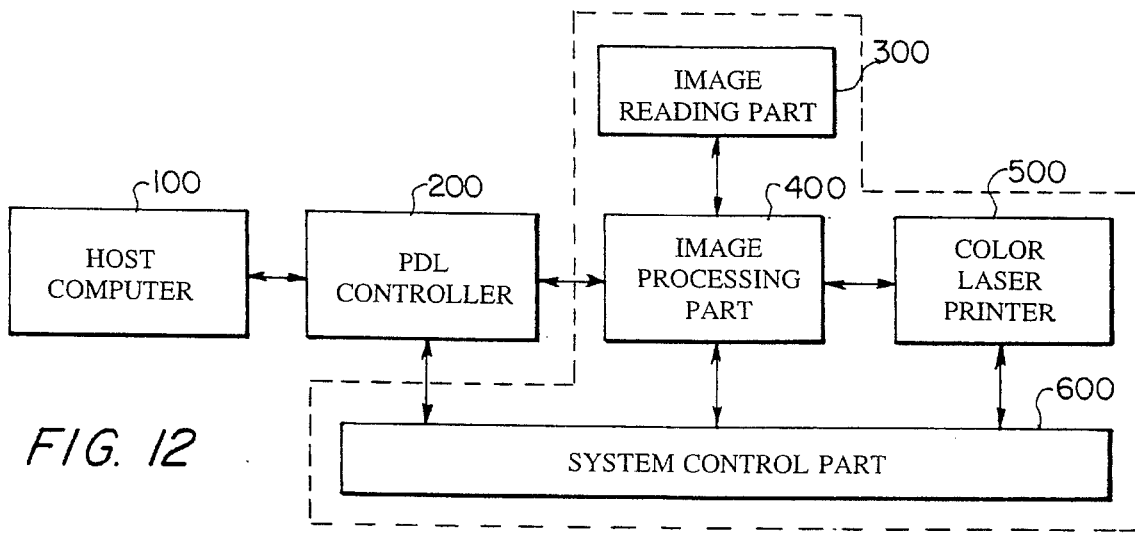
FIG. 12 is a block diagram showing a construction of an image forming system to which the first embodiment is applied.

Next, a description will be given of the construction of an image forming system in which the present invention is applied, with reference to FIG. 12. As shown in FIG. 12, this image forming system is constructed to perform not only an image forming of a vector data which is described in a prescribed Page Description Language (PDL) and is inputted from a DeskTop Publishing (DTP) system but also an image forming of an image data supplied from a document being scanned by means of an image reading part. This image forming system shown in FIG. 12 generally has a host computer 100, a PDL controller 200, an image reading part 300, an image processing part 400, a color laser printer 500 and a system control part 600. The host computer 100 makes a document which is described in a prescribed PDL language (for example, the so-called PostScript). The PDL controller 200 carries out an antialiasing of image information of the PDL language for each single page supplied from the host computer 100 and generates a RGB color image made up of red (R), green (G) and blue (B) from the image information. The image reading part 300 is provided for reading image information from a document through an optical scanning unit. The image processing part 400 carries out an image processing of the image information supplied from either the PDL controller 200 or the image reading part. A more detailed description of the image processing performed by the image processing part 400 will be given later. The color laser printer 500 carries out a printing of a multilevel tone image data outputted by the image processing part 400. And the system control part 600 controls each operation of these components including the PDL controller 200, the image reading part 300, the image processing part 400 and the color laser printer 500.

FIG. 12 shows the construction of the PDL controller 200 as shown in FIG. 12, and the PDL controller 200 generally has a receiving unit 201, a a central processing unit (CPU) 202, an internal system bus 203, a random access memory (RAM) 204, a read only memory (ROM) 205, a page memory 206, a a transmitting unit 207, and an input/output unit 208. The receiving unit 201 receives the image information, described in the PDL language, supplied from the host computer 100 to the PDL controller 200. The CPU 202 controls a storing of the PDL language image information received by the receiving unit 201 and carries out an antialiasing of the image information. The RAM 204 is provided to transfer the PDL language image information from the receiving unit 201 to the RAM 204 via the internal system bus 203. The ROM 205 is provided to store an antialiasing program for executing the antialiasing procedure and other control programs. The page memory 206 is provided to store a multilevel tone RGB color image data after an antialiasing process is carried out. The transmitting unit 207 transfers the multilevel tone RGB color image data stored in the page memory 206 to the image processing part 400. And, the I/O unit 208 is provided to carry out a receiving/transmitting of image information with the system control part 600.

By executing the antialiasing program stored in the ROM 205, the CPU 202 carries out an antialiasing of the PDL language image information received by the receiving unit 201, and the received image information is transferred from the receiving unit 201 to the RAM 204 via the the internal system bus 203. After the PDL language image information for a complete page is received and stored in the RAM 204, the CPU 202, in accordance with a prescribed operating flow as described below, carries out an antialiasing of a graphics data in the RAM 204, and then stores a multilevel tone RGB image data in three different plain memory parts of the page memory 206. The page memory 206 comprises a Red plain memory part, a Green plain memory part, a Blue plain memory part and a characteristic data memory part. Then, the data stored in the page memory 206 is transferred to the transmitting part 207, and the transferred data is supplied by the transmitting part 207 to the image processing part 400.

Figure 15:
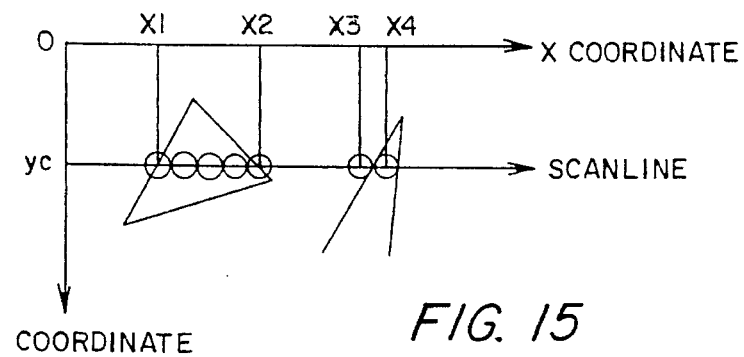
FIG. 15 is a diagram for explaining a segment shading.
Figure 13:
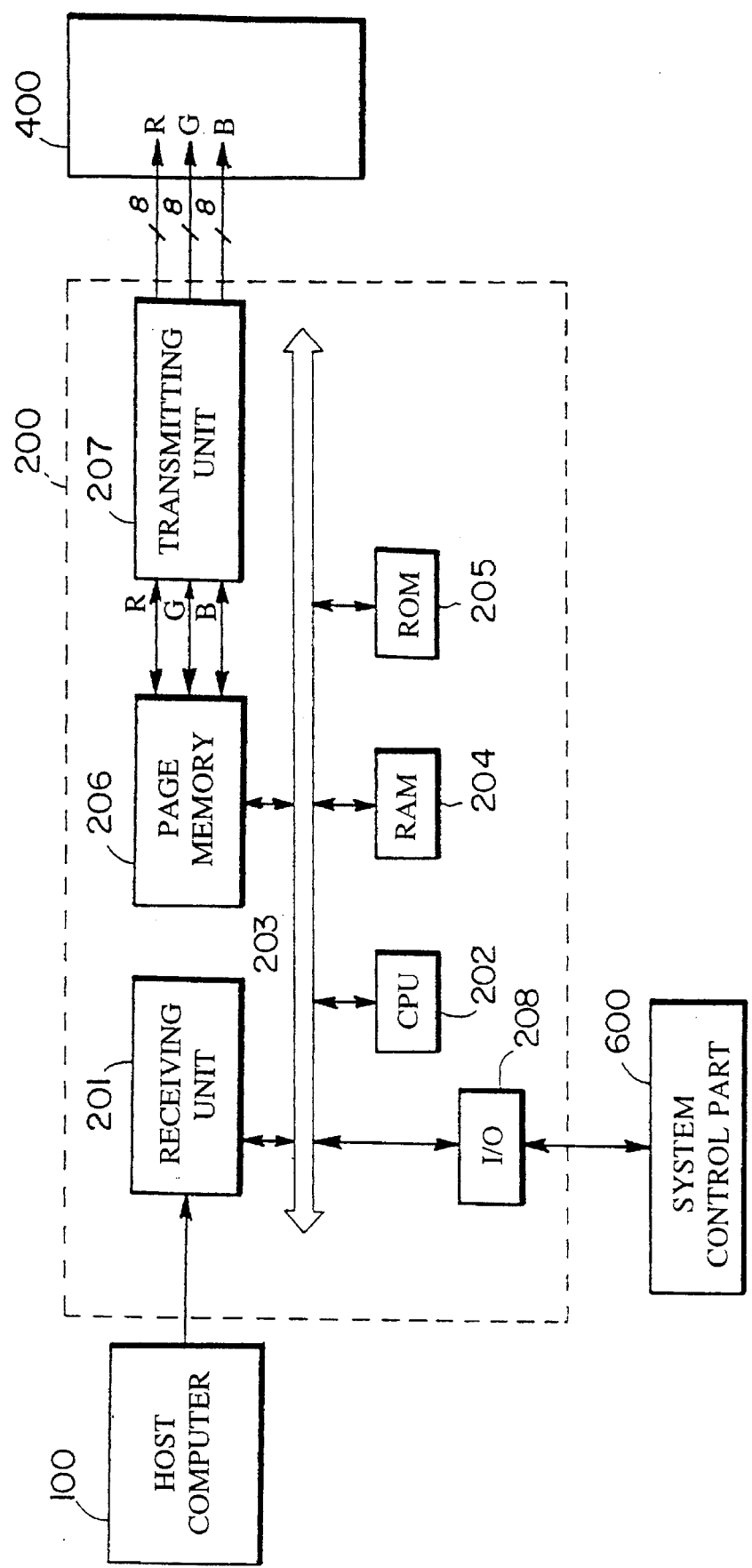
FIG. 13 is a block diagram showing a construction of a PDL controller of the first embodiment of the present invention.
Figure 14:
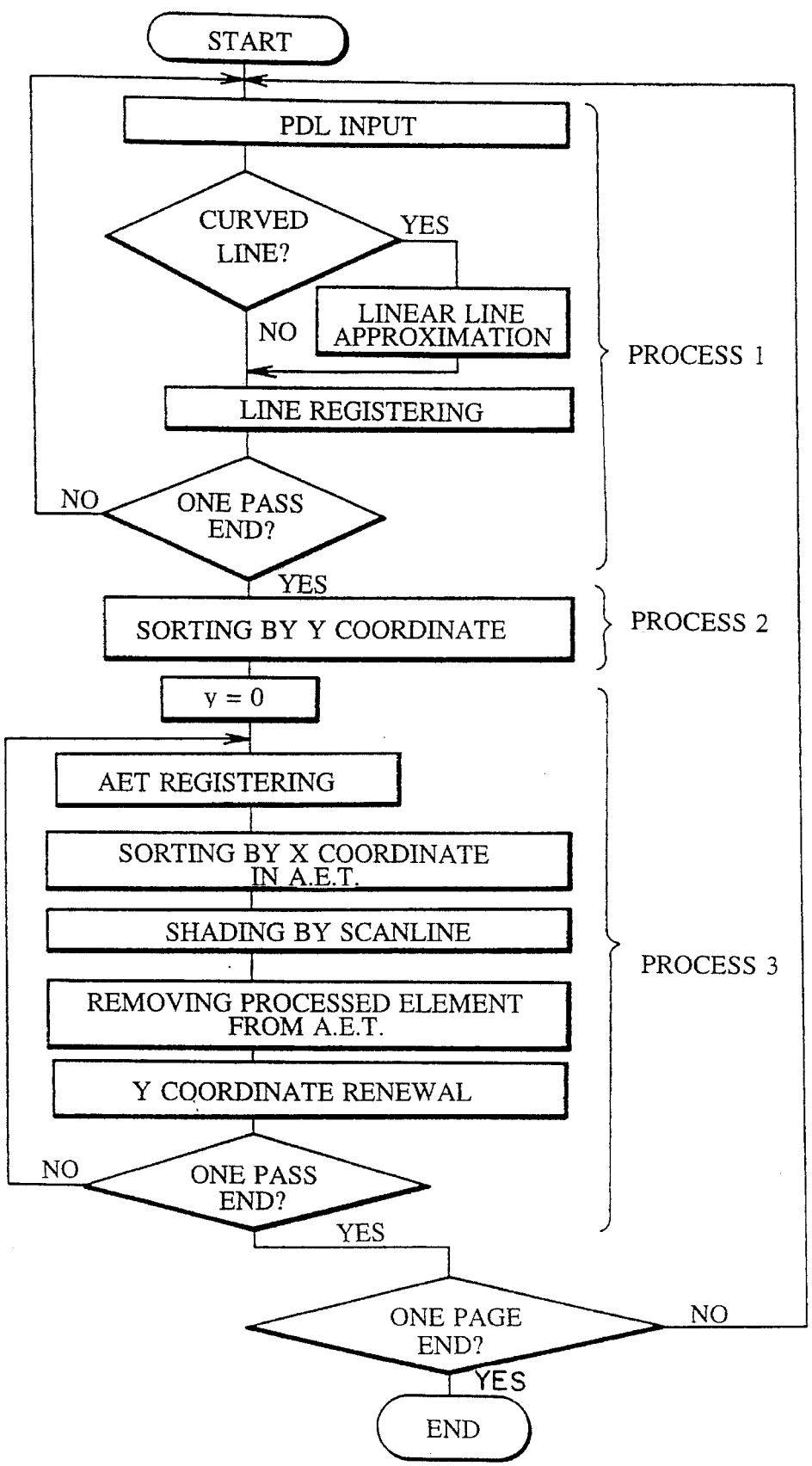
FIG. 14 is a flow chart for explaining the operation of the PDL controller shown in FIG. 13.

Referring now to FIGS. 14 and 15, a description will be given of the operation of the PDL controller 200. FIG. 14 is a flow chart for explaining the processing which is carried out by the CPU 202. As described above, the PDL controller 200 carries out an antialiasing of the PDL language image data supplied for each single page from the host computer 100 and produces a RGB color image made up of red, green and blue. This PDL language image data including a character data and a graphic data is all described as a vector data, and the PDL language image data is processed in a single page unit. Each one page of the PDL language image data is made up of at least one pass including one or more data elements (character elements or graphic elements). When the PDL language data is inputted, a data element in the inputted PDL language data is discriminated as to whether the data element is a curved line vector data. If the data element is a curved line vector data, then the curved line vector data is approximated to a linear line vector data, and this linear line vector data is stored and registered in a working area as a line element. This is repeated for all data elements in a complete pass. In a process 1 as shown in FIG. 14, the registering of line elements to the working area is performed for each single pass of the PDL language image data. In a process 2 shown in FIG. 14, the line elements registered in the working area are sorted in order of the y coordinate value of the starting point of each line element. In a process 3, while the y coordinate value is renewed one by one, a segment shading is carried out per scanline. For example, when a segment shading is performed for a pass indicated in FIG. 15, line elements of a graphic which are crossed by a scanline yc (the scanline yc in this example has no thickness) and values of x coordinates (in this example, these are x1, x2, x3 and x4) of points at an edge portion of the image where the scanline yc intersects the line elements are registered in an active edge table (AET). The sequence of line elements which are registered in the AET is in the same sequence as they are sorted in the process 1. It is not necessarily ensured that the values of x coordinates of the points crossed by the scanline yc are registered in ascending order. Therefore, after the registration to the AET is completed, the line elements registered in the AET are sorted again in ascending order of the value of x coordinate thereof. And, a segment shading is made between the first two elements registered in the AET. The segment shading is carried out so as to form a shaded portion of the image by the scanlines yc and yc+1. The antialiasing can be attained by adjusting the density and intensity of each pixel at the edge portion in accordance with the approximate area factor k. Then, the processed line element is removed from the contents of the AET, and the scanline is renewed, or the value of y coordinate being considered is renewed. The same procedure is repeated until all the line elements in the AET, or all the elements included in one pass are processed. And, the processes 1, 2 and 3 described above are repeated until all the passes included in one page are processed.

Figure 16:
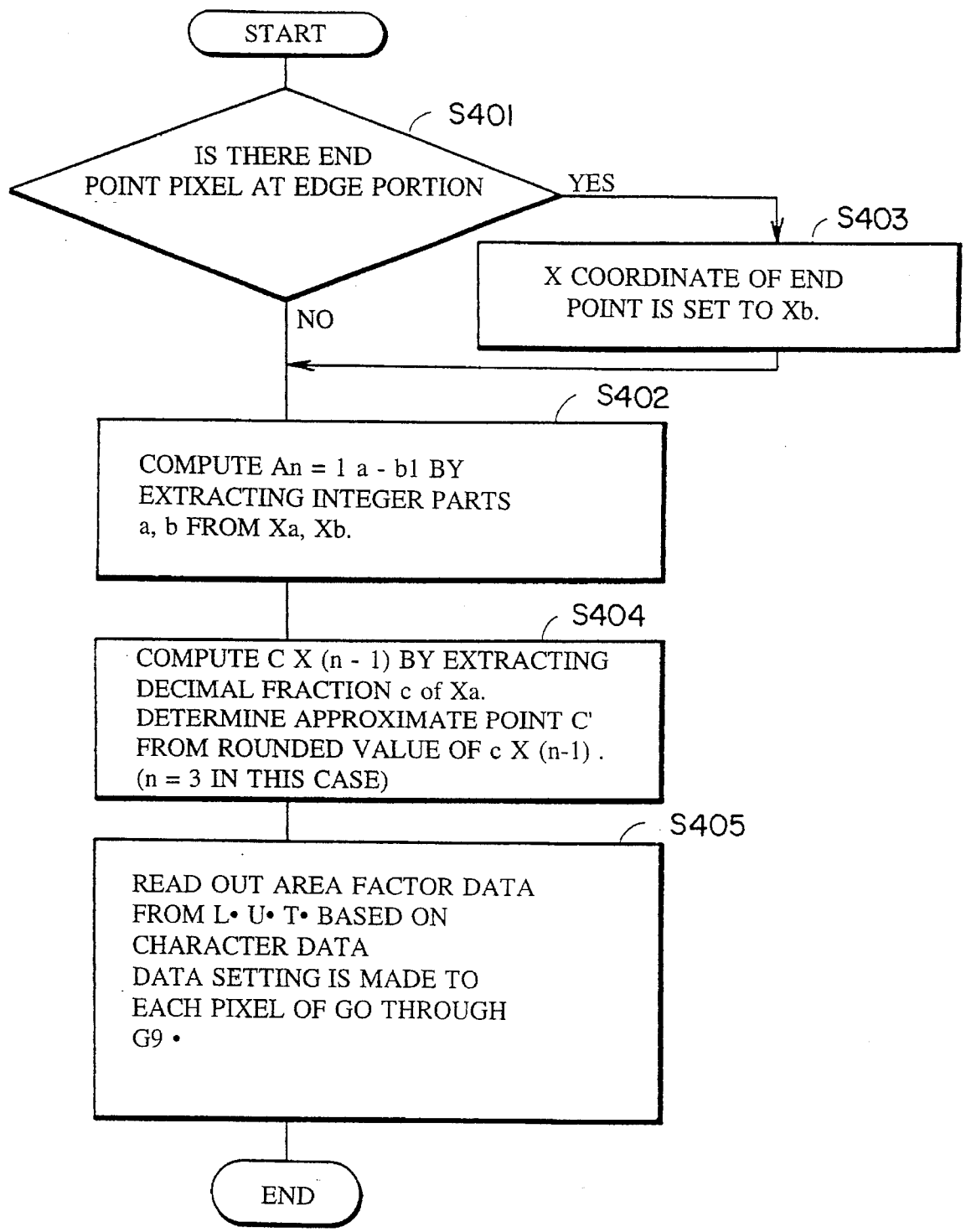
FIG. 16 is a flow chart for explaining the procedure of an antialiasing process of the first embodiment.

Referring next to FIGS. 16 and 17(A–B), a more detailed description will be given of the antialiasing process when the segment shading by scanline in the process 3 above is performed. It will now be assumed that an image data of a polygon ABCDE is inputted in the process 1 in FIG. 14 and this polygon data has the following data elements.

a) five line vectors defining lines AB, BC, CD, DE and EA (expressed in real number), b) color and intensity of the inner region of the polygon, The image data of the polygon is divided into seven line vectors each extending in a main scan direction, and the following information is assigned to each of these line vectors.

c) vector element data forming the starting point and the end point of each line vector (the coordinate value of the starting point of each line vector in a) above expressed in real number), d) inclination data of each vector element forming the starting point and the end point of each line vector, and e) character data of the starting point and the end point of each line vector (RH or LH edge, end point, line smaller than one dot, intersections, etc.)

When performing the segment shading by scanline, when a series of pixels are found at an edge portion of an image being considered, the antialiasing is carried out in accordance with the flow chart as shown in FIG. 16. In a step S401 as indicated in FIG. 16, a discrimination is made as to whether an end point of a vector data is included in the edge portion pixels. If there is no end point, then two x coordinate values Xa and Xb are determined and each integer part (a and b) of the x coordinate values Xa and Xb is extracted, and a computation of the number An of edge-portion pixels is then made, in a step S 402. On the other hand, if there is an end point of a vector data and the value Xa of x coordinate of only one point crossed by the scanline is found, then the value of x coordinate of the end point is set to Xb, in a step S403. And, in the step S402, two x coordinate values Xa and Xb are determined and each integer part ("a", "b") of the x coordinate values Xa and Xb is extracted and a computation of the number An of edge-portion pixels is made. In a step S404, a decimal fraction c is extracted from the Xa, a computation of c×(n–1) is performed, the value of c×(n–1) is rounded to the nearest integer, and the rounded value is converted into the value C' of the approximate point. Next, in a step S405, on the basis of the edge-portion pixel number An, the approximate point value C' and the character data assigned to the polygon data as in the item e) above, the corresponding area factor data is read out from the contents of the lookup table LUT as illustrated in FIG. 10, so that an approximate area factor k is assigned to each pixel of the edge-portion pixels G0 through G9.

A subroutine for carrying out this procedure of the flow chart shown in FIG. 16 is called in a case where a series of pixels are found at an edge portion when carrying out the segment shading process which is indicated by the process 3 shown in FIG. 14. The CPU 202 repeats the above procedure until the final pixel of the scanline is processed, and simultaneously renews the contents of the item d) above on the basis of the information of the item c) above. By carrying out the antialiasing process in such a manner, the approximate area factors k for the polygon data shown in FIG. 17(a) can be produced, and these approximate area factors k are as shown in FIG. 18.

When the polygon data is obtained with a background color in white (maximum intensity: 255) and a graphic color in red (maximum intensity: 255), for example, the values of intensity Kr, Kg and Kb for red (R), green (G) and blue (B) in the polygon, respectively, can be determined by the following formulas from the values of the approximate area factors k as shown in FIG. 18.

$$Kr = Kr1 \times k + Kr2 \times (1-k)$$

$$Kg = Kg1 \times k + Kg2 \times (1-k)$$

$$Kb = Kb1 \times k + Kb2 \times (1-k)$$

In these formulas, Kr1, Kg1 and Kb1 are the values of intensity for red, green and blue which are given from the item b) above, respectively, and Kr2, Kg2 and Kb2 are the values of intensity which are previously applied to the corresponding pixel. And, these Kr2, Kg2 and Kb2 are obtained by reference to information stored in the three plain memory parts of the page memory 206. The thus determined values of intensity Kr, Kg and Kb are stored in the Red plain memory part, the Green plain memory part and the Blue plain memory part, respectively, which are included in the page memory 206. An example of the intensity values Kr, Kg and Kb respectively stored in the three plain memory parts is shown in FIG. 19(a), (b) and (c). For reference purpose, the RGB color image data when no antialiasing process is performed is shown in FIG. 20(a), (b) and (c).

Figure 21:
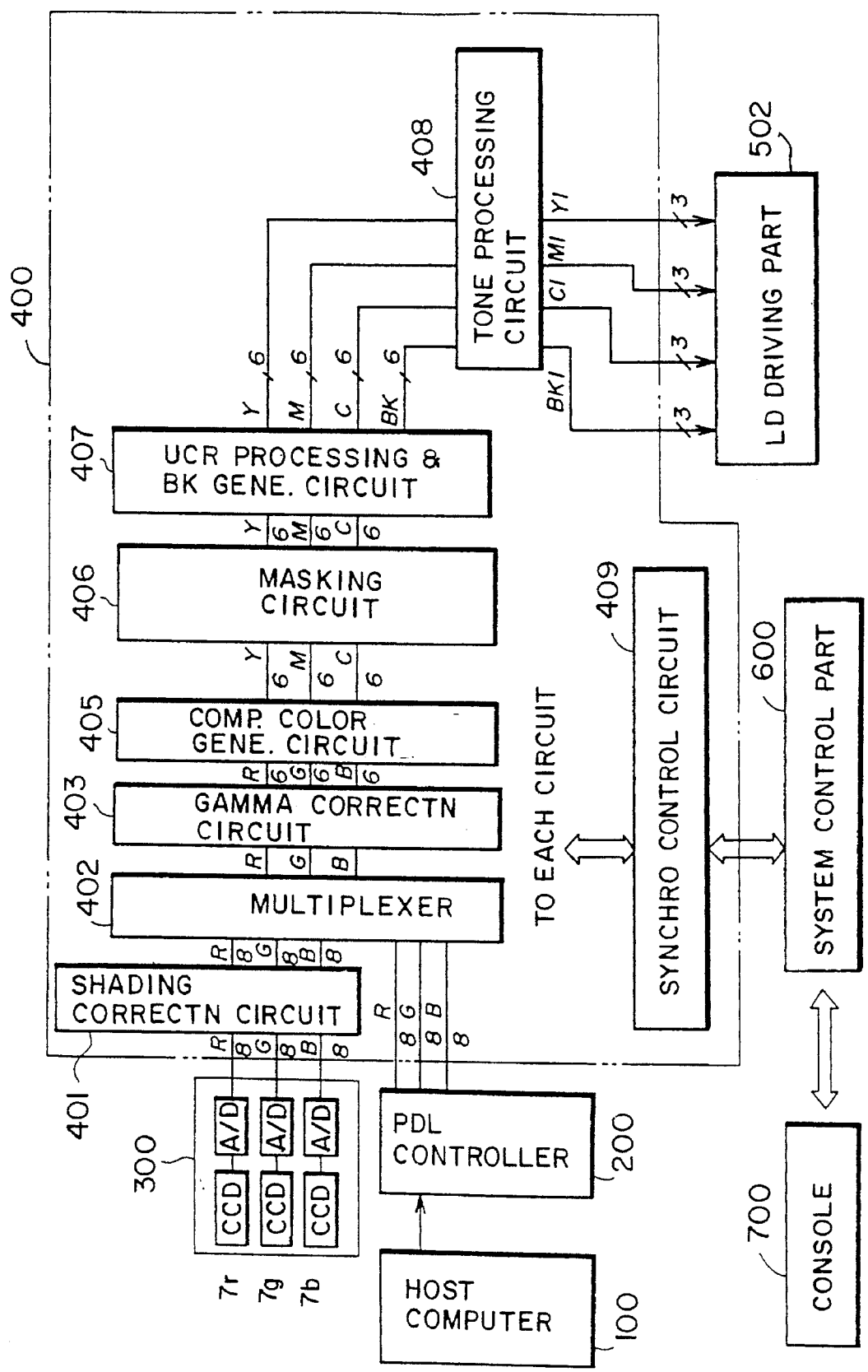
FIG. 21 is a block diagram showing a construction of an image processing apparatus according to the present invention.

Next, a description will be given of the construction and operation of the image processing part 400, with reference to FIG. 21. As shown in FIG. 21, this image processing part 400 transforms three different image signals, each being inputted by three image sensing parts CCD 7r, CCD 7g and CCD 7b which are provided within the image reading part 300, into four recording signals BK (black), Y (yellow), M (magenta) and C (cyan), which are all required to carry out an image recording. Also, the image processing part 400 transforms the RGB image data, supplied by the PDL controller 200 described above, into four recording signals BK (black), Y (yellow), M (magenta) and C (cyan). There are two operation modes which are used by the image forming system, one being hereinafter called a copying mode and in this copying mode an image signal is inputted from the image reading part 300, and the other being hereinafter called a graphics mode in which a RGB image data is inputted from the PDL controller 200.

As shown in FIG. 21, the image processing part 400 generally has a shading correction circuit 401, a multiplexer 402, a gamma correction circuit 403, a complement color generating circuit 405, a masking circuit 406, a UCR processing and black generating circuit 407, a tone processing circuit 408 and a synchronization control circuit 409. The shading correction circuit 401 is provided for inputting 8-bit color tone data which are converted from signals outputted from the CCDs 7r, 7g and 7b in the image reading part 300 and for correcting irregularities in illuminance of the color tone data inputted and variations of sensitivities of internal terminals of the CCDs 7r, 7g and 7b. The multiplexer 402 is provided for outputting selectively the 8-bit color tone data supplied from the shading correction circuit 401 in the above copying mode or the RGB image data outputted from the PDL controller 200 in the graphics mode. The gamma correction circuit 403 is provided for receiving the 8-bit color tone data from the multiplexer 402 and for changing a multilevel tone suitable for the characteristics of a photosensitive medium so that a 6-bit image data is outputted. The complement color generating circuit 405 is provided for transforming a 6-bit color tone data for each of red (R), green (G) and blue (B), supplied from the gamma correction circuit 403, into a 6-bit complement color tone data for each of cyan (C), magenta (M) and yellow (Y) which are respectively a complement color of the corresponding color. The masking circuit 405 carries out a prescribed masking of a 6-bit tone data for each of cyan, magenta and yellow, supplied from the complement color generating circuit 406. The UCR processing and black generating circuit 407 carries out a UCR processing of each 6-bit tone data (C, M, R) after the masking is performed, supplied from the masking circuit 405, and generates a 6-bit black tone data which is supplied to the tone processing circuit 408. The tone processing circuit 408 converts a 6-bit tone data for each of yellow, magenta, cyan and black, supplied from the UCR processing and black generating circuit 407, into a 3-bit tone data for each of Y1, M1, C1 and BK1. and these 3-bit tone data Y1, M1, C1 and BK1 are supplied to a laser driving part 502 provided within the multilevel tone color laser printer 500. And, the synchronization control circuit 409 is provided for controlling operation of the respective circuits in the image processing part 400 in synchronism.

In addition, the gamma correction circuit 403 is usually arranged so as to freely change the number of multilevel tone levels by depressing a prescribed key on the console 700. As the algorithm used by the tone processing circuit 408, the prior multilevel dither process or the prior multilevel error diffusion process may be applied to the gamma correction circuit 408. For example, in a case where the dither process is applied with a 3×3 dither matrix used, the number of tone levels assigned to each pixel which is provided by the multilevel color laser printer 500 can be represented by 3×3×8=72, and such a multilevel tone image can be provided by the color laser printer 500.

A data conversion which is performed in the masking process by the masking circuit 406 is represented by the following formula:

$$\begin{bmatrix} Yo \\ Mo \\ Co \end{bmatrix} = \begin{bmatrix} a11 & a12 & a13 \\ a21 & a22 & a23 \\ a31 & a32 & a33 \end{bmatrix} \begin{bmatrix} Yi \\ Mi \\ Ci \end{bmatrix} \quad (1)$$

In this formula, Yi, Mi and Ci are input data prior to the masking process, and Yo, Mo and Co are output data after the masking process is completed.

A UCR processing which is carried out by the UCR processing and black generating circuit 407 is represented by the following formula:

$$\begin{bmatrix} Yo' \\ Mo' \\ Co' \\ BKo' \end{bmatrix} = \begin{bmatrix} a11' & a12' & a13' \\ a21' & a22' & a23' \\ a31' & a32' & a33' \\ a41' & a42' & a43' \end{bmatrix} \begin{bmatrix} Yo \\ Mo \\ Co \end{bmatrix} \quad (2)$$

In the present embodiment, a set of new coefficients are predetermined by calculating the products of a coefficient matrix of the formula (1) and a coefficient matrix of the formula (2), which is given as follows.

$$\begin{bmatrix} Yo' \\ Mo' \\ Co' \\ BKo' \end{bmatrix} = \begin{bmatrix} a11' & a12' & a13' \\ a21' & a22' & a23' \\ a31' & a32' & a33' \\ a41' & a42' & a43' \end{bmatrix} \begin{bmatrix} a11 & a12 & a13 \\ a21 & a22 & a23 \\ a31 & a32 & a33 \end{bmatrix} \begin{bmatrix} Yi \\ Mi \\ Ci \end{bmatrix} \quad (3)$$

$$\begin{bmatrix} Yo' \\ Mo' \\ Co' \\ BKo' \end{bmatrix} = \begin{bmatrix} a11'' & a12'' & a13'' \\ a21'' & a22'' & a23'' \\ a31'' & a32'' & a33'' \\ a41'' & a42'' & a43'' \end{bmatrix} \begin{bmatrix} Yi \\ Mi \\ Ci \end{bmatrix}$$

The set of new coefficients given in a coefficient matrix of the formula (3) above are predetermined to carry out the masking process and the UCR process simultaneously. And, using the set of the coefficients of the formula (3), 6-bit output data (Yo', Mo', Co' and BKo') can be calculated by this formula (3) from predetermined 6-bit input data (Yi, Mi and Ci) which are supplied from the masking circuit 406, and the calculated output data which are resulted from the masking and UCR processes are stored in a prescribed memory. In the present embodiment, the masking circuit 406 and the UCR processing and black generating circuit 407 are formed as a pair of read only memories ROM). A set of 6-bit input data (Y, M, C) from the ROM of the masking circuit 406 are used as the address data specifying the corresponding output data stored in the ROM of the UCR processing and black generating circuit 407, and the output data (Y, M, C, BK) from the ROM of the circuit 407 is supplied to the circuit 408.

Generally speaking, the masking circuit 406 performs a correction of the signals Y, M, C in accordance with the spectral and reflection characteristics of color toners suitable for forming a recording image, and the UCR processing and black generating circuit 407 carries out a correction of color balance of the recording image when yellow, magenta and cyan color toners are overlapped. The black color signal BK supplied from the circuit 407 is generated by combining together three color signals Y, M, C inputted by the masking circuit 406, and the three color signals Y, M, C outputted by the circuit 407 are given by reducing a component of the black color signal from each of the color signals Y, M, C being inputted. The gamma correction circuit 403 performs a gamma correction in accordance with the input/output conversion chart as shown in FIG. 22, and the complement color generating circuit 405 generates complement color data in accordance with the input/output conversion charts as shown in FIG. 23 (a), (b), (c). That is, a red input data R inputted to the circuit 405 is converted into a cyan output data C in accordance with the input/output conversion chart shown in FIG. 23(a), a green input data G inputted to the circuit 405 is converted into a magenta output data M in accordance with the chart shown in FIG. 23(b), and a blue input data B inputted to the circuit 405 is converted into a yellow output data Y in accordance with the chart shown in FIG. 23 (c). The following formula shows an example of the set of coefficients in the formula (3) which may be applied to the masking process and the UCR and black generating processes.

$$\begin{bmatrix} Yo' \\ Mo' \\ Co' \\ BKo' \end{bmatrix} = \begin{bmatrix} 1 & 0 & 0 \\ 0 & 1 & 0 \\ 0 & 0 & 1 \\ 0 & 0 & 0 \end{bmatrix} \begin{bmatrix} Yi \\ Mi \\ Ci \end{bmatrix} \quad (4)$$

Figures 25, 28:
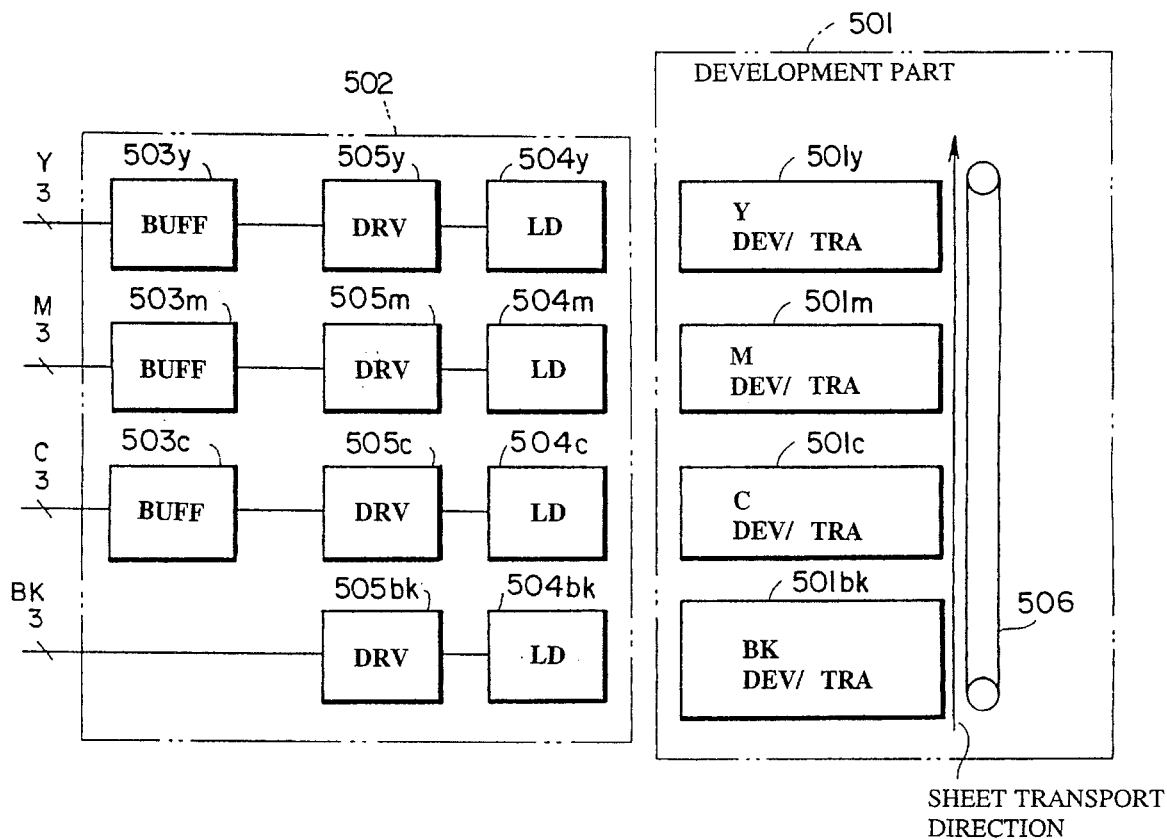
FIG. 25 is a diagram showing a 3×3 Bayer multilevel dither matrix.
FIG. 28 is a block diagram showing a construction of a multilevel tone color laser printer.
Figures 26A, 26B, 26C, 26D:
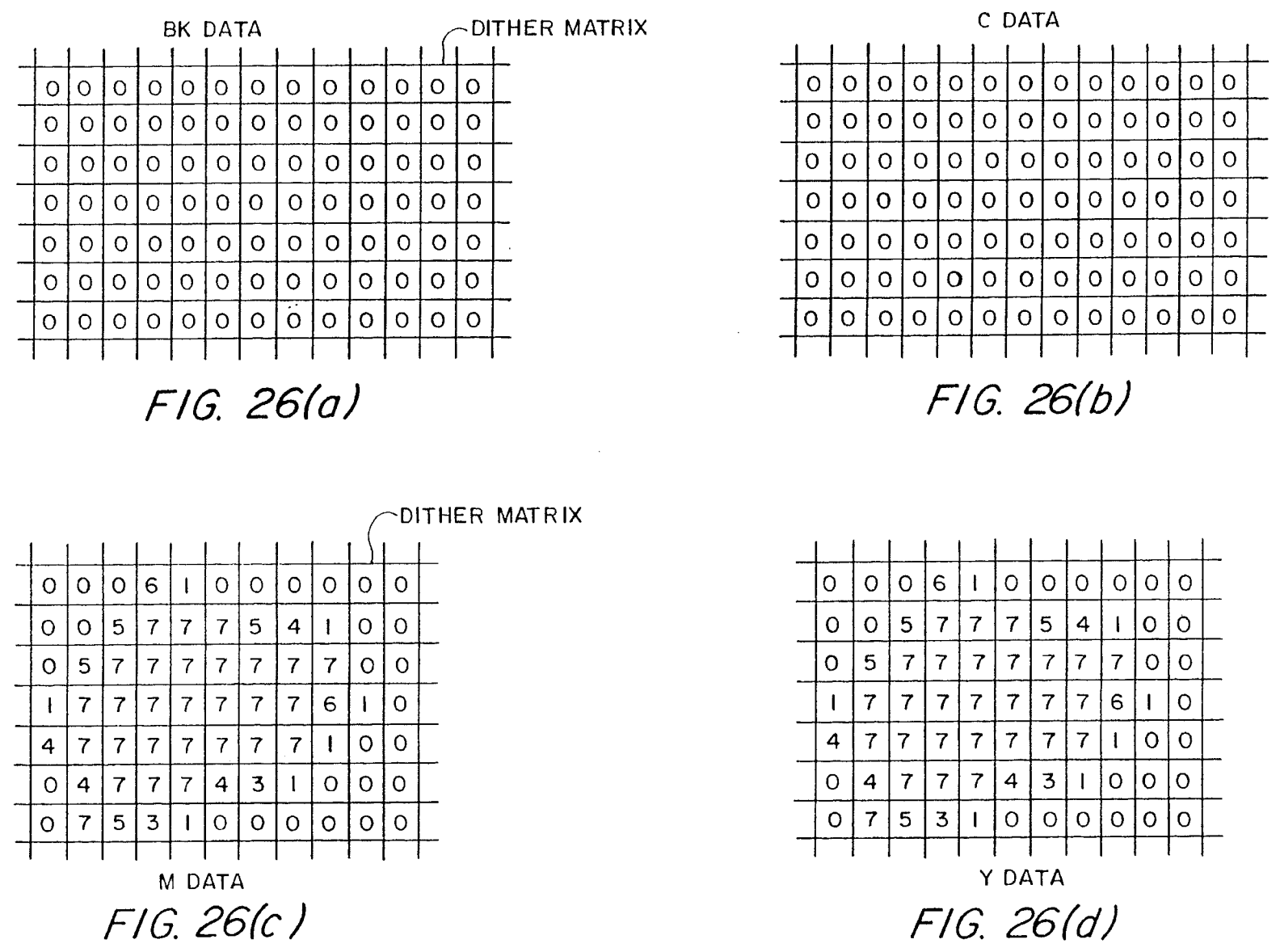
Figures 27A, 27B, 27C, 27D:
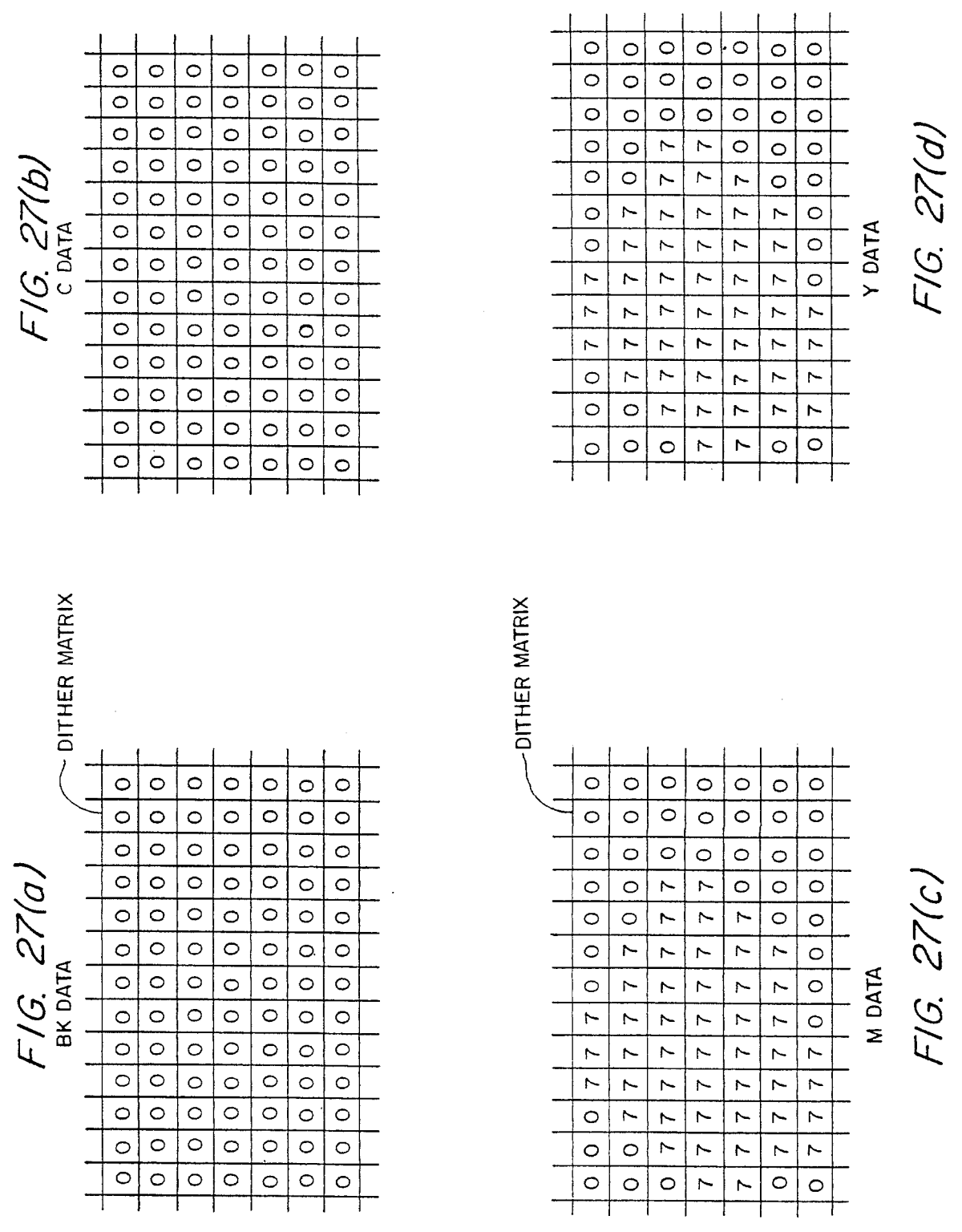

For convenience' sake, a description will now be given of a typical case in which the masking, the UCR processing and the black generating are carried out by means of the circuits 406, 407 by applying the formula (4) above. In this case, the RGB image data stored respectively in the R, G, B plain memory parts of the page memory 206 as shown in FIG. 19(a) to (c) are converted into the BK, C, M, Y image data as shown in FIG. 24(a) to (d) through the gamma correcting, the complement color generating, the masking, the UCR processing and the black generating which are respectively carried out by the circuits 403, 405, 406, 407. In addition, it is assumed that 3×3 Bayer multilevel dither matrix as shown in FIG. 25 is applied to the tone processing circuit 408 for carrying out a tone processing, and then the BK, C, M, Y image data as shown in FIG. 24 (a) to (d) are converted into those corresponding image data as shown in FIG. 26(a) to (d) by the tone processing circuit 408. And, for comparison purpose, another example of the processed image data is given. the RGB image data for which no antialiasing is performed as shown in FIG. 20(a) to (c) are converted by the image processing part 400 into the BK, C, M, Y image data as shown in FIG. 27(a) to (d).

Next, a description will now be given of the construction and operation of the multilevel color laser printer which is used in the image forming system. As shown in FIG. 28, this multilevel color laser printer 500 generally has a development part 501 and a laser driving part 502. The development part 501 charges uniformly a surface of a photosensitive drum, forms a latent image by exposure of a laser beam over the charged surface of the photosensitive drum, develops the latent image on the photosensitive drum surface by a toner, and transfers the developed image from the photosensitive drum surface to a recording sheet. This development part 501 includes a black developing/transfer portion 501*bk* for carrying out a development and transfer of a black data BK, a cyan developing/transfer portion 501*c* for carrying out a development and transfer of a cyan data C, a magenta developing/transfer portion 501*m* for carrying out a development and transfer of a magenta data M, and a yellow developing/transfer portion for carrying out a development and transfer of a yellow data Y.

The laser driving part 502 shown in FIG. 28 is provided for receiving four kinds of 3-bit Y, M, C, BK image density data, supplied from the above described image processing part 400, and for supplying a set of multilevel tone color laser beams. This laser driving part 502 comprises three buffer memories 503*y*, 503*m*, 503*c* which store respectively the 3-bit Y, M, C image density data received from the image processing part 400, four laser diodes 504*y*, 504*m*, 504*c*, 504*bk* which generate the respective laser beams corresponding to the image density data Y, M, C, BK, and four drivers 505*y*, 505*m*, 505*c*, 505*bk* which drive respectively the laser diodes 504*y*, 504*m*, 504*c*, 504*bk*.

Figure 29:
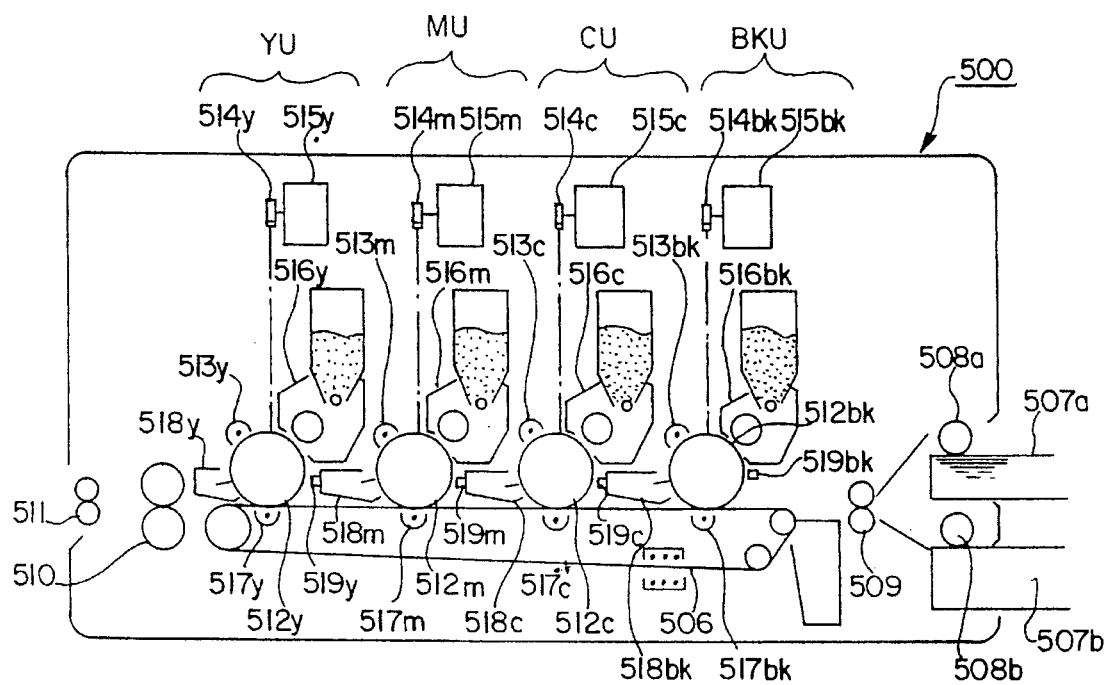
FIG. 29 is a diagram showing the construction of the multilevel tone color laser printer.

In FIG. 29, a more detailed construction of the multilevel tone color laser printer 500 is shown. As shown, the multilevel tone color laser printer 500 is comprised of a black recording unit BKU having the black developing/transfer portion 501*bk*, the laser diode 504*bk* and the driver 505*bk*, a cyan recording unit CU having the cyan developing/ transfer portion 501*c*, the laser diode 504*c*, the driver 504*c* and the buffer memory 503*c*, a magenta recording unit MU having the magenta developing/transfer portion 501*m*, the laser diode 504*m*, the driver 505*m* and the buffer memory 503*m*, and a yellow recording unit YU having the yellow developing/transfer portion 501*y*, the laser diode 504*y*, the driver 504*y* and the buffer memory 503*y*. These recording units, as shown in FIGS. 28 and 29, are arranged along a sheet transport belt 506 which transports a recording sheet in a sheet transport direction as indicated by an arrow in FIG. 28. These recording units are aligned in the sheet transport direction along the sheet transport belt 506 in order of the BKU, the CU, the MU and the YU. As being apparent from this arrangement of the recording units, the laser diode in which the exposure is first started while an image is recorded on the same recording sheet is the laser diode 504*bk* of the black recording unit BKU, the laser diode in which the exposure is finally started is the laser diode 504*y* of the yellow recording unit YU. Thus, there is a difference in time at which the exposure is started between these laser diodes. To hold the recording data supplied from the image processing part 400 while the exposure is made in other laser diodes, the buffer memories 503*y*, 503*c*, 503*m* are provided in the laser driving part 502 for storing a yellow data, a cyan data, a magenta data, respectively.

Next, a description will now be given of a more detailed construction of the multilevel tone color laser printer 500, with reference to FIG. 29. The multilevel tone color laser printer 500 comprises the sheet transport belt 506 for transporting a recording sheet in the sheet transport direction, the four recording units BKU, CU, MU, YU which are arranged in this order along the sheet transport belt 506, two paper cassettes 507*a*, 507*b* which each contain a plurality of recording sheets of different size, a pair of paper feeding rollers 508*a*, 508*b* a pair of registration rollers 509 for carrying out a alignment or positioning of recording sheets fed from the paper feeding rollers 508*a*, 508*b*, a pair of fixing rollers for fixing a transferred color image to the recording sheet after the recording sheet is transported through the BKU, the CU, the MU and the YU by the paper transport belt 506, and a pair of ejection rollers 511 for ejecting the recording sheet to a prescribed ejection part (not shown) out of the printer 500. The yellow recording unit YU comprises a photosensitive drum 512*y*, a charger 513*y* for charging uniformly the photosensitive drum 512*y*, a polygonal mirror 514*y* for directing a laser beam to the photosensitive drum 512*y*, a motor 515*y* for rotating the polygonal mirror 514*y*, a yellow toner developer 516*y* for developing an electrostatic latent image formed on the photosensitive drum surface using a yellow toner, a transfer charger 517*y* for transferring a developed toner image to a recording sheet, and a cleaning unit 518*y* for removing a residual toner on the photosensitive drum surface after the image transfer. A CCD line sensor 519*y* is provided for reading a prescribed pattern which is provided on the photosensitive drum surface, and by means of the CCD lines sensor 519*y* a processing state of the multilevel tone color laser printer 500 can be detected.

Figure 30A:
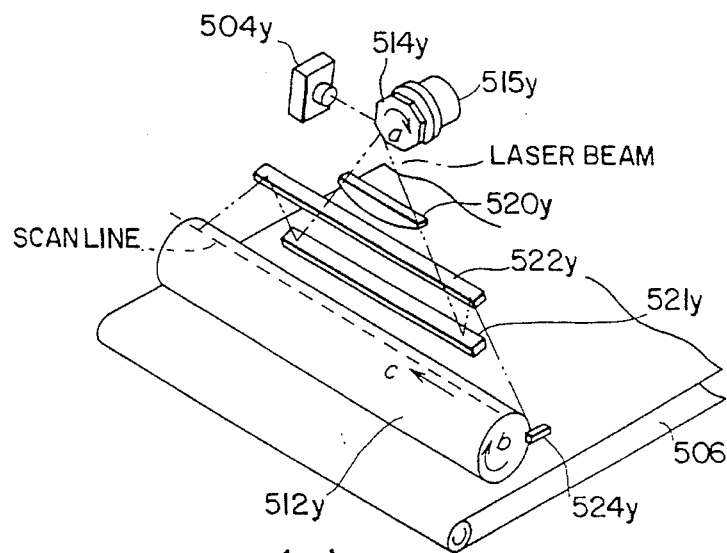
FIGS. 30(a) and 30(b), which may collectively be referred to herein as FIG. 30, are diagrams showing a construction of a yellow recording unit of the multilevel tone color laser printer.
Figure 30B:
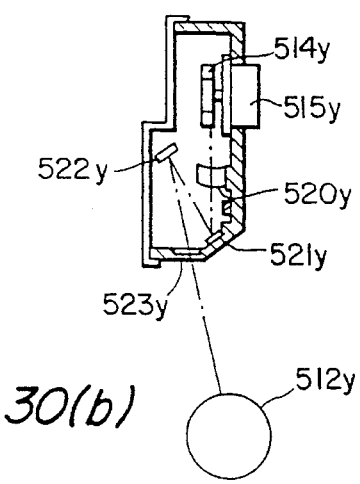
Figure 31:
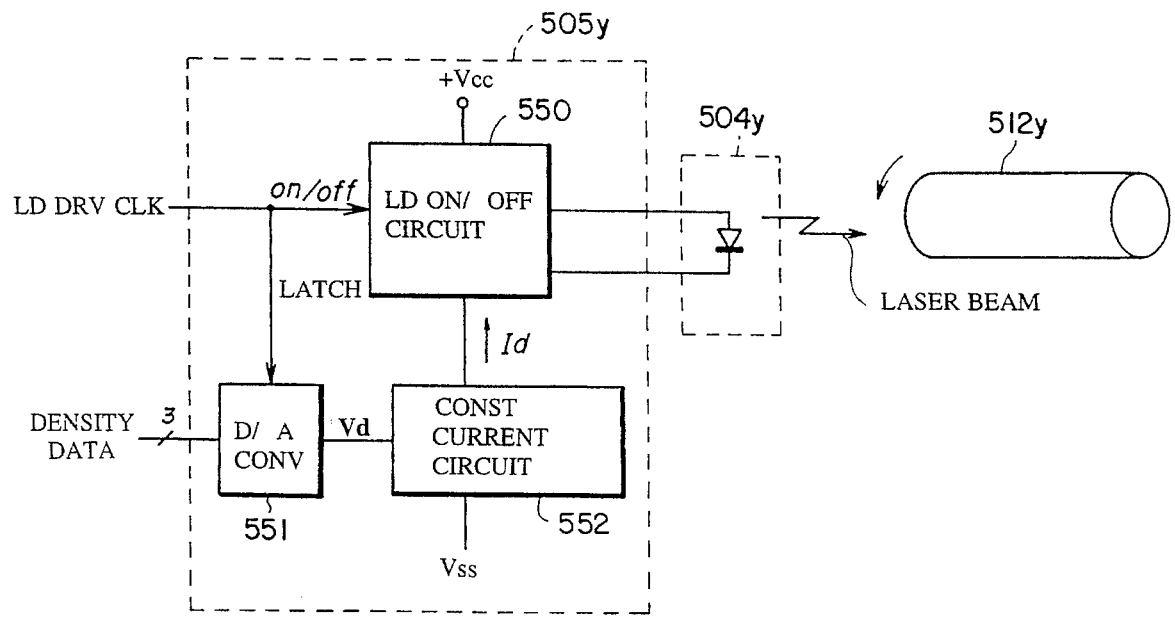
FIGS. 31 through 34 are diagrams for explaining a multilevel tone generating by a power modulation technique.

And, a description will be given of the operation of the yellow recording unit YU when the exposure, the development and the image transfer are carried out, with reference to FIG. 30(a), (b). As shown in FIG. 30, a laser beam emitted from the laser diode 504*y* is reflected on a surface of the polygonal mirror 514*y*, passes through a f-θ lens 520*y*, and is further reflected on mirrors 521*y*, 522*y*, so that the laser beam is irradiated to the photosensitive drum 512*y* through a dustproof glass 523*y*. This laser beam irradiated scans the photosensitive drum 512y along a scanline in a direction parallel to a longitudinal direction of the photosensitive drum as the polygonal mirror 514y is rotated at a constant rate by a motor 515y in a direction as indicated by an arrow a in FIG. 30(a). The direction, as indicated by an arrow c in FIG. 30(a) in which the laser beam scans the photosensitive drum 512y along a scanline is hereinafter called a main scan direction, and the photosensitive drum 512y is scanned per scanline by the laser beam in this main scan direction. And, as the photosensitive drum 512y is rotated around its longitudinal axis in a direction indicated by an arrow b in FIG. 30(a), the photosensitive drum is scanned per scanline by the laser beam in a direction perpendicular to the main scan direction. This direction is hereinafter called a sub scan direction. In the present embodiment, a photodetector 524y shown in FIG. 30(a) is provided at a portion of the photosensitive drum 512y, where no exposure by the laser beam is intended, for detecting a reference position of the photosensitive drum 512y in the main scan direction per scanline. The laser diode 504y is actuated or driven for laser light emission on the basis of a 3-bit recording data, supplied from the image processing part 400, and a multilevel tone recording on the photosensitive drum 512y in accordance with the 3-bit recording data is carried out through the exposure by the laser beam emitted from the laser diode 504y. The surface of the photosensitive drum 504y is uniformly charged by the charger 513y previously, and an electrostatic latent image corresponding to an image from an original document is formed on the photosensitive drum surface by the exposure described above. The electrostatic latent image is developed by the yellow toner developer 516y by a yellow toner so as to make a yellow toner image on the photosensitive drum surface. The yellow toner image is transferred to a recording sheet which is transported by the paper transport belt 506. This recording sheet is fed by the feeding roller 508a or 508b from the paper cassette 507a or 507b, and is supplied by the registration rollers 509 to a portion of the paper transport belt 506, where the black recording unit BKU is provided, at a timing in synchronism with when a toner image formation is performed by the black recording unit BKU.

The construction and operation of the magenta recording unit MU, the cyan recording unit CU and the black recording unit BKU when the exposure, the development and the image transfer are carried out is the same as that of the yellow recording unit YU, and a description thereof will be omitted. The black recording unit BKU has a black toner developer 516bk for performing a formation and transfer of a black toner image. The cyan recording unit CU has a cyan toner developer 516c for performing a formation and transfer of a cyan toner image. And, the magenta recording unit MU has a magenta toner developer for performing a formation and transfer of a magenta toner image.

Next, a description will be given of the multilevel tone generation controlled by a laser diode driver, with reference to FIGS. 31 through 34. The drivers 505y, 505m, 505c, 505bk are provided in the multilevel tone color laser printer 500 for controlling a multilevel tone generation made by the laser diodes 504y, 504m, 504c, 504bk, respectively, on the basis of the 3-bit Y, M, C, BK data supplied from the image processing part 400. Generally, there are two major conventional techniques which are widely used for controlling the driving of a laser diode, that is, a power modulation technique and a pulse width modulation technique. In the present embodiment, the power modulation technique for example is applied for this purpose. Only the construction of the driver 505y and the laser diode 504y is described as a typical example in the following. As the drivers 505y, 505m, 505c, 505bk and the laser diodes 504y, 504m, 504c, 504bk each have the same construction, a description of other drivers and other laser diodes will be omitted.

Figure 32:
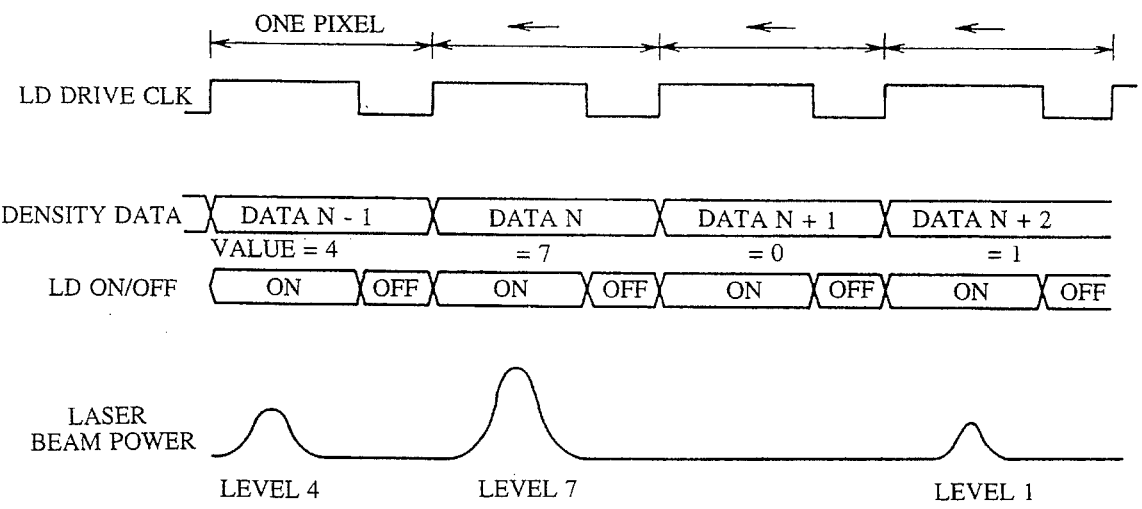

As shown in FIG. 32, a laser diode on/off circuit 550 in the driver 505y turns the laser diode 504y ON and OFF in accordance with a prescribed drive clock signal LD DRV CLK supplied to the circuit 550. The driver 505y has also a digital-to-analog converter 551 which converts the 3-bit image density data (which is the Y data in this case) into an analog signal Vd indicative of the value of image density. And, the driver 505y includes a constant current supplying circuit 552 which receives the analog signal Vd from the digital-to-analog converter 551 and supplies a drive current Id for driving the laser diode 504y to the laser diode on/off circuit 550. When the drive clock signal LD DRV CLK is at a high level, the laser diode 540y is turned ON by the laser diode on/off circuit 550. Once the drive clock signal LD DRV CLK changes from a high level to a low level, the laser diode 540y is turned OFF. The power of a laser beam outputted from the laser diode 504y is proportional to the magnitude of the drive current Id supplied by the constant current supplying circuit 552. By generating the drive current Id in accordance with the 3-bit image density data, it is possible to make the power of a laser beam outputted by the laser diode 504y be in accordance with the image density data. As apparent from FIG. 32, when an image density N-1 having a density value of 4, for example, is supplied, the constant current supplying circuit 552 supplies a drive current Id corresponding to the image density value of 4 to the circuit 550 so that the power of a laser beam outputted by the laser diode 504y is at a level corresponding to level-4. And, when an image data N with a density value of 7 is supplied, the constant current supplying circuit 552 supplies a drive current Id corresponding to such an image density value to the circuit 550 so that the power of a laser beam outputted by the laser diode 504y is at a level corresponding to level-7.

Figure 33:
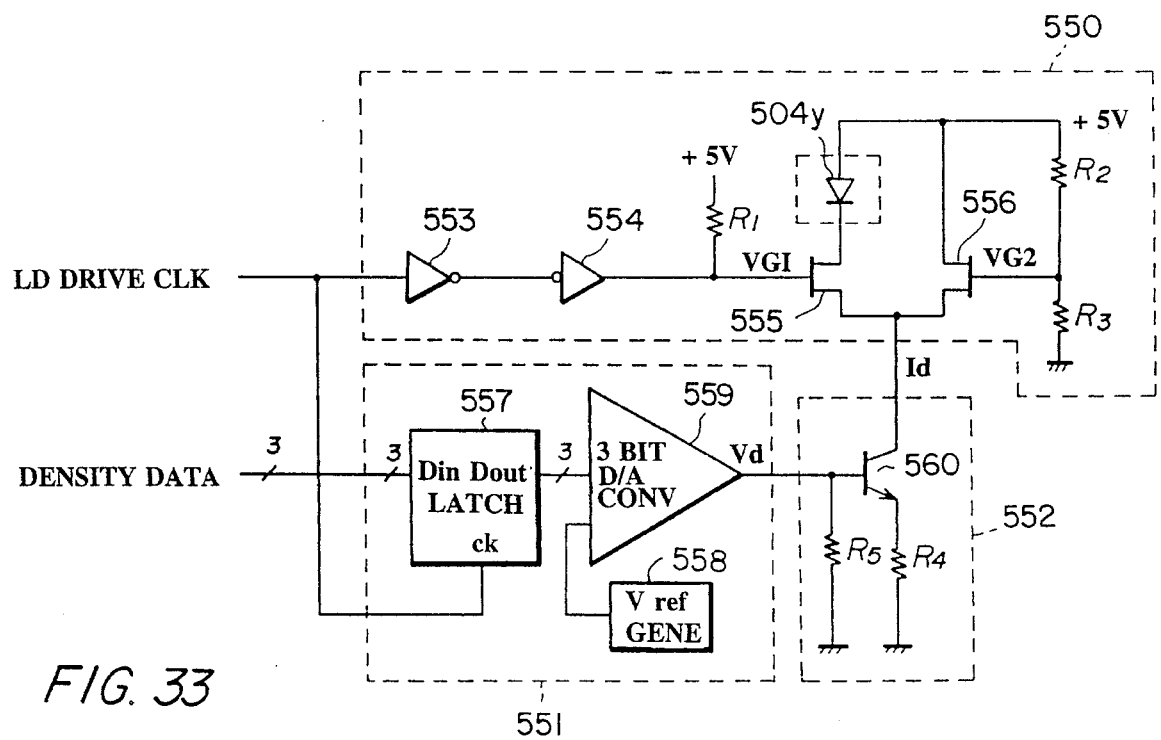
Figure 34:
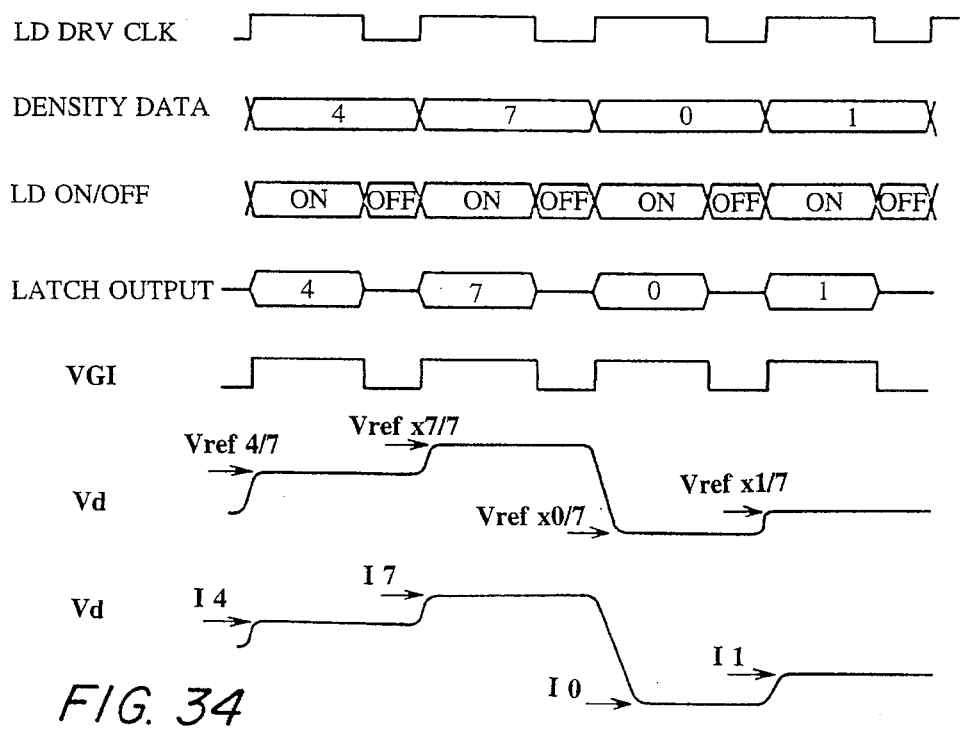

FIG. 33 shows a detailed circuit configuration of the driver 505 having the laser diode on/off circuit 550, the D/A converter 551 and the constant current supplying circuit 552. As shown in FIG. 33, the laser diode on/off circuit 550 includes TTL inverters 553, 554, differential switching circuits 555, 556 which performs an on/off toggle switching action, and a set of resistors R2, R3 which constitutes a voltage divider. This voltage divider having the resistors R2 and R3 is formed so as to generate a voltage VG2 meeting the requirements that when the VG2 is lower than VG1 the switching circuit 555 is turned ON and the switching circuit 556 is turned OFF, and that when the VG2 is higher than the VG1 the switching circuit 555 is turned OFF and the switching circuit 556 is turned ON. Accordingly, when the drive clock signal LD DRV CLK is at a high level, the inverter 554 outputs a voltage VG1 meeting the above requirement (VG2<VG1), and the switching circuit 555 is turned ON and the switching circuit 556 is turned OFF so that the laser diode 504y is turned ON. On the other hand, when the drive clock signal LD DRV CLK is at a low level, the inverter 554 outputs zero voltage VG1 meeting the above requirement (VG2>VG1), and the switching circuit 555 is turned OFF and the switching circuit 556 is turned ON so that the laser diode 504y is turned OFF.

The D/A converter 551, as shown in FIG. 33, comprises a latch 557 which latches an inputted image density data while the drive clock signal is at a high level, a reference voltage generator 558 which generates a reference voltage Vref as the maximum output voltage, and a 3-bit digital-toanalog converter which generates an analog signal Vd on the basis of the image density data inputted and the reference voltage supplied. A relationship between the analog signal Vd, the image density data and the reference voltage Vref which is applied to the present embodiment is represented by the following formula:

$$Vd = Vref \times (\text{image density data}) / (2^3 - 1)$$

Figure 35:
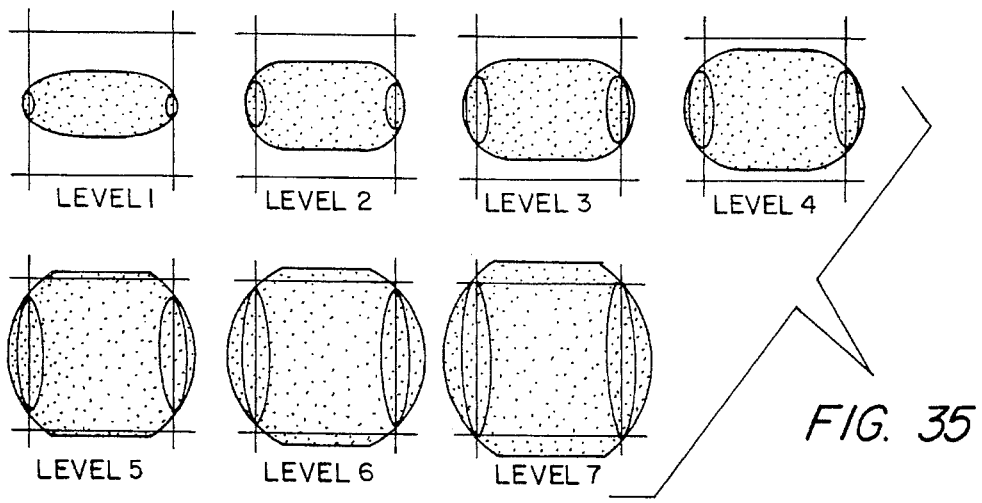
FIG. 35 is a diagram showing several levels of latent images by a power modulation technique.

The constant current supplying circuit 552 shown in FIG. 33 is provided for supplying a current Id to the laser diode on/off circuit 550 so that a controlled current flows through the laser diode 504y. The circuit 552 comprises a transistor 560 and a set of resistors R4 and R5. An output voltage Vd from the D/A converter 551 is applied to the base of the transistor 560 so as to determine a voltage to be applied to the resistor R4. In other words, as the current flowing through the resistor R4 is substantially equal to the collector current of the transistor 560, the current Id being supplied to the laser diode 504y can be adjusted by the output voltage Vd from the D/A converter 551. FIG. 29 shows a timing chart for explaining the relationship between the latch output signal, the VG1, the Vd and the ID. As indicated in this chart, the output voltage Vd of the A/D converter 559 varies at eight levels (=Vref×(0/7–7/7)) on the basis of the 3-bit image density data being inputted. The current Id supplied to the laser diode on/off circuit 550 is changed at eight levels of I0 to I7 in accordance with the output voltage Vd being supplied. Thus, the laser diode 504y generates a laser beam with eight different power levels (level 0 to level 7) on the basis of the level of the current ID being supplied, so that a multilevel tone latent image is thus formed on the surface of the photosensitive drum 512y as illustrated in FIG. 35.

Figure 36:
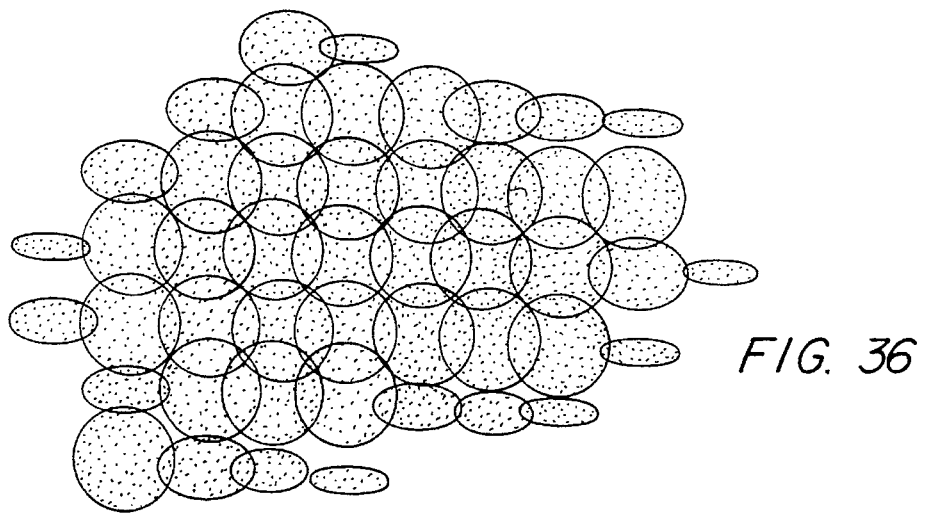
FIG. 36 is a diagram showing a toner image which is finally formed by the antialiasing process of the first embodiment from the polygon data shown in FIGS. 17(A–B)
Figure 37:
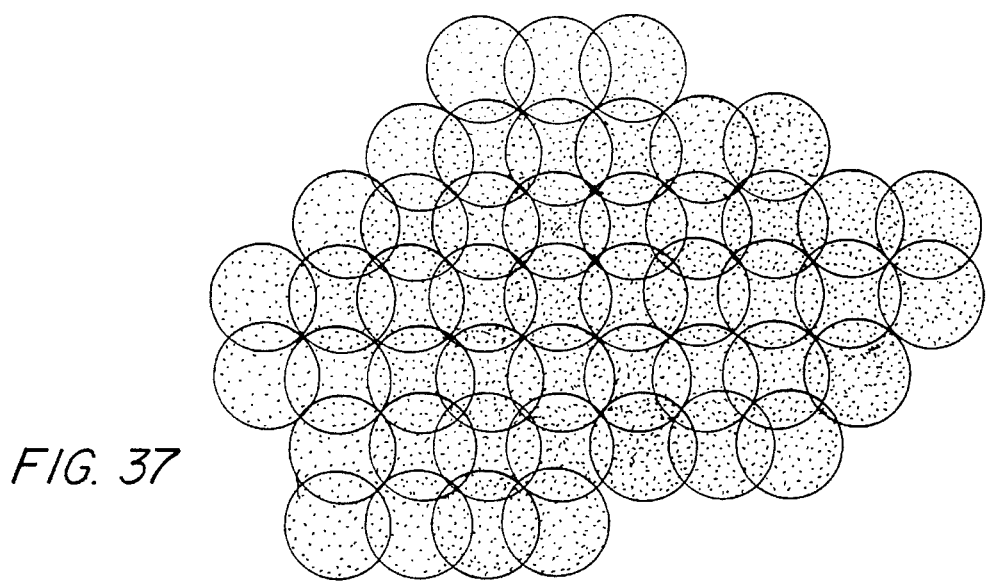
FIG. 37 is a diagram showing a toner image which is formed from the polygon data shown in FIGS. 17(A–B) without performing the antialiasing process.
Figure 38:
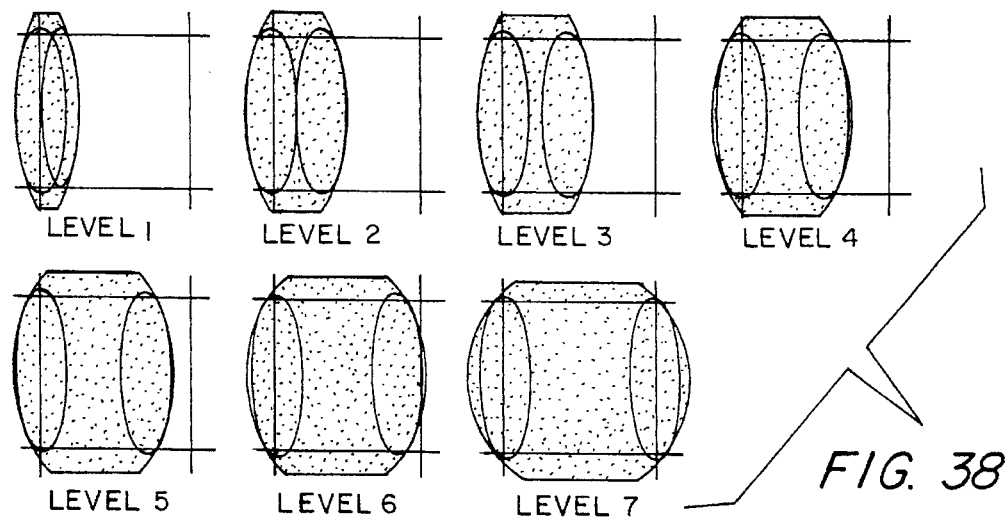
FIG. 38 is a diagram showing several levels of latent images by a pulse width modulation technique.
Figure 39:
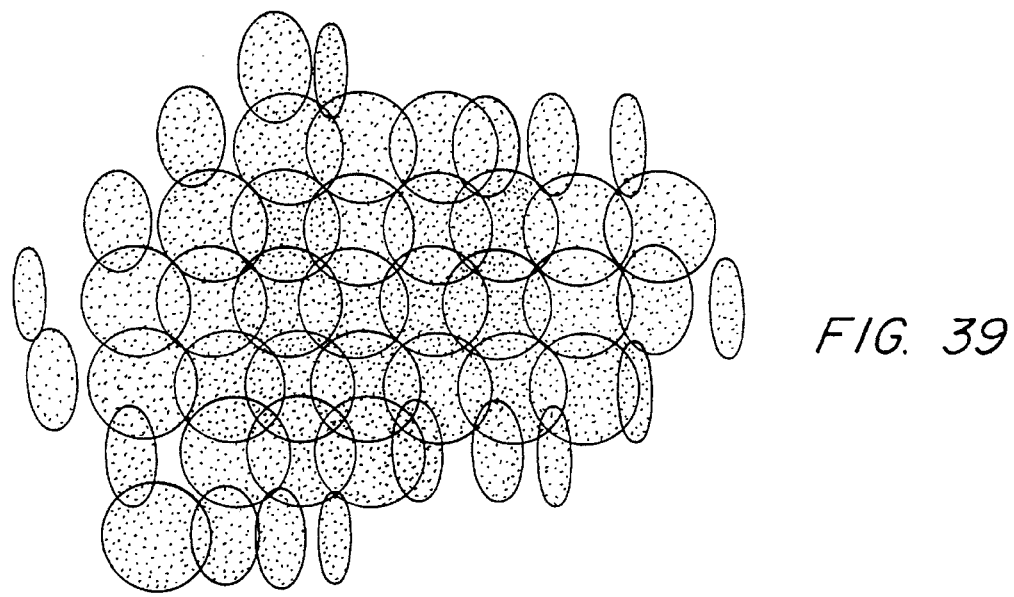
FIG. 39 is a diagram showing a toner image which is formed from the polygon data shown in FIGS. 17(A–B) by applying a pulse width modulation technique.

In the image forming system to which the above described antialiasing method is applied, a toner image as shown in FIG. 36 is finally formed on a recording sheet when the polygonal figure ABCDE shown in FIG. 17(a) is processed. Assuming the use of a resolution between 240 dpi and 400 dpi that an ordinary laser printer used in the field has, the optical density of the image at edges of the polygon ABCDE shown in FIG. 36 becomes thinner by carrying out the antialiasing process. A toner image formed without carrying out the antialiasing process for the polygonal figure ABCDE shown in FIG. 17(a) is given in FIG. 37 for comparison with the toner image shown in FIG. 36. As being apparent from the images in FIGS. 36 and 37, the effects of aliasing appearing at edge portions of the toner image shown in FIG. 37 may be reduced by carrying out the improved antialiasing process according to the present invention. In the present embodiment, a power modulation process is applied for multilevel tone generation. But, similar effects may be produced also when a pulse width modulation technique is applied. For reference purpose, an example of a multilevel tone latent image formed depending on the level by the pulse width modulation is illustrated in FIG. 38, and an example of a toner image when the pulse width modulation technique is applied to the polygon ABCDE shown in FIG. 17(a) is illustrated in FIG. 39.

Next, a description will be given of a second preferred embodiment of a graphics processing apparatus according to the present invention, with reference to FIGS. 40 through 48. Similar to the first embodiment described above, the graphics processing apparatus (which is hereinafter called the PDL controller) of the present invention is provided within the image forming system. In the following description of the second embodiment, only the overview of the antialiasing process carried out by the graphics processing apparatus is given. The construction and operation of the graphics processing apparatus are essentially the same as those of the first embodiment, and a description thereof will be omitted. The graphics processing apparatus of this second embodiment determines the approximate area factor k of an edge-portion pixel G0 which lies along the scanline and is adjacent to the image, by performing an approximation using a decimal fraction of a x coordinate value of a point where the vector data is intersected by the scanline.

Figure 40:
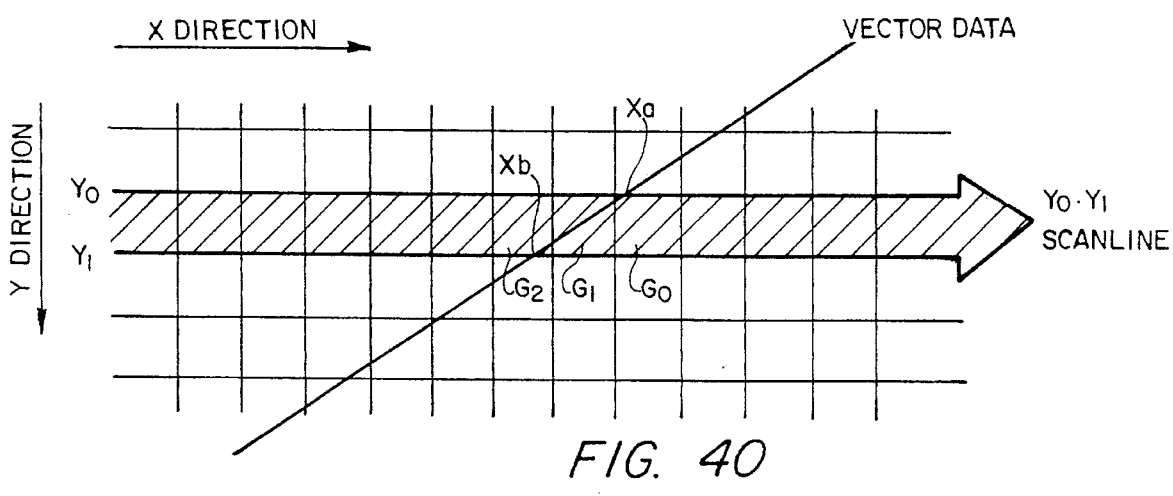
FIG. 40, as well as FIGS. 41(a), 41(b), 41(c), 41(d) (which may collectively be referred to herein as FIG. 41), as well as FIG. 42, are diagrams for explaining an antialiasing process carried out by a second embodiment of the graphics processing apparatus according to the present invention.
Figure 41A:
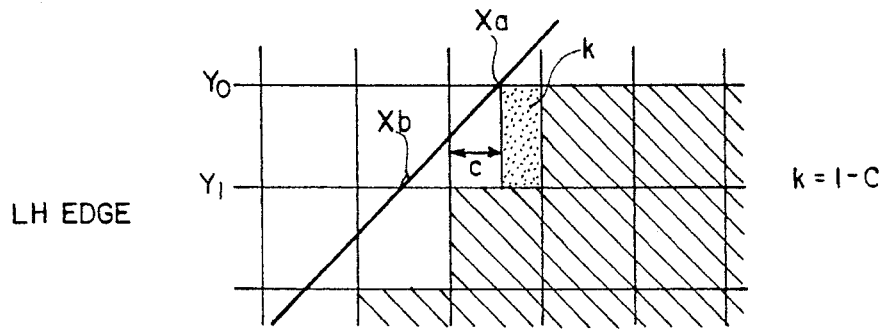
Figure 41B:
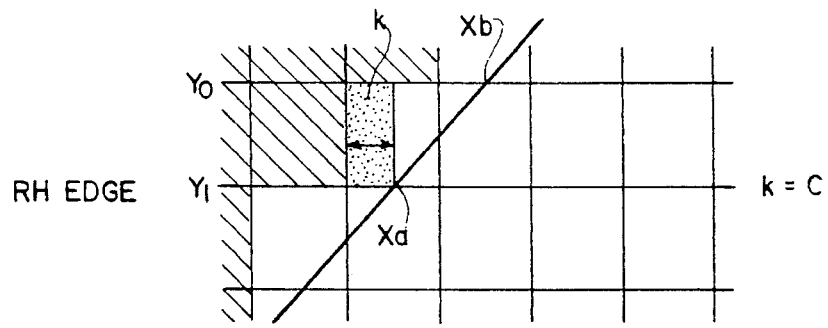
Figure 41C:
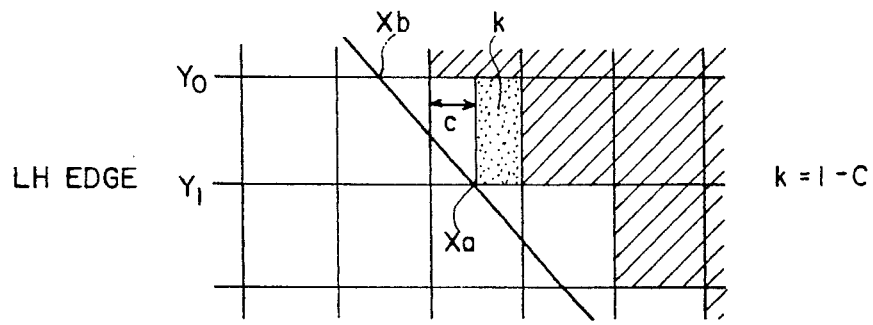
Figure 41D:
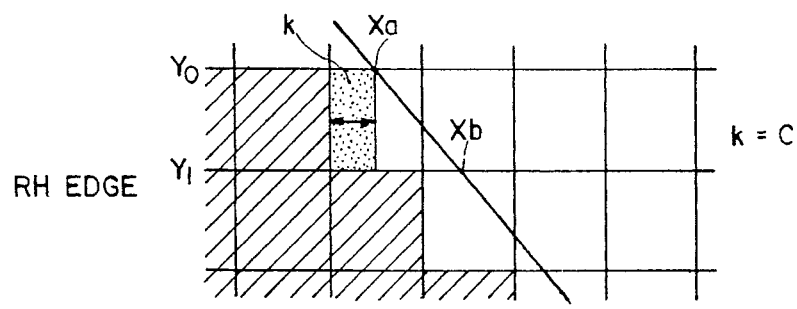
Figures 42, 44:
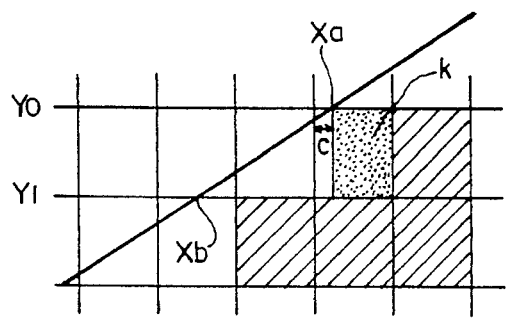
FIG. 44 is a diagram showing the approximate area factors k after the antialiasing process.

Referring to FIGS. 40 through 42, a description will be given how to determine the approximate area factor k of the edge-portion pixel G0. As shown in FIG. 40, where a vector data is intersected by a scanline (Y0, Y1) at an edge portion of an image, there are two intersecting points, one intersecting point lying on a line Y0 of the scanline and the other lying on a line Y1 of the scanline, because the scanline has a thickness equivalent to the width of a pixel. The thickness of the scanline is equal to a difference (=Y1–Y0) in y coordinate value between the lines Y0 and Y1. It will now be assumed that the edge portion pixels along the scanline are located on the left hand side of the image, and two x coordinate values of the intersecting points are Xa and Xb, the x coordinate value Xa of the intersecting point lying on the line Y0 of the scanline and the x coordinate value Xb of the other point lying on the line Y1 of the scanline. In FIG. 40, it is assumed that among the edge portion pixels along the scanline, an edge portion pixel which is located nearest to the image is the pixel G0, and the edge portion pixel next to the pixel G0 along the scanline is the pixel G1.

In a case in which the edge portion pixels are located on the right hand side of the image, a definition of the edge portion pixels is opposite to the above one. That is, the edge portion G2 shown in FIG. 40 in the previous case is the edge portion pixel G0 in this case which is nearest to the image, and the x coordinate value Xa of the intersecting point lies on the line Y1 of the scanline in this case.

Referring to FIG. 41(a) through (d), a description will be given how to determine the approximate area factor k of the edge portion pixel G0 which is located nearest to the image. In the second embodiment, using a decimal fraction c of the x coordinate value Xa of the intersecting point, the approximate area factor k of the pixel G0 is determined by the the value of the decimal fraction c when the edge portion pixels are on the right hand side of the image, and the same is determined by the value of (1–c) when the edge portion pixels are on the left hand side of the image. The approximate area factor k is calculated by approximating the area of the edge portion pixel G0 to an approximate area of a rectangle represented by 1×c or 1×(1–c).

In the second embodiment, the area factor of a pixel is indicated at ten levels including 0, 1/9, 2/9, ... and 9/9, since 3×3 subpixel dividing is used. As shown in FIG. 42, to calculate the approximate area factor k, 1×c or 1×(1–c) is multiplied by 9 and the resulting value is rounded to the nearest integer, and the rounded value is multiplied by 1/9, thus making the approximate area factor k. Generally, in a case where the area factor of a pixel is indicated at a number (n) of levels, the approximate area factor k is determined as follows: when the pixels are located on the right hand edge of the image, 1×c×(n–1) is calculated and rounded to the nearest integer and the rounded value is multiplied by 1/(n–1), resulting in the approximate area factor k, and when the pixels are located on the left hand edge of the image, 1×(1–c)×(n–1) is calculated and rounded to the nearest integer and the rounded value is multiplied by 1/(n–1), resulting in the approximate area factor k. For example, in a case where the pixels are located on the left hand edge of the image and the decimal fraction c of the x coordinate value Xa is represented as c=0.2, the approximate area factor k is determined to be equal to 7/9 as shown in FIG. 42.

And, in the second embodiment, the approximate area factors k of the neighbouring pixels G1, G2 next to the pixel G0 being considered are determined to be equal to zero. In other words, the antialiasing process is carried out for the pixel G0 nearest to the image, and all the approximate area factors k of the neighbouring pixels, other than the pixel G0, are determined to be equal to zero. On the other hand, when the conventional antialiasing process is not carried out for the edge-portion pixels, all the approximate area factors k are determined to be equal to 1. In addition, the approximate area factor k of the nearest pixel K0 is calculated using the decimal fraction c of the x coordinate value Xa as described above, and it is therefore expected that the accuracy of the approximate area factor k becomes worse as the absolute value of inclination of a vector data becomes smaller. Although the accuracy of the approximate area factor k is reduced to a somewhat low level, the antialiasing process can be performed at a high speed and the effects of aliasing in the image can be reduced to a satisfactory level according to the present embodiment.

It will now be assumed that an image data of a polygon ABCDE as shown in FIG. 17(*a*) is inputted in the process 1 as shown in FIG. 14 and this polygon data has the following data elements.

a) five line vectors defining lines AB, BC, CD, DE and EA (expressed in real number), b) color and intensity of the inner region of the polygon, The image data of the polygon is divided into seven line vectors each extending in a main scan direction, and the following information is assigned to a starting point and an end point of each of these line vectors, as shown in FIG. 17(*b*).

c) vector element data forming the starting point and the end point of each line vector (the coordinate value of the starting point of each line vector in a) above expressed in real number), d) inclination data of each vector element forming the starting point and the end point of each line vector, and e) character data of the starting point and the end point of each line vector (RH or LH edge, end point, line smaller than one dot, intersections, etc.)

Next, a description will be given of the procedure of the antialiasing process in the second embodiment which is carried out with a segment shading by scanline, with reference to FIG. 43. As described above, the approximate area factor k of the edge portion pixel K0 nearest to the image is determined on the basis of the decimal factor c of the x coordinate value Xa according to the second embodiment. In accordance with the flow chart shown in FIG. 43, the antialiasing process is carried out. In a step S411, a decimal fraction c is extracted from the x coordinate value Xa of an intersecting point which is located nearer to the image. In a step S412, a discrimination is made as to whether the edge portion pixels are located on the left hand edge of the image or on the right hand edge thereof. If the pixels are on the right hand edge, then c×(n−1) is calculated (in the present case n=10) and rounded to the nearest integer, and the rounded value is multiplied by 1/(n−1) to determine the approximate area factor k of the pixel K0, in a step S413. If the pixels are on the left hand edge, then (1−c)×(n−1) is calculated and rounded to the nearest integer, and the rounded value is multiplied by 1/(n−1) to determine the approximate area factor k of the pixel K0 in a step S414. And, in a step S415, the approximate area factors k of the neighbouring pixels, other than the pixel G0, are determined to be equal to zero. The neighbouring pixels are edge-portion pixels which are located between the x coordinate values Xa and Xb of the intersecting points.

Figure 43:
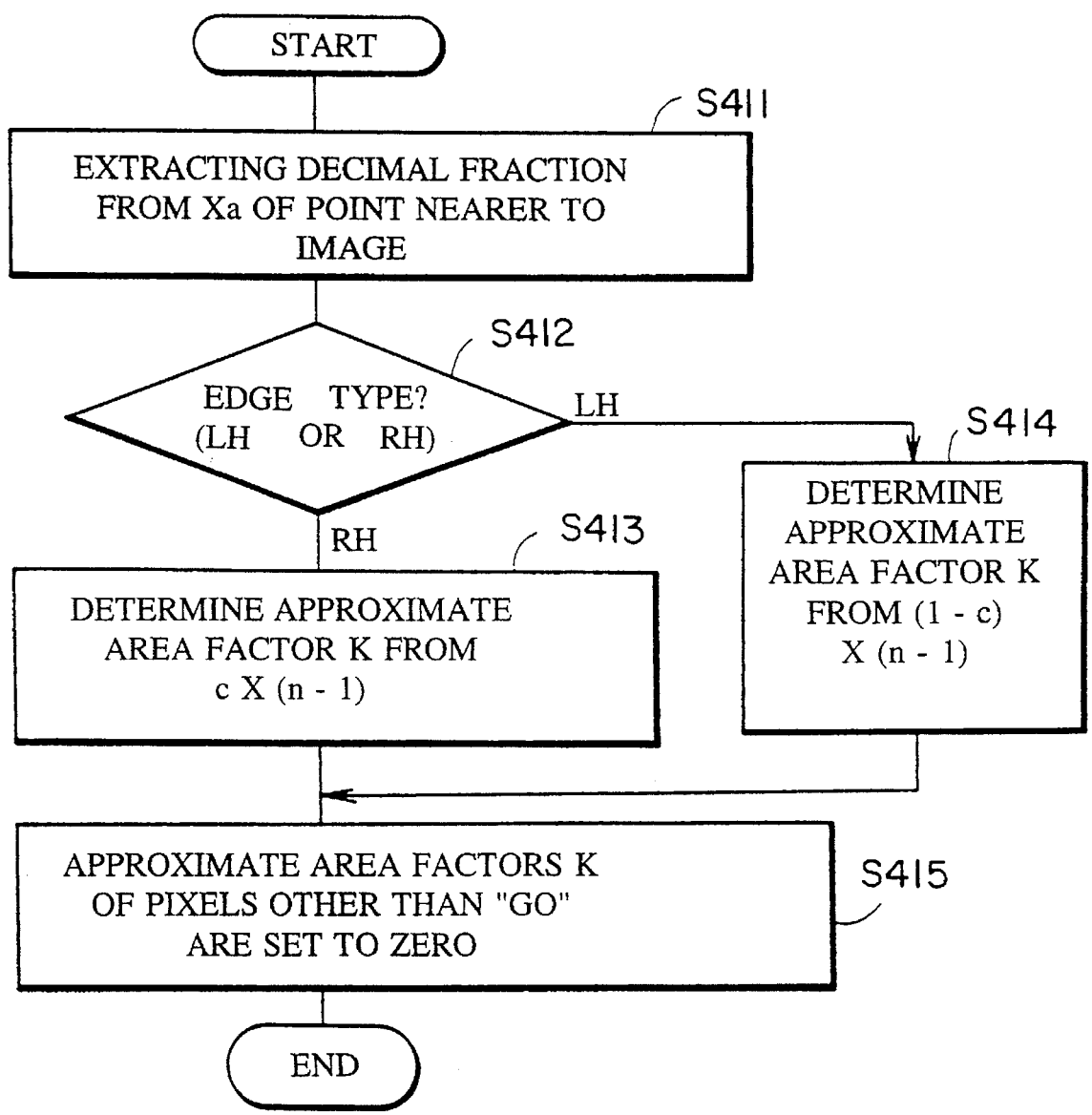
FIG. 43 is a flow chart for explaining the procedure of the antialiasing process carried out by the second embodiment.

When the edge portion pixels (or a group of edge portion pixels) are detected in the segment shading process by scanline which is carried out in the process 3 as shown in FIG. 14, the above described antialiasing process as shown in FIG. 43 is called as the subroutine. The CPU 202 repeats the above procedure until the final pixel in the scanline (with respect to y coordinate) is scanned, and renews the data of the item (c) above from the data of the item (d) above. The approximate area factors k with respect to the polygon shown in FIG. 17(*a*) which are determined by carrying out the antialiasing process according to the second embodiment in this manner are illustrated in FIG. 44.

It will now be assumed that the polygon shown in FIG. 17(*a*) has a background color of white (max. intensity: 255) and a drawing color of red (max. intensity: 255). The intensity of each color (Kr: red, Kg: green, Kb: blue) showing the displayed polygon on the CRT screen is represented by the following formulas using the approximate area factors k shown in FIG. 44.

$$Kr = Kr1 \times k + Kr2 \times (1-k)$$

$$Kg = Kg1 \times k + Kg2 \times (1-k)$$

$$Kb = Kb1 \times k + Kb2 \times (1-k)$$

In these formulas, Kr1, Kg1 and Kb1 (respectively, for red, green and blue) are the intensity values which are currently obtained as the polygon data as listed in (b) above, and Kr2, Kg2 and Kb2 are the previous intensity values which are previously applied for each color and are obtained by reading out the corresponding RGB data in the respective plain memory parts of the page memory 206. The intensity values Kr, Kg and Kb thus determined by the above formulas are stored respectively as the image data in the plain memory parts of the page memory 206, as shown in FIG. 45(*a*), (*b*), (*c*). And the image data shown in FIG. 45(*a*), (*b*), (*c*) are converted by the gamma correction circuit 403, the complement color generating circuit 405, the masking circuit 406 and the UCR processing and black generating circuit 407 into the data shown in FIG. 46 (a), (b), (c), (d).

In the image forming system to which the above described antialiasing process and the related apparatus of the second embodiment are applied, a toner image as shown in FIG. 47 is finally formed on a recording sheet when the polygon ABCDE shown in FIG. 17(*a*) is processed. Assuming that a resolution between 240 dpi and 400 dpi of the ordinary laser printer is used, the optical density of the image at edges of the polygon ABCDE shown in FIG. 47 becomes thinner by carrying out the antialiasing process. A toner image formed without carrying out the antialiasing process for the polygon ABCDE shown in FIG. 17(*a*) is given in FIG. 37 for comparison with the toner image shown in FIG. 47. As being apparent from the images in FIGS. 37 and 47, the effects of aliasing appearing at edge portions of the toner image shown in FIG. 37 may be reduced by carrying out the improved antialiasing process according to the second embodiment. In the present embodiment, a power modulation process is applied for multilevel tone generation. But, similar effects may be produced also when a pulse width modulation technique is applied. For reference purpose, an example of a toner image when the pulse width modulation technique is applied to the polygon ABCDE shown in FIG. 17(*a*) is illustrated in FIG. 48.

Next, a description will be given of a third preferred embodiment of a graphics processing apparatus according to the present invention, with reference to FIGS. 49 through 59. Similar to the first embodiment described above, the graphics processing apparatus (which is called the PDL controller) of the present invention is provided within the image forming system. In the following description of the third embodiment, only the overview of the antialiasing process carried out by the graphics processing apparatus will be given. The construction and operation of the graphics processing apparatus are essentially the same as those of the first embodiment, and a description thereof will be omitted. The graphics processing apparatus of this third embodiment determines first the approximate area factor k0 of an edge-portion pixel G0 which lies along the scanline and is nearest to the image, by performing an approximation, and by using this approximate area factor k0 as the reference value the graphics processing apparatus determines next the approximate area factors k1, k2, ..., kn of the other edge portion pixels G1, G2, ..., Gn next to the pixel G0, respectively.

Referring to FIGS. 49 and 50, a description will be given how to determine the approximate area factor k0 of the G0, and how to determine the approximate area factors k1, k2, ..., kn of the pixels G1, G2, ..., Gn respectively by using the approximate area factor k0 as the reference value.

As shown in FIG. 49, where a vector data is intersected by a scanline (Y0, Y1) at an edge portion of an image, there are two intersecting points, one intersecting point lying on a line Y0 of the scanline and the other lying on a line Y1 of the scanline, because the scanline has a thickness equivalent to the width of a pixel. The thickness of the scanline is equal to a difference (=Y1−Y0) in y coordinate value between the lines Y0 and Y1. It will now be assumed that the edge portion pixels along the scanline are located on the left hand side of the image, and two x coordinate values of the intersecting points are Xa and Xb, the x coordinate value Xa of the intersecting point lying on the line Y0 of the scanline and the x coordinate value Xb of the other point lying on the line Y1 of the scanline. In FIG. 49, it is also assumed that among the edge portion pixels along the scanline, an edge portion pixel which is located nearest to the image is the pixel G0, and the edge portion pixels next to the pixel G0 are the pixels G1 and G2, respectively.

In a case in which the edge portion pixels are located on the right hand edge of the image, a definition of the edge portion pixels is opposite to the above one. That is, the edge portion G2 shown in FIG. 49 in the previous case is the edge portion pixel G0 in the present case which is nearest to the image, and the x coordinate value Xa of the intersecting point lies on the line Y1 of the scanline in this case.

Referring to FIG. 50(a), a description will be given how to determine the approximate area factor k0 of the edge-portion pixel G0 which is located nearest to the image. In the third embodiment, using a decimal fraction c of the x coordinate value Xa of the intersecting point, the approximate area factor k0 of the pixel G0 is determined by the value of the decimal fraction c when the edge portion pixels are located on the right hand side of the image, and the same is determined by the value of (1−c) when the edge portion pixels are on the left hand side thereof. The approximate area factor k0 is calculated by approximating the area of the edge portion pixel G0 to an approximate area of a rectangle being represented by 1×c or 1×(1−c).

In the third embodiment, the area factor of a pixel is indicated at ten levels including 0, 1/9, 2/9, ... and 9/9, since 3×3 subpixel dividing is used. As shown in FIG. 50, to calculate the approximate area factor k0, 1×c or 1×(1−c) is multiplied by 9 and the resulting value is rounded to the nearest integer, and the rounded value is multiplied by 1/9, thus making the approximate area factor k0. Generally, in a case where the area factor of a pixel is indicated at a number (n) of levels, the approximate area factor k0 is determined as follows: when the pixels are located on the right hand side of the image, 1×c×(n−1) is calculated and rounded to the nearest integer and the rounded value is multiplied by 1/(n−1), resulting in the approximate area factor k0, and when the pixels are located on the left hand side of the image, 1×(1−c)×(n−1) is calculated and rounded to the nearest integer and the rounded value is multiplied by 1/(n−1), resulting in the approximate area factor k0. For example, in a case where the pixels are located on the left hand side of the image and the decimal fraction c of the x coordinate value Xa is represented as c=0.2, the approximate area factor k0 is determined to be equal to 7/9 as shown in FIG. 50(a).

And, in the third embodiment, the approximate area factors k1, k2, ..., kn of the neighbouring pixels G1, G2, ..., Gn next to the pixel G0 being considered are determined by using the approximate area factor k0 as the reference value ks. The approximate area factor k1 of the neighbouring pixel G1 adjacent to the pixel K0 is calculated by subtracting 1/(n−1) (which is, in this case, equal to 1/9) from the reference value ks, resulting in the value of the approximate area factor k1 (which is, in this case, equal to (k0−1/9)=6/9). Similarly, using the approximate area factor k1 as the reference value ks, the approximate area factor k2 of the neighbouring pixel G2 adjacent to the pixel G1 along the scanline is calculated by subtracting 1/9 from the reference value ks, resulting in the value of the approximate area factor k2 (which is, in this case, equal to (k1−1/9)=5/9).

The same procedure is repeated to determine the values of the approximate area factors until the resulting value of the approximate area factor is equal to zero or the approximate area factor of a pixel in which the intersecting point Xb exists (the pixel G2 as shown in FIG. 49) is determined. In this manner, the approximate area factors k1, k2, ..., kn are repeatedly determined by subtracting 1/(n−1) from the reference value ks, allowing an easy and speedy computing of the area factors of the edge portion pixels used in the antialiasing process.

It will now be assumed that the image data of a polygon ABCDE as shown in FIG. 17(a) is inputted in the process 1 as shown in FIG. 14 and this polygon data has the following data elements.

a) five line vectors defining lines AB, BC, CD, DE and EA (expressed in real number), b) color and intensity of the inner region of the polygon, The image data of the polygon is divided into seven line vectors each extending in a main scan direction, and the following information is assigned to a starting point and an end point of each of these line vectors, as shown in FIG. 17(b).

c) vector element data forming the starting point and the end point of each line vector (the coordinate value of the starting point of each line vector in a) above expressed in real number), d) inclination data of each vector element forming the starting point and the end point of each line vector, and e) character data of the starting point and the end point of each line vector (RH or LH edge, end point, line smaller than one dot, intersections, etc.)

Next, a description will be given of the procedure of the antialiasing process of the third embodiment which is carried out with a segment shading by scanline, with reference to FIGS. 51A and 51B. As described above, the approximate area factor k0 of the edge portion pixel K0 nearest to the image is first determined from the decimal factor c of the x coordinate value Xa according to the third embodiment. And, by using the approximate area factor k0 as the reference value ks, the approximate area factors k1, k2, . . . , kn of the edge portion pixels K1, K2, . . . , Kn are repeatedly determined. In accordance with the flow chart shown in FIGS. 51A and 51B, the antialiasing process according to the third embodiment is carried out. In a step S421, a decimal fraction c is extracted from the x coordinate value Xa of an intersecting point which is located nearer to the image. In a step S422, a discrimination is made as to whether the edge portion pixels are located on the left hand side of the image or on the right hand side thereof. If the pixels are on the right hand side, then c×(n−1) is calculated (in the present case n=10) and rounded to the nearest integer, and the rounded value is multiplied by 1/(n−1), which is, in this case, equal to 1/9, to determine the approximate area factor k0 of the pixel G0, in a step S423. In a step S424, the approximate area factor k0 is substituted to the reference value ks and a count is set to 1. In a step S425, a discrimination is made as to whether the area factor of the edge portion pixel at a position of the x coordinate value Xb is determined or not. If the area factor at the Xb is determined, then the procedure is ended. If it is not determined, then ks−1/(n−1), which is in this case equal to (ks−1/9), is calculated to determine an approximate area factor k__count (which is, in this case, equal to k1) of the pixel (G1) at the right hand position of the pixel K0 in a step S426. In a step S427, the resulting value of the k__count is substituted to the reference value ks and the count is incremented by 1. For example, the approximate area factor k1 is substituted to the reference value ks and the count is set to 2. And, in a step S428, a discrimination is made as to whether the reference value ks is equal to zero or not. If the ks is equal to zero, then the procedure is ended. If the ks is not equal to zero, then the similar steps S425 to 427 are repeated until the ks is equal to zero.

Figure 51A:
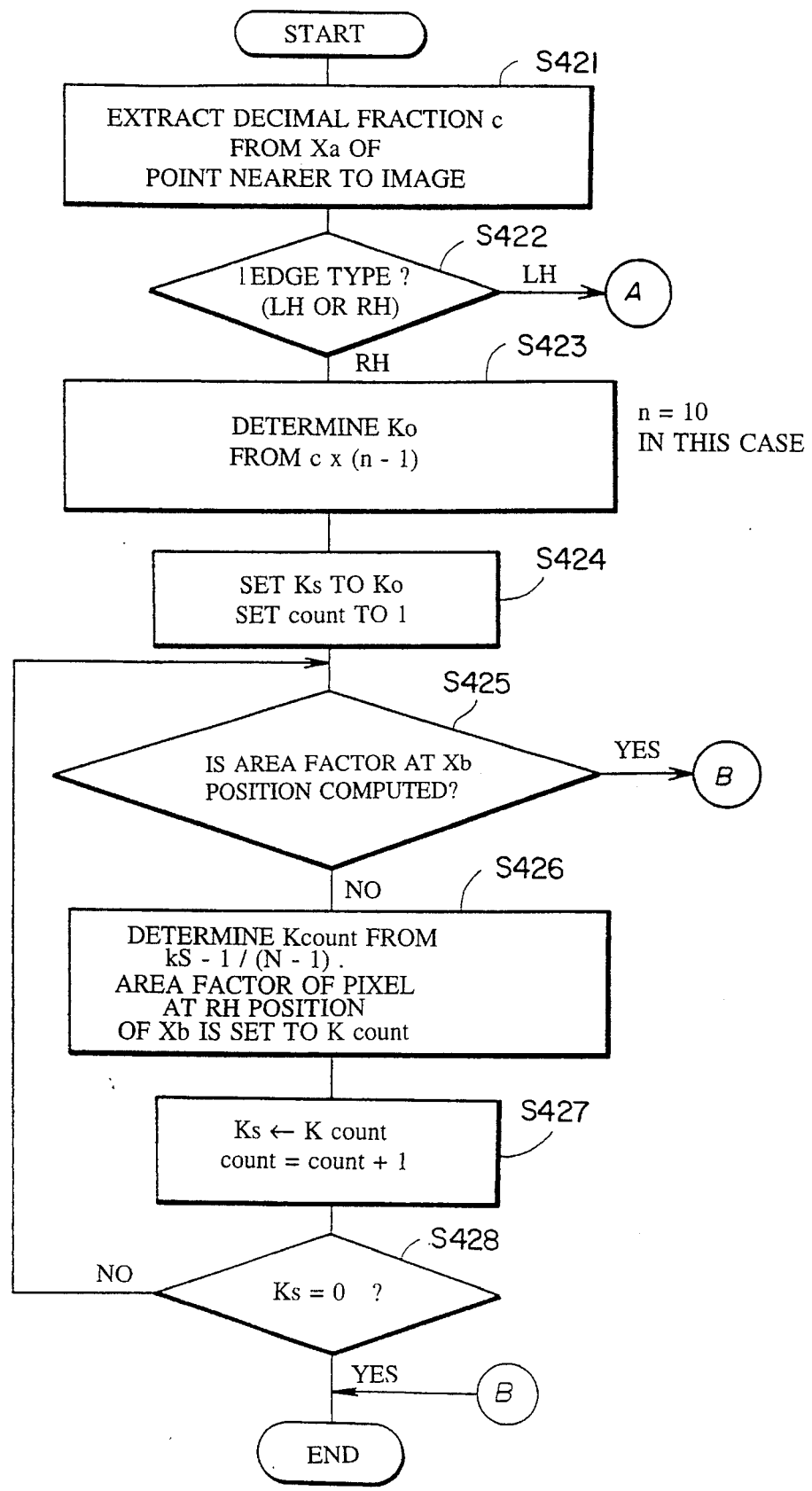
FIGS. 51A and 51B is a flow chart for explaining the procedure of an antialiasing process carried out by the third embodiment.
Figure 51B:
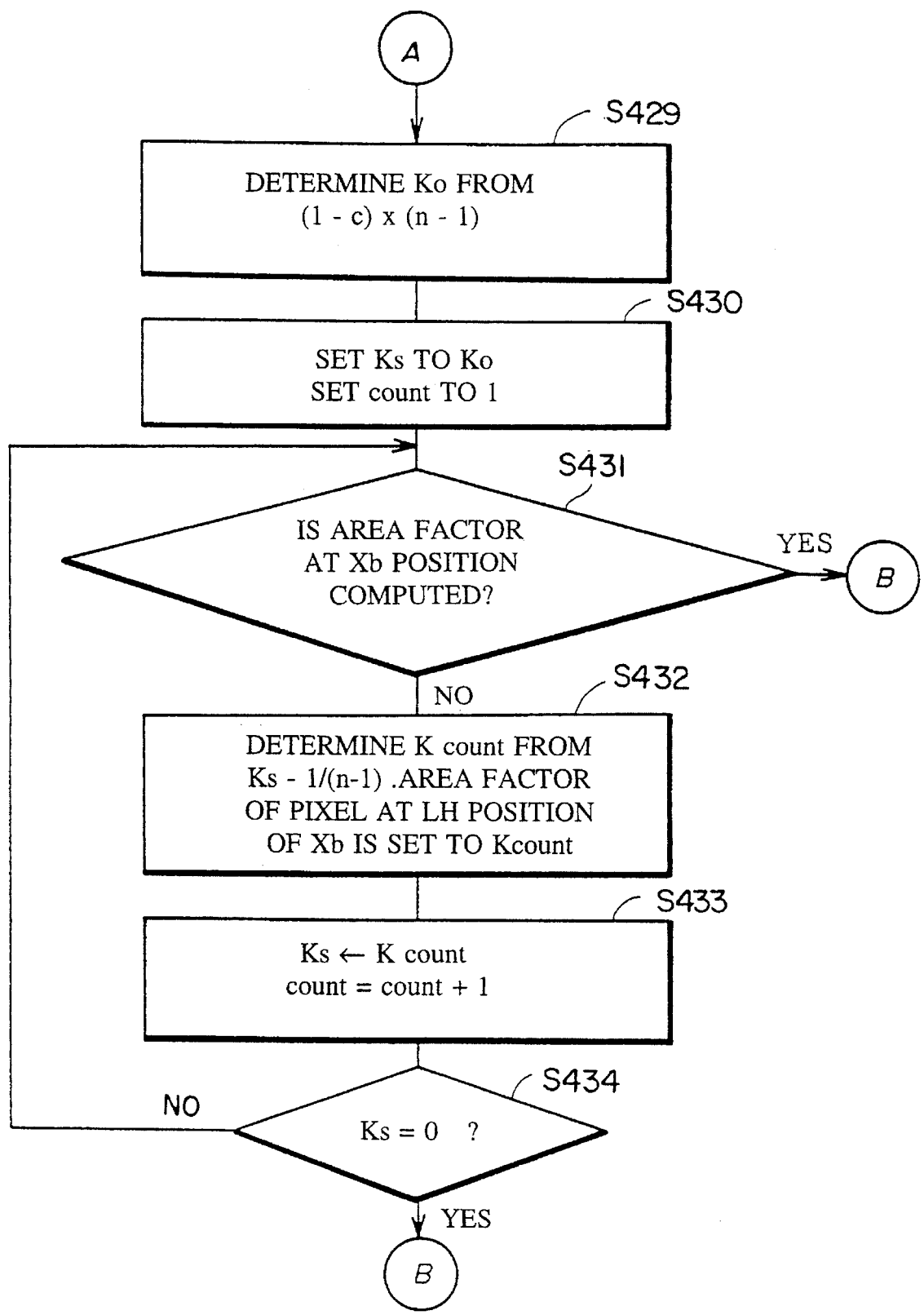
Figure 58A:
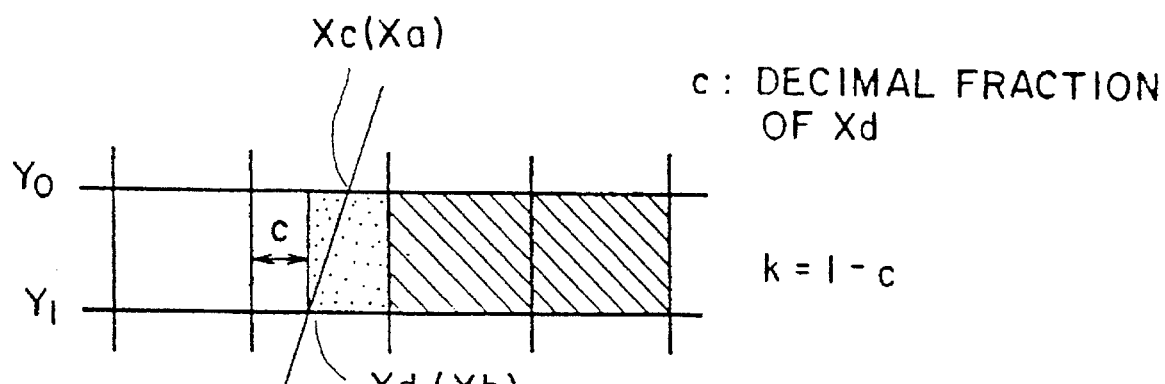
Figure 58B:
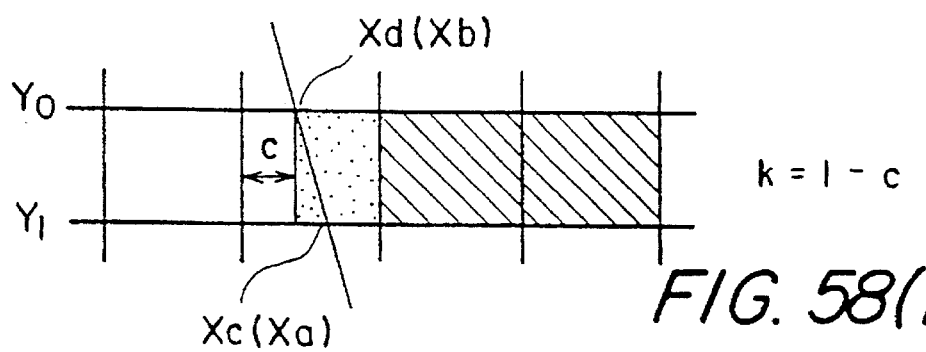
Figure 58C:
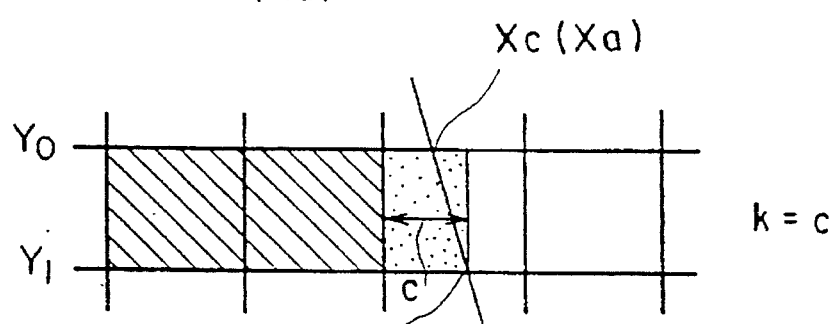
Figure 58D:
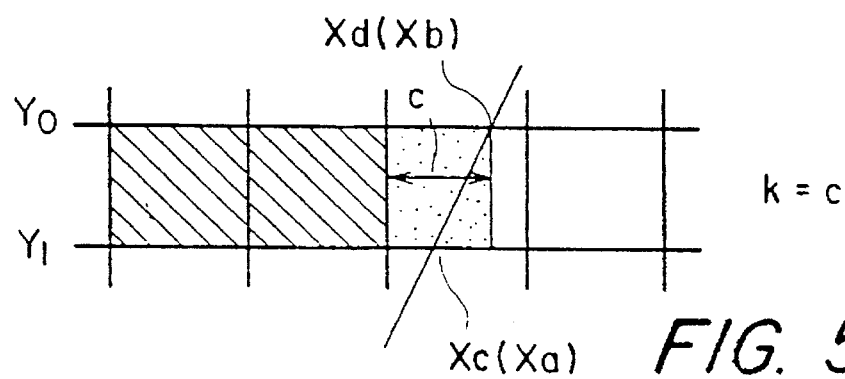
Figure 59A:
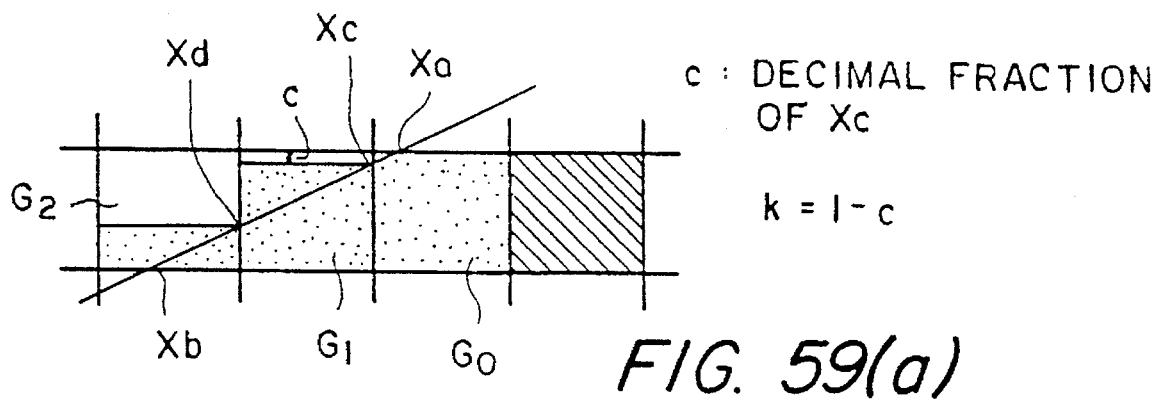
Figure 59B:
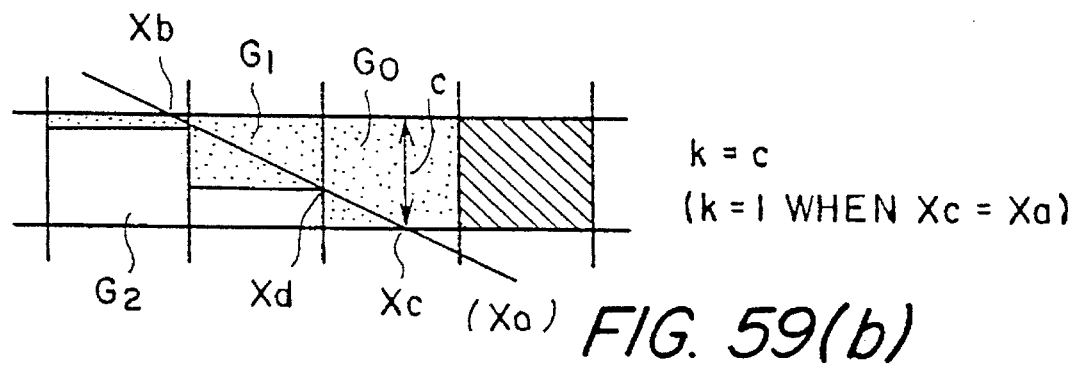
Figure 59C:
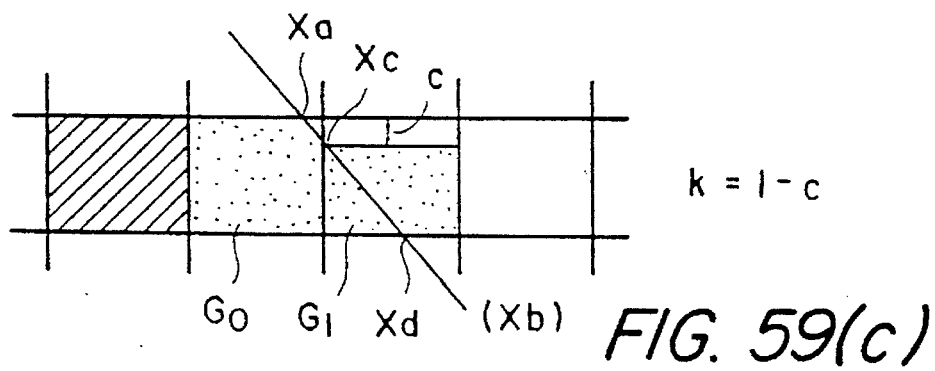
Figure 59D:
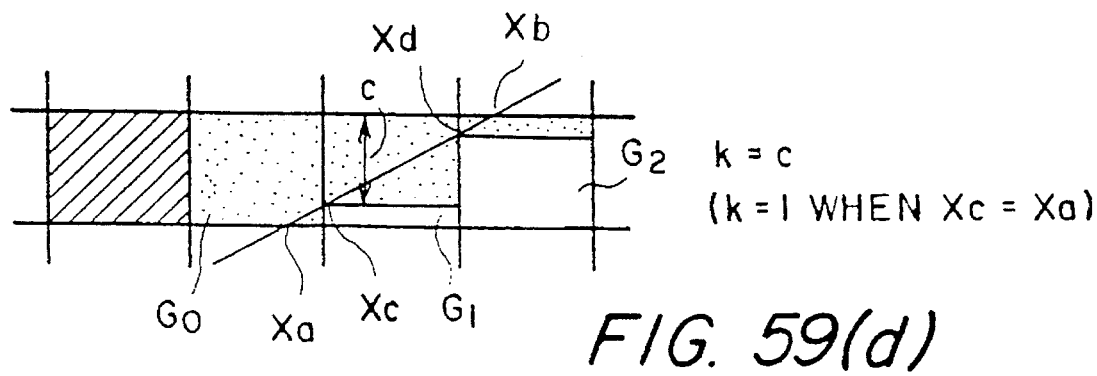

On the other hand, if the edge portion pixels are on the left hand side of the image, then (1−c)×(n−1) is calculated and rounded to the nearest integer, and the rounded value is multiplied by 1/(n−1) to determine the approximate area factor k of the pixel G0 in a step S429 as shown in FIG. 51B. And, in a step S430, the value of the approximate area factor k0 is substituted to the reference value ks and the count is set to 1. In a step S431, a discrimination is made as to whether the area factor of the edge portion pixel at a position of the x coordinate value Xb is determined or not. If the area factor at the Xb is determined, then the procedure is ended. If it is not determined, then ks−1/(n−1), which is in this case equal to (ks−1/9), is calculated to determine an approximate area factor k__count (which is, in this case, equal to k1) of the pixel (G1) at the left hand position of the pixel G0 in a step S432. In a step S433, the resulting value of the k__count is substituted to the reference value ks and the count is incremented by 1. For example, the value of the approximate area factor k1 is substituted to the reference value ks and the count is set to 2. And, in a step S434, a discrimination is made as to whether the reference value ks which is set in the step S433 is equal to zero or not. If the ks is equal to zero, then the procedure is ended. If the ks is not equal to zero, then the similar steps S431 to S433 are repeated until the ks is equal to zero. The approximate area factors of the neighbouring pixels are repeatedly determined by incrementing the count by 1.

When the edge portion pixels (or a group of edge portion pixels) are detected in the segment shading process by scanline which is carried out in the process 3 as shown in FIG. 14, the above described antialiasing process as shown in FIGS. 51A and 51B is called as the subroutine. The CPU 202 repeats the above procedure until the final pixel in the scanline (with respect to y coordinate) is scanned, and renews the data of the item (c) above from the data of the item (d) above. The approximate area factors k with respect to the polygon shown in FIG. 17(a) which are determined by carrying out the antialiasing process according to the third embodiment in this manner are illustrated in FIG. 52.

It will now be assumed that the polygon data as shown in FIG. 17(a) has a background color of white (max. intensity: 255) and a drawing color of red (max. intensity: 255). The intensity of each color (Kr: red, Kg: green, Kb: blue) showing the displayed polygon on the CRT screen is represented by the following formulas using the approximate area factors k shown in FIG. 52.

$$Kr = Kr1 \times k + Kr2 \times (1-k)$$

$$Kg = Kg1 \times k + Kg2 \times (1-k)$$

$$Kb = Kb1 \times k + Kb2 \times (1-k)$$

In these formulas, Kr1, Kg1 and Kb1 (respectively, for red, green and blue) are the intensity values which are currently obtained as the polygon data as listed in (b) above, and Kr2, Kg2 and Kb2 are the previous intensity values which are previously applied for each color and are obtained by reading out the corresponding RGB data in the respective plain memory parts of the page memory 206. The intensity values Kr, Kg and Kb thus determined by the above formulas are stored respectively as the image data in the plain memory parts of the page memory 206, as shown in FIG. 53(a), (b), (c). And the image data shown in FIG. 53(a), (b), (c) are converted by the gamma correction circuit 403, the complement color generating circuit 405, the masking circuit 406 and the UCR processing and black generating circuit 407 into the data shown in FIG. 54 (a), (b), (c), (d).

In the image forming system to which the above described antialiasing process of the third embodiment and the related apparatus are applied, a toner image as shown in FIG. 55 is finally formed on a recording sheet when the polygon ABCDE shown in FIG. 17(a) is processed. Considering the use of the ordinary laser printer with a resolution between 240 dpi and 400 dpi, the optical density of the image at edges of the polygon ABCDE shown in FIG. 55 becomes thinner by carrying out the antialiasing process. A toner image formed without carrying out the antialiasing process for the polygon ABCDE shown in FIG. 17(a) is given in FIG. 37 for comparison with the toner image shown in FIG. 55. As being apparent from the images in FIGS. 37 and 55, the effects of aliasing appearing at edge portions of the toner image shown in FIG. 37 may be reduced by carrying out the improved antialiasing process according to the second embodiment. In the present embodiment, a power modulation process is applied for multilevel tone generation. But, similar effects may be produced also when a pulse width modulation technique is applied. For reference purpose, an example of a toner image when the pulse width modulation technique is applied to the polygon ABCDE shown in FIG. 17(a) is illustrated in FIG. 56.

Next, a description will be given of a fourth preferred embodiment of a graphics processing apparatus according to the present invention, with reference to FIGS. 57 through 62. similar to the first embodiment described above, the graphics processing apparatus (the PDL controller) of the present invention is provided within the image forming system. In the following description of the fourth embodiment, only the overview of the antialiasing process carried out by the graphics processing apparatus is given. The construction and operation of the graphics processing apparatus of the present embodiment are essentially the same as those of the first embodiment, and a description thereof will be omitted. The graphics processing apparatus (the PDL controller) of this fourth embodiment determines an approximate area factor k of an edge portion pixel which lies along the scanline and is adjacent to the image, through approximation using a decimal fraction of the x coordinate value or y coordinate value of either of two intersecting points where a vector data is intersected by a scanline.

Referring to FIGS. 57 through 59, a description will be given how to determine the approximate area factor k of an edge portion pixel. As shown in FIG. 57, where a vector data is intersected by a scanline (Y0, Y1) at an edge portion of an image, there are two intersecting points, one intersecting point lying on a line Y0 of the scanline and the other lying on a line Y1 of the scanline, because the scanline has a thickness equivalent to the width of a pixel. The thickness of the scanline is equal to a difference (=Y1−Y0) in y coordinate value between the lines Y0 and Y1. It will now be assumed that the edge portion pixels along the scanline are located on the left hand side of the image, and two x coordinate values of the intersecting points are Xa and Xb, the x coordinate value Xa of the intersecting point lying on the line Y0 of the scanline and the x coordinate value Xb of the other point lying on the line Y1 of the scanline. When a consideration is given to a closed region of one specific pixel which is located along the scanline, there are two intersecting points Xc, Xd where the vector data intersects any of four boundaries of the pixel, the Xc being one intersecting point located nearer to the image and the Xd being the other intersecting point located farther from the image. The edge portion pixels shown in FIG. 57 are located on the left hand side of the image. However, in a case in which the edge portion pixels are located on the right hand side of the image, the point Xa shown in FIG. 57 is replaced by the point Xb, and the point Xc shown in FIG. 57 is replaced by the point Xd.

In the fourth embodiment, the approximate area factor k is determined from a decimal fraction of the y coordinate value of the Xc or from a decimal fraction of the x coordinate value of the Xd, on the basis of the character data of edge portion pixels. This character data is indicative of whether or not a plurality of edge portion pixels are formed by the vector data, whether the edge portion pixels are located on the left hand side or right hand side of the image, and whether the edge portion pixels are located on the top side or bottom side of the image.

Referring to FIG. 58($a$) through ($d$), a description will be given of four different cases in which only one edge portion pixel appears at an edge portion of the image where the vector data is intersected by the scanline. These cases may easily be detected by checking that a difference (which is, for example, equal to (Xb−Xa)) in coordinate value between two intersecting points is not greater than 1. FIG. 58($a$) shows a case in which only one edge portion pixel appears and is located on the top left side of the image. The approximate area factor k in this case is determined by a formula: k=1−c, by using a decimal fraction c of the x coordinate value of the point Xd (or Xb). In other words, assuming that the area of a pixel is represented by 1×1 (which is equal to the area of a square corresponding to one pixel), the area of the pixel within the image is approximated to the area of a rectangle, or 1×(1−c) as shown in FIG. 58($a$). FIG. 58($b$) shows a case in which only one pixel appears at an edge portion of the image and is located on the bottom left side of the image. The approximate area factor k in this case is determined by the above formula: k=1−c, by using a decimal fraction c of the x coordinate value of the point Xd (or Xb). That is, the area of the pixel within the image is approximated to the area of a rectangle, or 1×(1−c) as shown in FIG. 58($b$). FIG. 58($c$) shows a case in which only one pixel appears at an edge portion of the image and is located on the top right side of the image. The approximate area factor k in this case is determined by a formula: k=c, by using a decimal fraction c of the x coordinate value of the point Xd (or Xb). That is, the area of the pixel within the image is approximated to the area of a rectangle, or 1×c as shown in FIG. 58($c$). FIG. 58($d$) shows a case in which only one pixel appears at an edge portion of the image and is located on the bottom right side of the image. The approximate area factor k in this case is determined by the above formula: k=c, by using a decimal fraction c of the x coordinate value of the point Xd (or Xb). That is, the area of the pixel within the image is approximated to the area of a rectangle, or 1×c, as shown in FIG. 58($d$).

Referring next to FIG. 59($a$) through ($d$), a description will be given of four different cases in which a plurality of edge portion pixels appear where a vector data is intersected by a scanline. These cases may easily be detected by checking that a difference (which is, for example, equal to (Xb−Xa)) in coordinate value between two intersecting points is greater than 1. FIG. 59($a$) shows a case in which several edge portion pixels appear and are located on the top left side of the image. The approximate area factor k in this case is determined by a formula: k=1−c, by using a decimal fraction c of the y coordinate value of the point Xc. For example, assuming that three edge-portion pixels shown in FIG. 59($a$) are G0, G1 and G2, the approximate area factor k of the pixel G1 is easily determined to be equal to 1×(1−c), by using a decimal fraction c of the y coordinate value of the point Xc. FIG. 59($b$) shows a case in which several edge portion pixels appear and are located on the bottom left side of the image. The approximate area factor k in this case is determined by a formula: k=c, by using a decimal fraction c of the y coordinate value of the point Xc. But, the approximate area factor k of the edge portion pixel G0 is determined to be equal to 1, when the point Xc accords with the intersecting point Xa where the vector data is intersected by the scanline (Y0, Y1). FIG. 59($c$) shows a case in which several edge portion pixels appear and are located on the top right side of the image. The approximate area factor k in this case is determined by the above formula: k=1−c, by using a decimal fraction c of the y coordinate value of the point Xc. FIG. 59($d$) shows a case in which several edge portion pixels appear and are located on the bottom right side of the image. The approximate area factor k in this case is determined by the above formula: k=c, by using a decimal fraction c of the y coordinate value of the point Xc. But, the approximate area factor k of the edge portion pixel G0 is determined to be equal to 1, when the point Xc accords with the intersecting point Xa where the vector data is intersected by the scanline (Y0, Y1).

Figure 60:
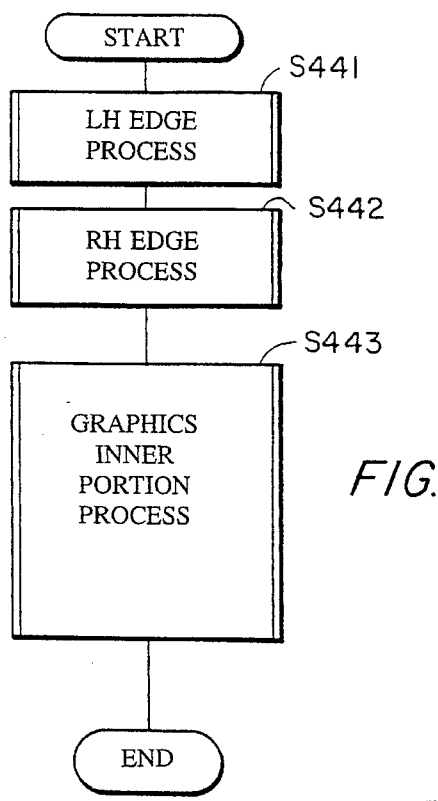
FIG. 60 is a flow chart for explaining an antialiasing process of the fourth embodiment.

Next, a description will be given of the procedure of the antialiasing process of the fourth embodiment which is carried out by the segment shading of the scanline, with reference to FIGS. 60 through 62. As shown in FIG. 60, according to the fourth embodiment, in a step S441, an antialiasing of pixels at a left hand edge portion of the image is carried out. In a step S442, an antialiasing of pixels at a right hand edge portion of the image is carried out. And, in a step S443, a segment shading of the inner portion pixels of the image is carried out.

Figure 61:
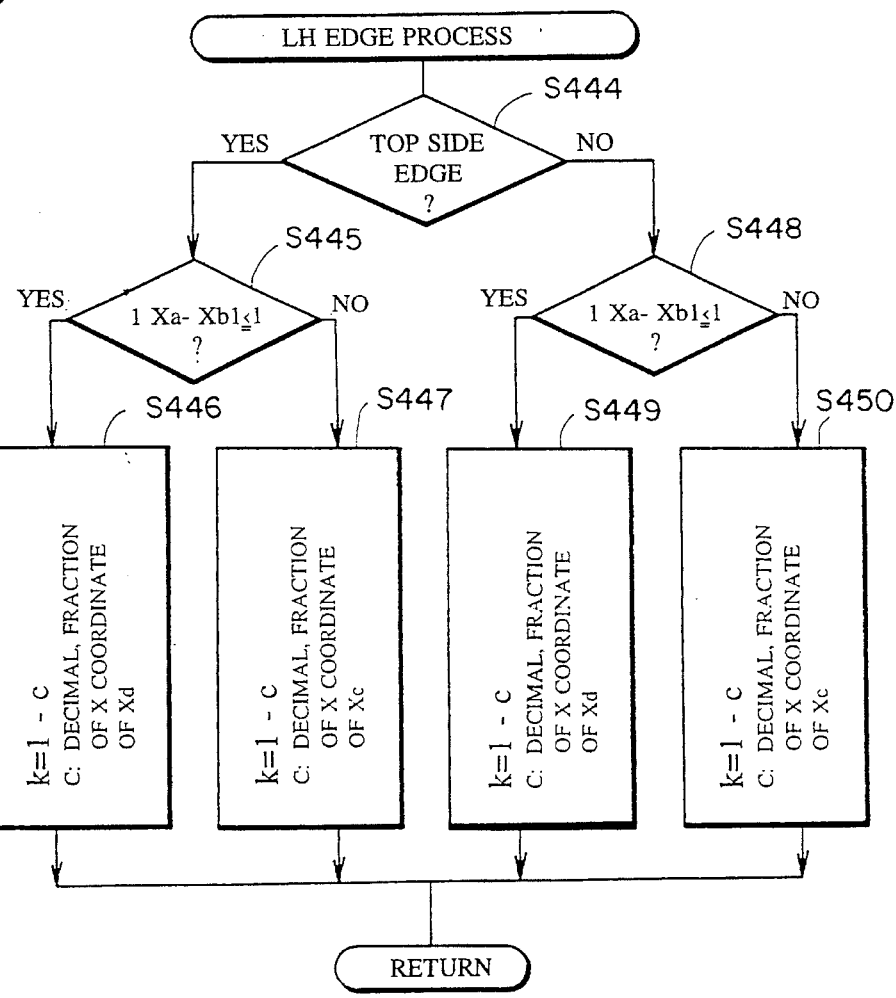
FIG. 61 is a flow chart for explaining a left hand edge processing of the fourth embodiment.

FIG. 61 shows a left side edge processing which is carried out in the step S441 above. This subroutine of the left side edge processing is called from the main routine shown in FIG. 60. In a step S444, a discrimination is made as to whether the edge portion pixels are located on the top side of the image. If the pixels are at a top side edge of the image, then a discrimination is made as to whether only one pixel appears at the edge portion of the image in a step S445. If only one edge portion pixel appears (this is the case in which only one pixel appears and is located on the top left side of the image), then the approximate area factor k of the pixel is determined by the formula: k=1−c, by using a decimal fraction c of the x coordinate value of the point Xd, in a step S446. If a plurality of edge portion pixels appear (this is the case in which several pixels appear and are located on the top left side of the image), then the approximate area factors k of the pixels are determined by the formula: k=1−c, by using a decimal fraction c of the y coordinate value of the point Xc, in a step S447.

And, if the pixels are not on the top side of the image, then a discrimination is made as to whether only one pixel appears at an edge portion of the image in a step S448. If only one pixel appears (this is the case in which only one edge portion pixel appears and is located on the bottom left side of the image), then the approximate area factor k of the pixel is determined by the formula: k=1−c, by using a decimal fraction c of the x coordinate value of the point Xd, in a step S449. If several pixels appear (this is the case in which several edge portion pixels appear and are located on the bottom left side of the image), then the approximate area factors k of the pixels are determined by the formula: k=c, by using a decimal fraction c of the y coordinate value of the point Xc, in a step S450. When the point Xc accords with the intersecting point Xa where the vector data is intersected by the scanline (Y0, Y1), the approximate area factor k in such a case is determined to be equal to 1.

Figure 62:
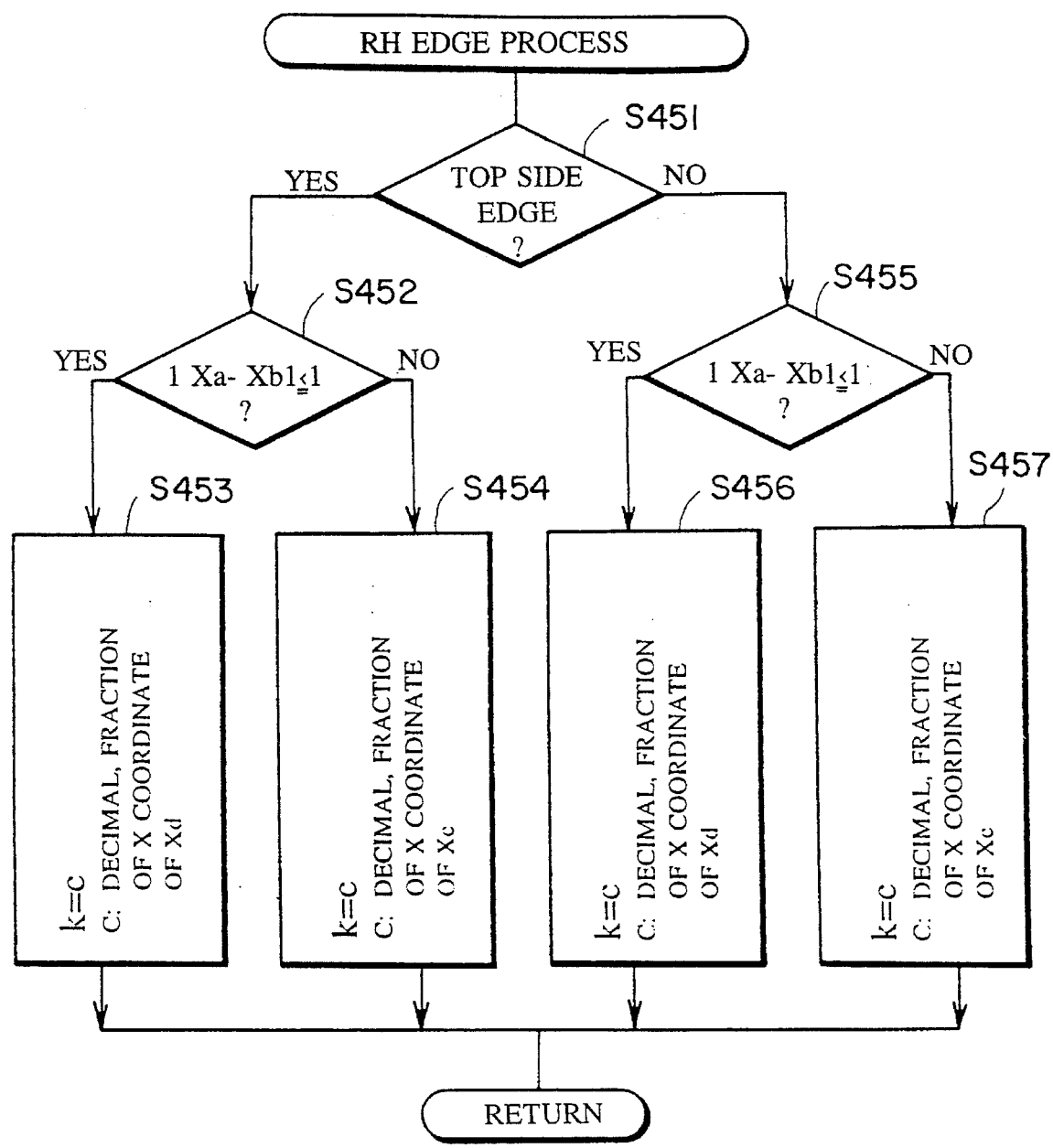
FIG. 62 is a flow chart for explaining a right hand edge processing of the fourth embodiment.

FIG. 62 shows a left side edge processing which is carried out in the step S442 above. This subroutine is also called from the main routine shown in FIG. 60. In a step S451, a discrimination is made as to whether the edge portion pixels are located on the top side of the image. If the pixels are at a top side edge of the image, then a discrimination is made as to whether only one pixel appears at the edge portion in a step S452. If only one pixel appears (this is the case in which only one edge portion pixel appears and is located on the top right side of the image), then the approximate area factor k of the pixel is determined by the formula: k=c, by using a decimal fraction c of the x coordinate value of the point Xd, in a step S453. If a plurality of edge portion pixels appear (this is the case in which several pixels appear and are located on the top right side of the image), then the approximate area factors k of the pixels are determined by the formula: k=1−c, by using a decimal fraction c of the y coordinate value of the point Xc, in a step S454.

And, if the pixels are on the bottom side of the image, then a discrimination is made as to whether only one pixel appears at an edge portion of the image, in a step S455. If only one pixel appears (this is the case in which only one edge portion pixel appears and is located on the bottom right side of the image), then the approximate area factor k of the pixel is determined by the formula: k=c, by using a decimal fraction c of the x coordinate value of the point Xd, in a step S456. If several pixels appear (this is the case in which several pixels appear and are located on the bottom right side of the image), then the approximate area factors k of the pixels are determined by the formula: k=c, by using a decimal fraction c of the y coordinate value of the point Xc, in a step S457. When the point Xc accords with the intersecting point Xa where the vector data is intersected by the scanline (Y0, Y1), the approximate area factor k in such a case is determined to be equal to 1.

After the left side edge processing and the right side edge processing are carried out, a segment shading of the inner portion pixels which are between the right side edge pixels and the left side edge is carried out. In this manner, the pixels of the image are classified into eight groups, and a decimal fraction of the x coordinate value or y coordinate value of an intersecting point is appropriately selected for each of the eight groups to determine the approximate area factor, thus enabling a speedy antialiasing process of a graphic image. In the fourth embodiment, the approximate area factors k of the pixels are determined by the use of a decimal fraction c of the y coordinate value of the point Xc. But, it is obvious that the same effect can be produced if a decimal fraction c of the y coordinate value of the point Xd is used.

Further, the present invention is not limited to the above described embodiments, and variations and modifications may be made without departing from the scope of the present invention.

What is claimed is

1. A graphics processing apparatus for producing output data at edges of an output image which is defined by vector data, the apparatus comprising:

a) approximation means for determining an approximate area factor of each edge pixel at edges of the output image, which output image is defined by the vector data, the determining being based on a decimal fraction extracted from a coordinate value of a predetermined one of two points, which two points are intersections between the vector data and two border lines of a scanline having a thickness equivalent to a width of one pixel; and b) antialiasing means, including:
     1) means for determining shaded area factors of the edge pixels of the output image, based on the approximate area factor of each edge pixel determined by the approximation means; and
     2) means for producing output data based on the shaded area factors, so as to reduce aliasing effects at edges of the output image.

2. The apparatus as claimed in claim 1, wherein:

said approximation means includes means for extracting a decimal fraction from an x coordinate value of either of said two points to determine said approximate area factor.

3. The apparatus as claimed in claim 1, wherein:

said approximation means includes means for extracting a decimal fraction from a y coordinate value of either of said two points to determine said approximate area factor.

4. The apparatus as claimed in claim 1, wherein said approximation means extracts a decimal fraction from a x coordinate value or y coordinate value of a prescribed point selected from said two points, and determines an approximate area factor to be assigned to each said edge pixels on the basis of an edge character data, said edge character data including a first data indicative of whether the number of said edge pixels is singular or plural, a second data indicative of whether said edge pixels are located on a right side of the output image or on a left side thereof, and a third data indicative of whether said edge pixels are located on a top side of the output image or on a bottom side thereof.

5. The apparatus as claimed in claim 1, further comprising extraction means for extracting a decimal fraction from a x coordinate value of a point out of said two points where the vector data is intersected by a scanline, said point being located nearer to the output image, and discrimination means for discriminating an edge pixel type indicative of whether said edge pixels are located on a right side of the output image or on a left side thereof, wherein said approximation means determines an approximate area factor of a first pixel nearest to the output image among said edge pixels, on the basis of the edge pixel type from said discrimination means and the decimal fraction from said extraction means.

6. The apparatus as claimed in claim 5, wherein said approximation means determines approximate area factors of second pixels to be equal to zero, said second pixels being different from said first pixel among said edge pixels.

7. The apparatus as claimed in claim 5, further comprising second approximation means for determining successively approximate area factors of second pixels among said edge pixels by using said approximate area factor of said first pixel as a reference value, said second pixels being pixels among said edge pixels which are different from said first pixel.

8. The apparatus as claimed in claim 7, wherein said second approximation means determines successively the approximate area factors of the second pixels until a resulting value of an approximate area factor from said second approximation means is found equal to zero, or until an approximate area factor of a final pixel among said edge pixels is determined by said second approximation means.

9. The apparatus as claimed in claim 7, wherein the approximate area factors of the second pixels are successively determined by said second approximation means by applying repeatedly a formula: ks−1/(n−1) to each said second pixel, where n is the number of different levels indicating the approximate area factors of pixels and ks is the reference value being initially represented by the approximate area factor of the first pixel from said approximation means.

10. A graphics processing apparatus for producing output data at edges of an output image which is defined by vector data, the apparatus comprising;
   a) first checking means for determining a total number of edge pixels at edges of the output image which is defined by the vector data, based on coordinate values of two points where the vector data is intersected by two border lines of a scanline having a thickness equivalent to a width of one pixel;
   b) edge pixel means for discriminating an edge pixel type of the output image, the edge pixel type indicating whether the edge pixels are located on a right side of the output image or on a left side of the output image;
   c) decimal fraction means including:
      1) means for extracting a decimal fraction from a coordinate of a predetermined one of the two points, the predetermined one point being located nearer to the output image defined by the vector data; and
      2) means for converting the decimal fraction into an approximate value;
   d) memory means for storing area factor information including a plurality of approximate area factors relating to a plurality of successive pixels of the output image, each of the approximate area factors being predetermined based on (1) the total number determined by the first checking means, (2) the approximate value produced by the decimal fraction means, and (3) the edge pixel type discriminated by the edge pixel means;
   e) control means including:
      1) means for reading out the area factor information from the memory means based on (1) the total number discriminated by the first checking means, (2) the approximate value produced by the decimal fraction of means, and (3) the edge pixel type discriminated by the edge pixel means; and
      2) means for determining an approximate area factor of each of the edge pixels of the output image based on the area factor information; and
   f) antialiasing means including:
      1) means for determining shaded area factors of the edge pixels of the output image, based on the approximate area factor of each edge pixel determined by the control means; and
      2) means for producing output data based on the shaded factors, so as to reduce aliasing effects at edges of the output image.

11. The apparatus as claimed in claim 10, further comprising end point means for discriminating the presence of an end point of the vector data in the edge pixels at an end portion of the output image, wherein said control means determines the number of the edge pixels on the basis of a x coordinate value of the end point and a x coordinate value of a point out of said two points.

* * * * *

UNITED STATES PATENT AND TRADEMARK OFFICE
CERTIFICATE OF CORRECTION

PATENT NO. : 5,555,360
DATED : September 10, 1996
INVENTOR(S) : Hitomi Kumazaki, Yoshiaki Hanyu and Masaki Sano It is certified that error appears in the above-identified patent and that said Letters Patent is hereby corrected as shown below:

Column 9, line 67, delete second occurrence of "a".

Column 10, line 3, delete first occurrence of "a".

Column 20, line 41, delete second occurrence of "the".

Column 26, line 67, change "similar" to --Similar--.

Signed and Sealed this

Seventh Day of October, 1997

Attest:

BRUCE LEHMAN

Attesting Officer    Commissioner of Patents and Trademarks